US007012875B2

(12) United States Patent
Shimano et al.

(10) Patent No.: US 7,012,875 B2
(45) Date of Patent: Mar. 14, 2006

(54) OPTICAL DISK APPARATUS USING FOCAL SHIFT SIGNALS TO CONTROL SPHERICAL ABERRATION

(75) Inventors: Takeshi Shimano, Tokorozawa (JP); Takeshi Maeda, Kokubunji (JP); Hirofumi Sukeda, Tokorozawa (JP)

(73) Assignee: Hitachi, Ltd., Tokyo (JP)

( * ) Notice: Subject to any disclaimer, the term of this patent is extended or adjusted under 35 U.S.C. 154(b) by 371 days.

(21) Appl. No.: 10/220,188

(22) PCT Filed: Aug. 29, 2001

(86) PCT No.: PCT/JP01/07422

§ 371 (c)(1),
(2), (4) Date: Aug. 29, 2002

(87) PCT Pub. No.: WO02/21520

PCT Pub. Date: Mar. 14, 2002

(65) Prior Publication Data

US 2003/0053393 A1     Mar. 20, 2003

(30) Foreign Application Priority Data

Sep. 6, 2000   (JP) ............................. 2000-274989

(51) Int. Cl.
*G11B 7/135* (2006.01)
(52) U.S. Cl. ............................ 369/112.02; 369/112.24; 369/112.12
(58) Field of Classification Search ............ 369/44.11, 369/44.14, 44.23, 44.41, 44.37, 112.01, 112.04, 369/112.07, 112.12, 120, 112.02, 44.32
See application file for complete search history.

(56) References Cited

U.S. PATENT DOCUMENTS

| | | | | |
|---|---|---|---|---|
| 5,446,565 A | * | 8/1995 | Komma et al. | 369/44.23 |
| 5,652,744 A | * | 7/1997 | Freeman et al. | 369/112.07 |
| 5,717,678 A | * | 2/1998 | Akiyama | 369/118 |
| 5,787,061 A | * | 7/1998 | Tsuchiya et al. | 369/44.29 |
| 5,920,532 A | * | 7/1999 | Yagi et al. | 369/53.22 |
| 6,400,671 B1 | * | 6/2002 | Hayashi et al. | 369/112.12 |
| 6,826,133 B1 | * | 11/2004 | Ichimura et al. | 369/44.27 |

FOREIGN PATENT DOCUMENTS

| | | |
|---|---|---|
| JP | 9-128785 | 5/1997 |
| JP | 11-110768 | 4/1999 |
| JP | 11-195229 | 7/1999 |
| JP | 2000-40237 | 2/2000 |
| JP | 2000-57616 | 2/2000 |
| JP | 2000-215505 | 8/2000 |
| JP | 2001-507463 | 6/2001 |

* cited by examiner

*Primary Examiner*—Hoa T. Nguyen
*Assistant Examiner*—Peter Vincent Agustin
(74) *Attorney, Agent, or Firm*—Mattingly, Stanger, Malur & Brundidge, P.C.

(57) ABSTRACT

In the past there has been a problem that on a detection surface the influence of interference causes a defocusing signal to degrade, narrowing the range in which spherical aberration can be stably detected. Accordingly, a diffraction grating is used to focus the inner and outer sides of luminous flux on separate optical detectors before the optical flux is focused on an optical detector and defocusing signals are independently calculated to find the difference therebetween, thereby providing a spherical aberration signal. This makes it possible to detect spherical aberation signals more stably.

7 Claims, 46 Drawing Sheets

FIG. 11

| PLANE NUMBER | R | K | A | B | C | D | PLANE INTERVAL (mm) | REFRACTIVE INDEX |
|---|---|---|---|---|---|---|---|---|
| 1 | 1.6273 | -0.50566 | -2.07E-03 | -9.99E-04 | 7.50E-05 | -2.05E-04 | 1.564562 | 1.50436 |
| 2 | 89.45684 | 0 | -2.93E-03 | 4.60E-03 | -3.33E-03 | 9.21E-04 | 0.34768 | 1 |
| 3 | 1.30215 | -0.503781 | 1.93E-02 | 1.21E-02 | 2.06E-04 | 0 | 1.282655 | 1.604471 |
| 4 | ∞ | | 0 | 0 | 0 | 0 | 0.134216 | 1 |
| 5 | ∞ | | 0 | 0 | 0 | 0 | 0.1 | 1.529569 |

$$X = \frac{Y^2/R}{1+\{1-(1+K)(Y/R)^2\}^{1/2}} + AY^4 + BY^6 + CY^8 + DY^{10}$$

X: DEPTH FROM SUMMIT OF PLANE, Y: HEIGHT FROM OPTICAL AXIS, R: RADIUS CURVATURE OF NEAR AXIS, K: CONICAL CONSTANT, A: ASPHERIC COEFFICIENT OF $Y^4$ ITEM, B: ASPHERIC COEFFICIENT OF $Y^6$ ITEM, C: ASPHERIC COEFFICIENT OF $Y^8$ ITEM, D: ASPHERIC COEFFICIENT OF $Y^{10}$ ITEM

TANGENTIAL DIRECTION OF DISK

TANGENTIAL DIRECTION OF DISK

FES=FE1-FE2
SAS=(FO1-FO2)-G(FI1-FI2)

2501

→ RADIAL DIRECTION

FIG. 30
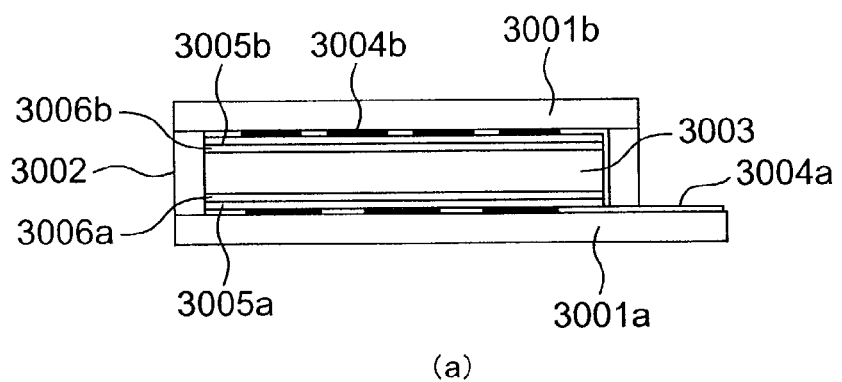
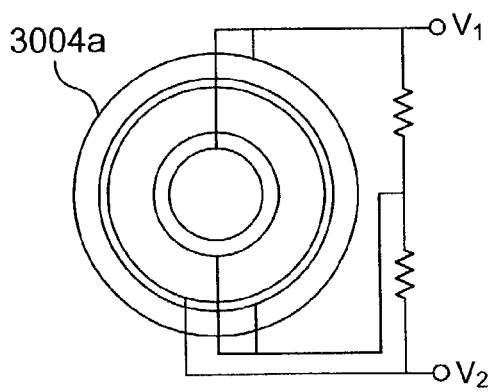
(b)
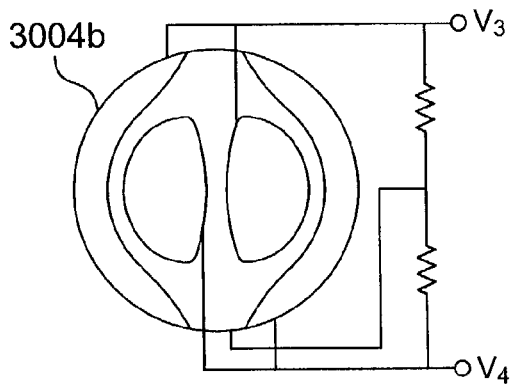
(c)
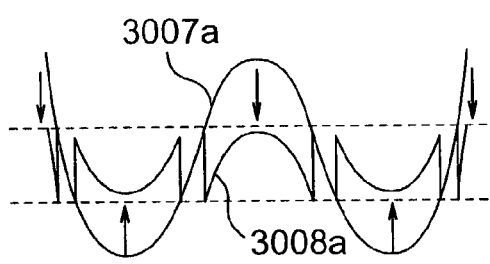
(d)
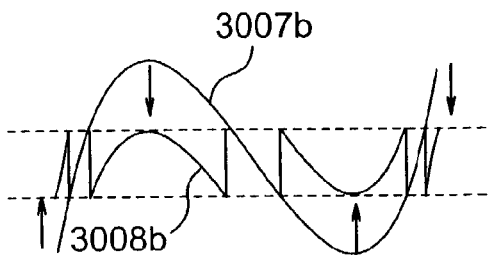
(e)

AF=E1-F1-E2+F2
SA=E1-F1+E2-F2
TR=A-B-C+D
LS=A-B
RF=G

FIG. 37
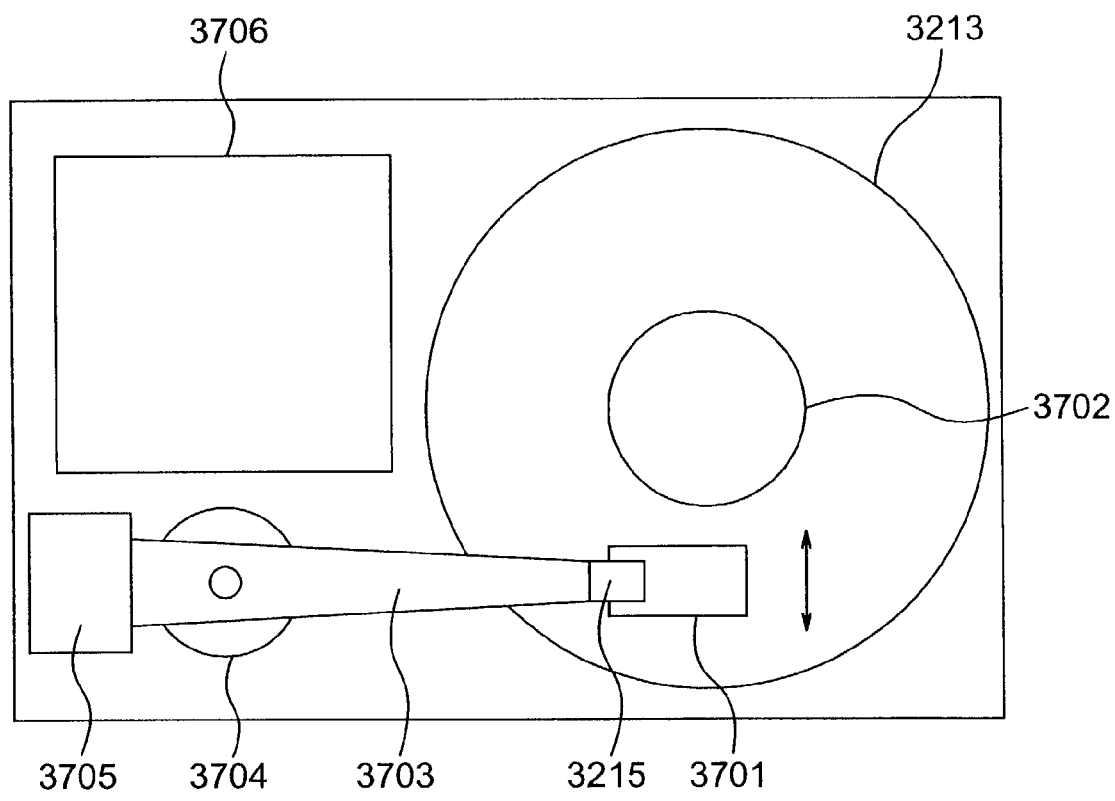
(a)
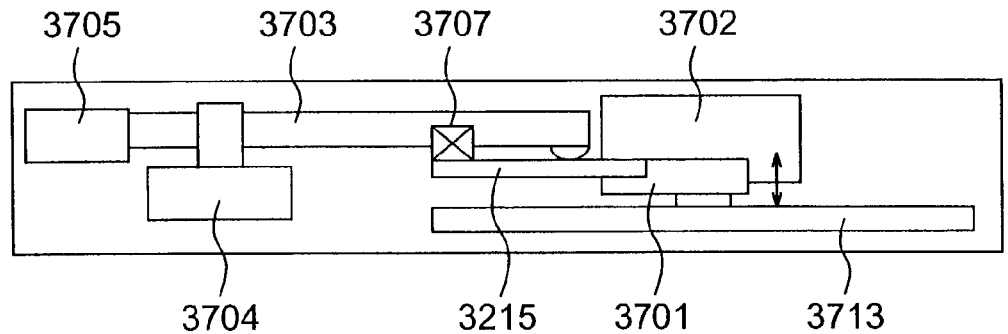
(b)

AF=(A1−A2+A3−A4)+(B1−B2+B3−B4)
TR=(A1+A2−A3−A4)−G1(B1+B2−B3−B4)
SA=(A1−A2+A3−A4)−G2(B1−B2+B3−B4)
RF=C
LS=B1+B2−B3−B4
OUTPUT SIGNAL
   A1, A2, A3, A4, B1, B2, B3, B4, C, Mon

5101

US 7,012,875 B2

OPTICAL DISK APPARATUS USING FOCAL SHIFT SIGNALS TO CONTROL SPHERICAL ABERRATION

TECHNICAL FIELD

The present invention is related to an optical head and an optical disk apparatus. More specifically, the present invention is directed to a correcting technique as to thickness deviation of a base plate, and also spherical aberration in two-sheet objective lenses for a high NA.

BACKGROUND ART

Very recently, while there are strong trends in high density as to optical disks, DVD-ROMs having storage capacities of 4.7 GB have been marketed with respect to CD-ROMs having storage capacities of 0.65 GB, corresponding to commercial-purpose reproducing-only optical disks. DVD-RAMs having storage capacities of 2.6 GB have already been available in actual fields as recordable optical disks having large storage capacities. Within a front half yearly period in HEISEI-era of year 12 (A.D. 2000), DVD-RAMs having larger storage capacities of 4.7 GB will be positively marketed. Such recordable DVDs, needs of various applications are made in such fields as, not only utilizations as storage media designed for computers, but also storage media capable of recording video images without rewinding/fast-feeding operations. At the end of HEISEI-era of year 11, video recorders with employment of optical disks have already been marketed. As to video records with employment of DVD-RAMs, DVD-RAMs having storage capacities of 4.7 GB are expected to be supported. Such video recorders equipped with DVD-RAMs are strongly expected in the market in view of compatibility between CDs and DVD-ROMs. However, the storage capacities of DVD-RAMs are not limited only to 4.7 GB, but may be desirably increased up to 20 GB, by which high-definition moving pictures may be recorded on these DVD-RAMs for 2 hours in connection with such a trend that satellite broadcasting programs will be produced by using digital techniques.

Recording density of an optical disk is substantially limited by a dimension "λ/NA" of a recording/reproducing optical spot (symbol "λ" indicates wavelength of light and symbol "NA" represents numerical aperture of objective lens). As a consequence, in order to increase a storage capacity, a wavelength of light must be shortened, or a numerical aperture must be increased. As to wavelengths, very recently, development as to blue-violet-colored semiconductor lasers having a wavelength of 410 nm has been progressed. Since the wavelength of the laser used in presently-available DVDs having the storage capacities of 4.7 GB is equal to 650 nm, if such blue-violet-colored semiconductor lasers are merely employed, then storage capacities of approximately 12 GB may be in principle realized. The storage capacity of 12 GB is approximately 2.5 times higher than the presently-available storage capacity of 4.7 GB, namely a square of wavelength ratio. However, in order to further increase the storage capacity of 12 GB to 20 GB, the numerical aperture "NA" must be multiplied by 1.3, namely, the NA "0.6" of the presently-available DVD must be increased up to an NA of 0.78.

As the conventional techniques capable of increasing the NA, for example, there is JP-A-11-195229 (first prior art). In this first prior art, the NA is increased up to 0.85 in maximum by employing the two-group/two-sheet of objective lenses. At this time, when the NA is increased, there are such problems that the aberration is increased which is caused by the shift in the optical system, and by the errors contained in the thickness and the inclinations of the disk base plate. To the contrary, in the above-described prior art, in order to reduce the comatic aberration which is produced due to the disk inclination, the thickness of the base plate is made thin (up to 0.1 mm). Also, with respect to the spherical aberration occurred due to the thickness error of the base plate, the thickness of the base plate is detected from the difference between the focal shift signal derived from the surface of the disk and the focal shift signal derived from the recording plane thereof. Then, the interval between the two lenses is changed based upon this detected thickness so as to compensate the spherical aberration.

Furthermore, there is JP-A-2000-057616 (second prior art) as an other prior art. In this second prior art, as previously explained, the control signal used to compensate the spherical aberration is detected by the difference (subtraction) signal between the focal shift signals based upon the astigmatism method, which are detected by separating the inner side and the outer side of the optical spot on the photodetector. Also, at this time, the summation signal between these focal shift signals is used as the focal shift signal.

In the above-explained first prior art, the spherical aberration is detected in such a manner that the thickness of the base plate is detected from the focal shift signal derived from the surface of the disk and the focal shift signal derived from the recording film plane thereof. However, in this case, since the spherical aberration is not directly detected, there are other problems that the errors readily occur due to adverse influences caused by the deviation of refractive indexes of the base plate and the shift of the photodetector, and the control operation can be hardly carried out.

As will be explained later in detail, in the second prior art, there are such problems that the waveforms of the focal shift signals are largely deteriorated which are caused by the spherical aberration itself, and the focal shift range capable of detecting the spherical aberration is narrow. Furthermore, the offset of the focal shift signal caused by the spherical aberration is also large.

The present invention has been made to solve the above-described problems, and therefore, has an object to provide an optical disk apparatus capable of detecting spherical aberration in higher precision and under stable condition, which is caused by deviation of a base plate thickness and a shift in an optical system, and capable of correcting this spherical aberration, and also capable of detecting a focal shift signal having a small offset so as to record/reproduce an optical disk under stable condition.

DISCLOSURE OF THE INVENTION (Solving Means)

An optical head of the present invention for solving the above-explained problems, is basically arranged by a semiconductor laser; an optical system for condensing laser light of the semiconductor laser onto an optical disk; a variable focal point mechanism for varying a focus position of the condensed light; a spherical aberration adding mechanism for adding variable spherical aberration to the condensed light; an optical branching element for branching reflection light reflected from the optical disk form an optical path defined from the semiconductor laser up to the optical disk; a lens for condensing the branched reflection light; and a light receiving element for receiving the light condensed by the lens so as to convert the received light into an electric signal.

At this time, a second branching element is additionally provided, while the second branching element branches reflection light branched by the optical branching element in such a manner that the second branching element further separates this branched light into first luminous flux located in the vicinity of an optical axis and second luminous flux located at a peripheral portion of the optical axis, and both the first luminous flux and the second luminous flux are condensed to the light receiving element. The optical branching element essentially constitutes a hologram. As the spherical aberration adding mechanism, an electrostatic actuator capable of varying an interval of two-group/two-sheet of objective lenses, or a liquid crystal filter capable of electrically controlling a phase of transmission light is employed. Also, a summation signal between these two focal shift signals is assumed as a focal shift signal. The variable focal point applying mechanism is controlled by employing this focal shift signal. As the variable focal point, an electrostatic actuator which essentially mounts and moves an objective lens is employed.

At this time, while the first and second optical branching elements are constructed in an integral form, the optical system may be simplified.

Also, since the optical branching element formed in the integral form is constructed of a polarizing hologram, a loss in a light amount may be suppressed.

Also, while the first optical branching element is constituted by a polarizing element and the spherical aberration applying mechanism is constituted by a liquid crystal element, the liquid crystal element is arranged between the semiconductor laser and the first optical branching element, so that the optical head may be made compact. Since the liquid crystal element is employed only in the going optical system, a loss of a light amount can be suppressed. In this case, a polarizing element implies an optical element such as a polarization beam splitter and a polarizing diffraction grating, which owns an incident polarization depending characteristic with respect to a light amount ratio to be branched.

Also, while the first optical branching element is a non-polarizing optical branching element and the spherical aberration applying mechanism is a liquid crystal element, this liquid crystal is arranged between the first optical branching element and the objective lens. As a result, the optical head can be made compact. Also, since the spherical aberration caused by the liquid crystal is effected in the reciprocative optical path, an adverse influence such as an offset (will be discussed later) of the spherical aberration can be avoided. In this case, a non-polarizing element implies an optical element such as a non-polarization beam splitter and a non-polarization diffractive grating, which has no incident polarization depending characteristic with respect to a light amount ratio to be branched.

Also, as to an optical element between the first optical branching element and the photodetector, which gives no adverse influence to the optical system defined from the semiconductor laser to the objective lens, such an optical element as a lens which causes the spherical aberration is not arranged. As a result, the offset never occurs in both the spherical aberration to be detected, and the spherical aberration on the optical disk plane.

Also, since both the objective lens and the spherical aberration applying mechanism are fixed in an integral form, it is possible to eliminate an adverse influence of an axial shift of spherical aberration which is caused by lens decentering in connection with the tracking control.

Also, while an effective luminous diameter of the objective lens is smaller than, or equal to 1 mm, the semiconductor laser, the spherical aberration applying mechanism, the first and second optical branching elements, the objective lens, and the photodetector are fixed in an integral form to be mounted on the variable focal point mechanism. As a result, the optical head can be made compact, and further, it is possible to eliminate the adverse influence of the axial shift of the spherical aberration correction which is caused by the lens decentering in connection with the tracking control. If a thickness of a base plate of an optical disk is 0.1 mm, even when the effective diameter of the objective lens is 1 mm, then the working distance longer than, or equal to 0.1 mm can be secured by employing one sheet of lens. The ground why the effective luminous flux diameter is smaller than, or equal to 1 mm will be explained with reference to FIG. 33. FIG. 33 indicates a calculation result of the working distance with respective effective diameter under such a condition that an NA is 0.85; a thickness of a disk base plate is 0.1 mm; a refractive index of the base plate is 1.62; a refractive index of the objective lens is 1.8; and also, a radius curvature of a first plane of a single type objective lens is equal to a half of the luminous flux diameter. In this case, based upon Japanese book "Lens Designing Method" (written by MATUSI, published by KYORITSU publisher, No. 7, 1989), the working distance "WD" was calculated under such a lens thickness that a value of spherical aberration becomes minimum, which is conducted from the aberration theory in the analytic manner. Such a condition that the first plane radius curvature is equal to ½ of the luminous flux diameter corresponds to a sever condition under which a lens can be geometrically established. However, in an actual case, since the lens is a non-spherical shape, if a distance is approximated to this non-spherical shape, then the lens can be established. As a result, even when NA is equal to 0.85 and the thickness of the base plate is equal to 0.1 mm, it can be seen that such a condition may be secured. That is, the effective diameter is 1 mm, and the working distance is approximately 0.1 mm. This condition is nearly equal to the working distance of 0.13 mm as to the two-sheet of lenses having the effective diameter of 3 mm shown in FIG. 11, namely can be sufficiently realized.

Also, in such a case that the spherical aberration applying mechanism and the object lens are not formed in an integral manner, when the objective lens is moved along the radial direction for the tracking control operation, the axis of the spherical aberration which is produced by the spherical aberration applying mechanism is shifted from the optical axis of the objective lens, so that comatic aberration may effectively occur. Since a comatic aberration applying mechanism is added, this comatic aberration can be compensated. Also, in such a case that the spherical aberration applying mechanism and the objective lens are formed in the integral manner, this comatic aberration applying mechanism may become effective with respect to such a comatic aberration occurred in the case that the base plate of the optical disk is inclined.

Also, in the case that the optical head is made compact, since the semiconductor laser chip is constituted on the substrate of the photodetector in an integral manner, the optical head can be easily assembled and adjusted.

Also, in such a case that a track pitch of an optical disk is narrow, since the spherical aberration is detected/compensated in combination with the tracking operation by the differential push-pull system, the offset caused by the movement of the objective lens in connection with the tracking control operation can be canceled. In this case, such a diffraction grating is provided in luminous flux directed to the objective lens, and this diffraction grating may diffract both an inner-sided luminous flux and an outer-sided luminous flux along different directions. Also, the diffraction grating diffracts the outer-sided luminous flux along a substantially tangential direction of the optical disk, and also diffracts the inner-sided luminous flux along a substantially radial direction. In particular, the outer-sided luminous flux is arranged on both sides of zero-order light which is not diffracted, and is shifted may be an essentially ½ period of the guide grooves, or the pit strings of the optical disk. In this case, the expression "essentially" may give the following implication. That is, shifts between the zero-order light and the ± first-order light is essentially identical to each other even in the ½ period, and also even in such a period of (n+½), in which symbol "n" indicates an integer. Also, even when the azimuth of the diffraction grating is adjusted by considering the ½ period, effects are essentially identical to each other with such an error range (on the order of ±⅛ period) where no adverse influence is given to the signals. Similarly, the expression "essentially tangential direction" implies such a tangential direction involving the above-described "essential" shifts.

Since the above-described operation is carried out, such a tracking signal is obtained from the outer-sided luminous flux, while the tracking signal has the same polarity as that of the zero-order light as to the offset by the lens movement, and the tracking signal has an inverted polarity as that of the zero-order light. As a consequence, since a differential output is produced from these tracking signals, such a tracking signal from which the offset is canceled may be obtained. In the case that the track pitch is made narrow, since the adverse influence of the interference caused by the diffraction light is not present in the inner-sided luminous flux, the inner-sided luminous flux is arranged along an essentially radial direction, the diffraction angle of the diffraction light can be easily suppressed within the allowable range as to the view angle of the objective lens. In this case, the expression "essentially radial direction" owns the following implication. That is, as previously explained, since the adverse influence of the interference caused by the diffraction light is not present in the inner-sided luminous flux, there is no relationship as to the relative position between the guide grooves and the inner-sided luminous flux. Therefore, when the inner-sided luminous flux is detected, this inner-sided luminous flux may be separated from the outer-sided luminous flux.

Also, in the case that the separation between the inner-sided luminous flux and the outer-sided luminous flux is carried out in the reflection optical path from the optical disk, since the astigmatism method is employed as the focal point detecting system, a total number of signal output lines derived from the photodetector can be reduced. In such a case, in the diffraction grating used to separate the inner-sided luminous flux from the outer-sided luminous flux, such a pattern for applying astigmatism may be employed.

Also, an optical disk apparatus for solving the above-described problem is arranged by at least the above-described optical head, and a calculation circuit for acquiring a reproduction signal and a focal shift signal from an electric signal of a light receiving element thereof. Then, the first and second focal shift signals are independently detected as to the above-described first luminous flux and the second luminous flux, and then, a signal which is substantially directly proportional to the spherical aberration is obtained from a subtraction signal obtaining by essentially subtracting these first and second focal shift signals. This signal is used to control the spherical aberration applying mechanism so as to reduce the spherical aberration of the condensed spot. In this case, the expression "essentially" related to the calculation of the spherical aberration detecting signal owns the following implications. That is, the sequence of the circuit calculation may involve not only such a calculation sequence that after the focal shift signal of the first luminous flux and the focal shift signal of the second luminous flux have been firstly and independently calculated, the difference signal is calculated between these focal shift signals, but also another calculation sequence in such a way that a calculation result may become essentially equivalent to the above-described calculation result (for example, all of components which contribute polarity of "+" with respect to result, and all of components which contribute polarity of "−" are added to each other, and thereafter, a difference between these added components is calculated).

Also, in such an optical disk apparatus, when this optical disk apparatus is employed in an optical system where a liquid crystal element, or the like is combined with a polarization beam splitter and a ¼-λ plate, such a phase difference is applied by the liquid crystal element only to a linearly polarized light component along one direction, spherical aberration may be effected only to luminous flux of a going optical path, which is directed to the optical disk. In this case, this ¼-λ plate implies such an optical element having two optical axes located perpendicular to each other, through which linearly polarized light entered thereinto directly passes with maintaining this linearly polarized light. This optical element may apply a phase difference of a ¼-wavelength with respect to incident light of two sets of linearly polarized light which are located perpendicular to each other and are polarized along directions of the respective optical axes. Such an optical element may have an effect capable of converting the passing light into the circularly polarized light in the case that linearly polarized light located in parallel to two optical axes and having the same amplitudes and the same phases are entered into this optical element, namely in the case that linearly polarized light is entered which is inclined by 45 degrees with respect to the optical axis. This is because when the light directed to the disk passes through the ¼-λ plate, this light becomes circularly polarized light, and when the luminous flux which is reflected from the disk to be returned again passes through the ¼-λ plate, this reflection light becomes such a linearly polarized light along the polarization located perpendicular to the going optical path. However, as to the spherical aberration which is detected by the photodetector and is obtained by way of the calculation, the spherical aberration applied by both the going optical path and the returning optical path is reflected. As a result, when this signal is essentially and directly fed back to the spherical aberration compensating mechanism, the spherical aberration of the reciprocative optical paths is compensated only in the going optical path, and then, it is so controlled in such a manner that there is no spherical aberration on the photodetector. Accordingly, only the spherical aberration of ones optical path is originally applied to the spot on the optical disk, whereas the spherical aberration in the reciprocative optical paths is compensated only in the going optical path. As a consequence, the spherical aberration is left in the inverse code, the amount of which is equal to the original amount of the spherical aberration. Therefore, in order to avoid this difficulty, the feedback system is arranged in such a manner that the spherical aberration occurred on the disk plane becomes zero. In this case, the expression "essentially" implies, as previously explained, such another calculation sequence that the sequence of the circuit calculation is performed to obtain essentially equivalent calculation result.

To this end, for example, such a loop is provided by which a drive signal for electrically driving the spherical aberration applying mechanism is fed back to a system for amplifying the spherical aberration error.

Furthermore, in these optical disk apparatus, since only the spherical aberration on the disk plane is compensated, the spherical aberration of the returning optical path is not compensated, so that the offset is produced in the focal shift signal in this case. In order to compensate the offset, and to compensate the offset of the focal shift signal in response to the detected spherical-aberration signal, the spherical aberration error is multiplied by a proper coefficient, and the multiplied spherical aberration error is added to the drive signal of the variable focal point mechanism so as to drive the variable focal point mechanism.

As previously explained, in such a case that the spherical aberration applying mechanism and the object lens are not formed in an integral manner, when the objective lens is moved along the radial direction for the tracking control operation, the axis of the spherical aberration which is produced by the spherical aberration applying mechanism is shifted from the optical axis of the objective lens, so that comatic aberration may effectively occur. In the optical disk apparatus using the optical head equipped with the comatic aberration applying mechanism, the move amount of the objective lens is detected, and the comatic aberration applying mechanism is driven by using this detected move amount so as to compensate this comatic aberration.

Also, for instance, in order to detect the move amount of the objective lens, an unbalance of the branched luminous flux is detected which is located in the vicinity of the optical axis along the radial direction of the optical disk. In such a case that a track pitch of an optical disk is sufficiently narrow, diffraction light caused by guide grooves of the disk is deviated at the peripheral portion of the luminous flux, the adverse influence of the interference caused by these diffraction light is not present in the luminous flux in the vicinity of the optical axis. As a consequence, the light in this region is independently detected within two regions which are subdivided by the diameter along the tangential direction of the disk, and then, a difference between these detected light is calculated, so that the movement of the objective lens along the radial direction in connection with the tracking operation can be detected.

Also, in the case that a track pitch of an optical disk is made narrow (namely, when track pitch is smaller than, equal to $\lambda/NA$ $\mu$m with respect to numerical number NA of objective lens and wavelength $\lambda$), since the spherical aberration is detected/compensated in combination with the tracking operation by the differential push-pull system, the offset caused by the movement of the objective lens in connection with the tracking control operation can be canceled. As previously described, in this case, such a diffraction grating is provided in luminous flux directed to the objective lens, and this diffraction grating may diffract both an inner-sided luminous flux and an outer-sided luminous flux along different directions. Also, the diffraction grating diffracts the outer-sided luminous flux along a substantially tangential direction of the optical disk, and also diffracts the inner-sided luminous flux along a substantially radial direction. In particular, the outer-sided luminous flux is arranged on both sides of zero-order light which is not diffracted, and is shifted only by the ½ period of the guide grooves, or the pit strings of the optical disk. Since the above-described operation is carried out, such a tracking signal is obtained from the outer-sided luminous flux, while the tracking signal has the same polarity as that of the zero-order light as to the offset by the lens movement, and the tracking signal has an inverted polarity as that of the zero-order light. As a consequence, since a differential output is produced from these tracking signals, such a tracking signal from which the offset is canceled may be obtained. In the case that the track pitch is made narrow, since the adverse influence of the interference caused by the diffraction light is not present in the inner-sided luminous flux, the inner-sided luminous flux is arranged along an essentially radial direction, the diffraction angle of the diffraction light can be easily suppressed within the allowable range as to the view angle of the objective lens. Based upon the tracking signal acquired in this manner, the tracking control mechanism is controlled. At the same time, the focal shifts are detected as to the respective inner-sided and outer-sided luminous flux separated from the luminous flux. Then, spherical aberration is detected from a difference between these detected focal shifts, and also, a focal shift is detected from a summation of these detected focal shifts, so that the spherical aberration applying mechanism and the focal shift control mechanism are controlled.

Alternatively, as another method, in the optical disk apparatus having the spherical aberration control mechanism, after a focus control operation has been commenced with respect to a recording layer on an optical disk, a focal point position is moved from a focused position along forward/backward directions, and spherical aberration is detected from a change in amplitudes of the tracking signal so as to drive the spherical aberration control mechanism.

BRIEF DESCRIPTION OF THE DRAWINGS

FIG. 11 is a diagram for showing the two-lens shape of the prior art;

FIG. 30 is a structural diagram of a liquid crystal phase compensating element;

FIG. 37 is a diagram for indicating an optical disk apparatus constructed of the compact optical head, according to an embodiment mode of the present invention;

BEST MODE FOR CARRYING OUT THE INVENTION (Embodiment 1)

Referring now to drawing, an embodiment mode of the present invention will be described.

Figure 1:
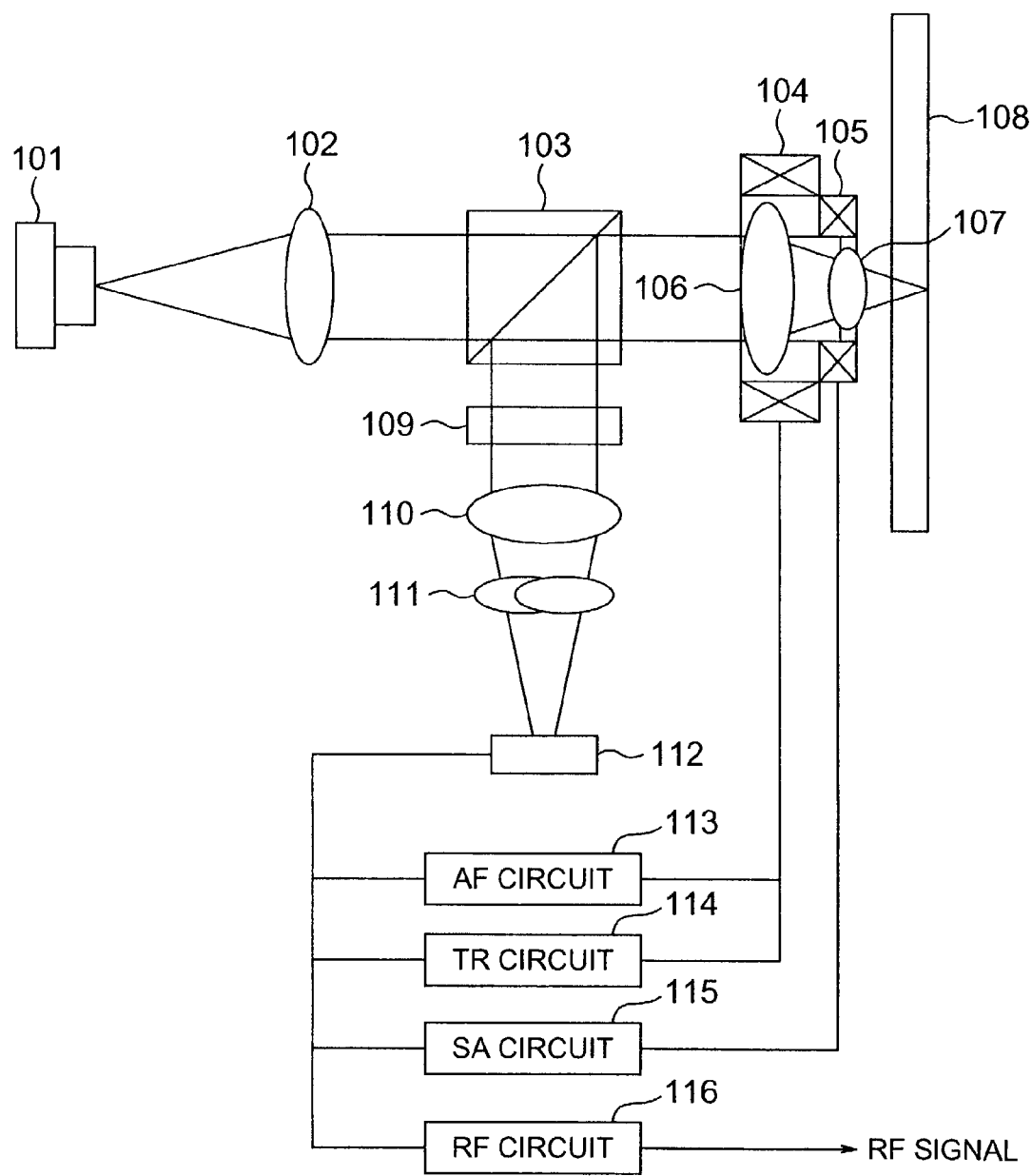
FIG. 1 is a diagram for indicating a basic embodiment mode of an optical disk apparatus according to the present invention.

FIG. 1 schematically shows a basic embodiment mode of an optical disk apparatus according to the present invention.

Light emitted from a semiconductor laser 101 is collimated into parallel light by a collimating lens 102, and this collimated light passes through a beam splitter 103, and then this collimated light is condensed over a base plate onto a recording film plane of an optical disk 108 by a two-group/two-sheet of objective lenses 106 and 107. The beam splitter corresponds to a first optical branching element as recited in a claim. In the two-group/two-sheet of objective lenses, a first lens 106 is mounted on a two-dimensional actuator 104 and is driven along both an optical axis direction and a radial direction of the optical disk. The second lens 107 is mounted on a spherical aberration correcting actuator 105 which is driven in combination with the first lens. While an interval between the two lenses is varied, spherical aberration is produced in response to this interval. Light reflected from the optical disk 108 is reflected on the beam splitter 103 to be entered into an optical separating hologram 109. Both light (not shown) located in the vicinity of an optical axis and light (not shown) located at a peripheral portion of the optical axis are separated along different directions, and both the separated light and light are entered via a cylindrical lens 111 into a photodetector 112 by a condenser lens 110. While the photodetector 112 owns a plurality of light receiving regions, a plurality of the above-described light are split and detected by the plural light receiving regions so as to be converted into optical currents. These optical currents are detected by a signal detecting circuit 113, a tracking error signal detecting circuit 114, a spherical aberration signal detecting circuit 115, and a reproduction signal detecting circuit 116 so as to be outputted as voltage signals, respectively. A focal shift signal is fed back as a drive signal of the two-dimensional actuator 106 along a focal-point direction so as to execute a control operation in such a manner that an optimum image point can be continuously focused onto the optical disk. A tracking error signal is fed back as a drive signal of the two-dimensional actuator 104 along a disk radial direction. A spherical aberration signal is fed back to the spherical aberration correcting actuator 105 in order to perform a control operation in such a manner that spherical aberration caused by a fluctuation in thicknesses of a base plate and also by a lens interval shift can be compensated. The reproduction signal detecting circuit 116 reproduces signals recorded on the optical disk by involving a current-to-voltage conversion, a waveform equalizing process operation, a binary process operation, and the like. In FIG. 1, the collimating lens 102 may be arranged between the beam splitter 103 and the first lens 106 by being commonly used with the condenser lens 109. Also, in order to improve a light utilization efficiency, a ¼-wavelength plate is positioned between the beam splitter 103 and the first lens 106, and this beam splitter 103 may be operated as a polarization beam splitter. In this embodiment, as the focal shift detecting system, the cylindrical lens 111 is arranged in order to indicate such a case that an astigmatism system is employed. However, for example, when a knife edge system and a beam size system is employed, the cylindrical lens 111 is no longer required. Also, in the case of the astigmatism system, such an element capable of producing astigmatism may be employed. For instance, the cylindrical lens 111 may be replaced by an inclined parallel flat plate. Also, in this embodiment mode, the spherical aberration signal is fed back to the interval of the two-group/two-sheet of objective lenses as the spherical aberration compensating mechanism. This compensating mechanism may be alternatively realized by mounting, for example, the collimating lens 102. Alternatively, while a liquid crystal variable phase modulating element driven by a voltage is employed, a wavefront may be directly modulated.

Figure 2:
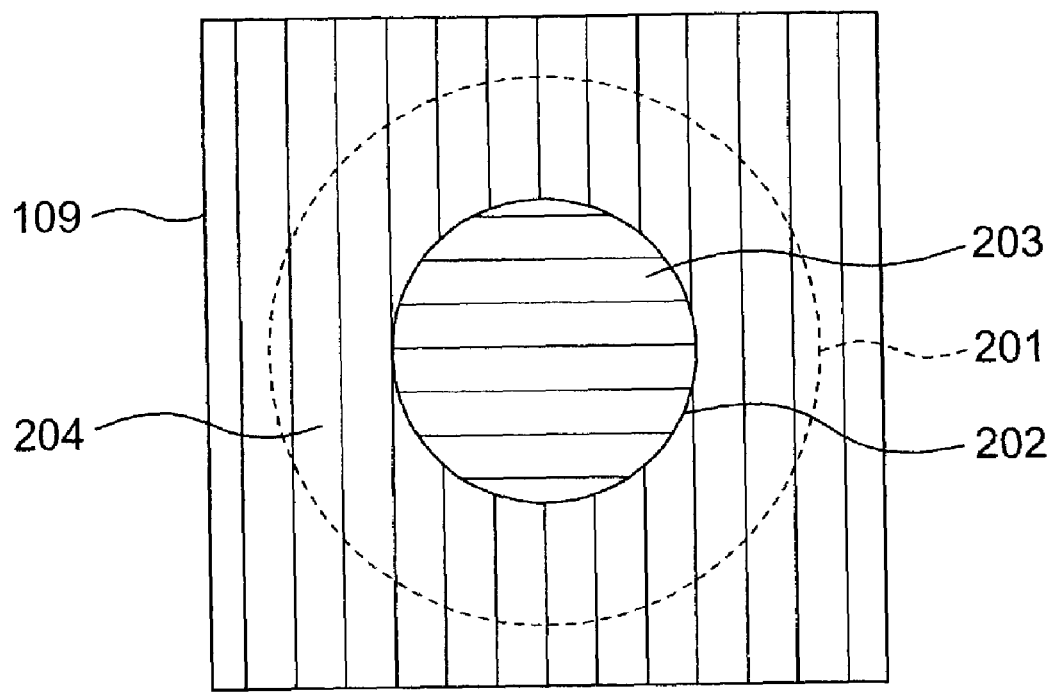
FIG. 2 is a schematic diagram for representing a pattern of an optical separating hologram employed in the embodiment mode of FIG. 1.

In FIG. 2, there is shown a schematic diagram of a pattern of the above-described optical separating hologram 109 employed in the embodiment mode of FIG. 1. A boundary 202 having such a radius is set in such a manner that light amounts of inner-sided/outer-sided regions may be made substantially equal to each other with respect to a diameter of an incident luminous flux 201. Within the inner-sided region 203 and the outer-sided region 204, directions of diffraction gratings are made different from each other. As a result, an inner side of the luminous flux and an outer side thereof are separated from each other, and then, the separated luminous flux is condensed onto the detector 112. In this case, such an example by the astigmatism system has been exemplified. For instance, in the knife edge system, as to such a region that at least one diameter for further subdividing the luminous flux by 2 is employed as a further boundary, the directions of the diffraction gratings may be made different from each other. When the beam size detecting system is employed, while the directions of the diffraction gratings are made different from each other in both the inner side and the outer side of FIG. 2, the diffraction grating may be replaced by a curved line grating.

Figure 3:
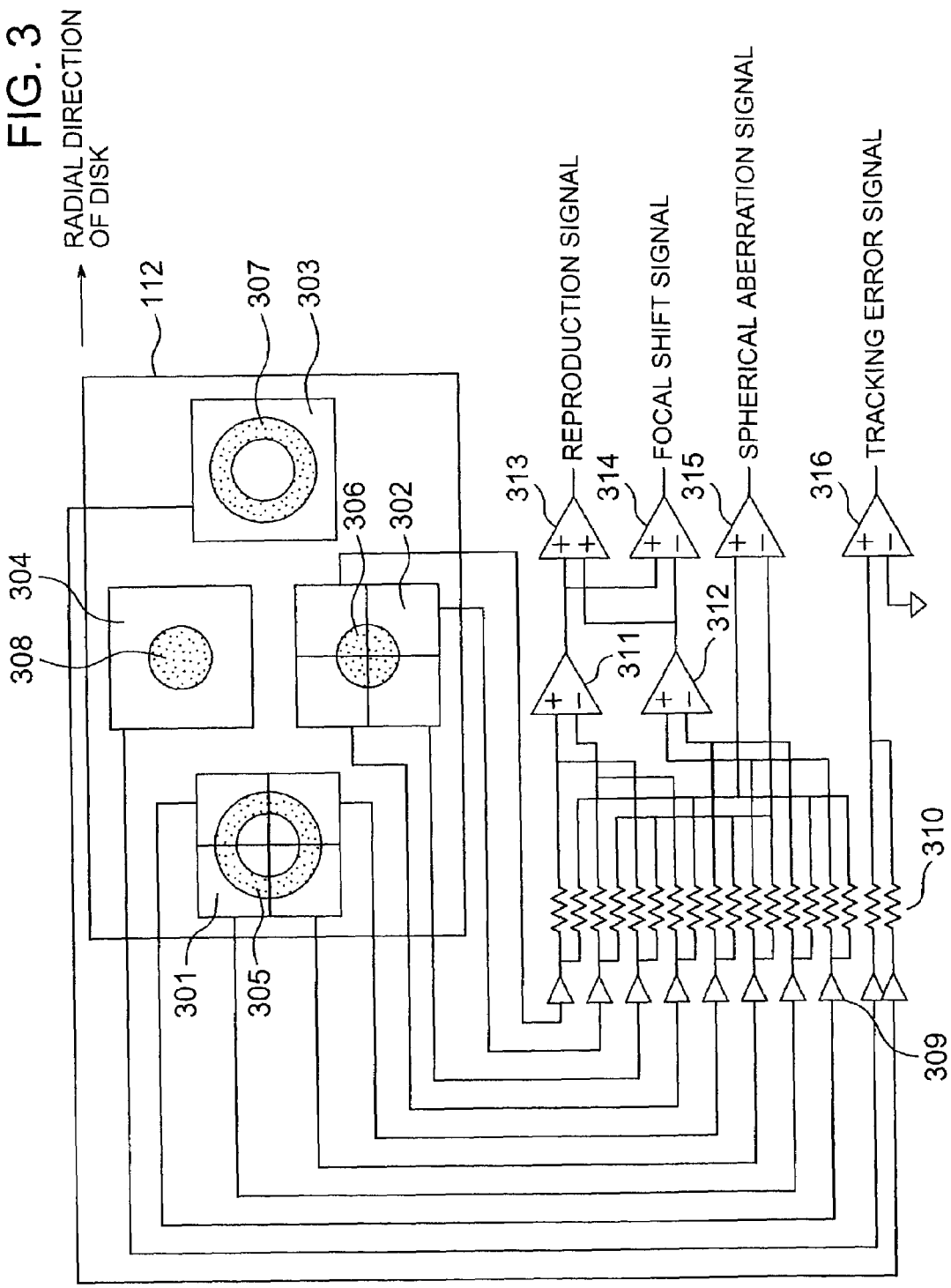
FIG. 3 is a diagram for showing a circuit calculation method and a pattern of a light receiving plane of a photodetector 112 employed in the embodiment mode of FIG. 1.

FIG. 3 is a schematic diagram which shows both a light receiving plane pattern of the photodetector 112, and a circuit calculation method in the embodiment mode of FIG. 1. This circuit calculation method may obtain a focal shift signal, a spherical aberration signal, a tracking error signal, and a reproduction signal from an output signal of this photodetector 112. The light which has been separated into both the inner side and the outer side of the luminous flux by the optical separating hologram 109 is received by four sets of light receiving regions 301, 302, 303, and 304. Among those light receiving regions, both outer-sided luminous flux first-order diffraction light 305 and inner-sided luminous flux first-order diffraction light 306 are received by the 4-split light receiving regions 301 and 302, whereas both outer-sided luminous flux first-order diffraction light 307 and inner-sided luminous flux first-order light 308 are received by the non-divided light receiving regions 303 and 304. Outputs of these light receiving regions are converted into voltages by a buffer amplifier 309. While using differential amplifiers 311, 312, 313, 314, 315, and 316 by proper gains which are determined by a resistor 310, these voltages are added/subtracted from each other. At this time, as to both the inner-sided luminous flux and the outer-sided luminous flux, after outputs from two sets of diagonal regions are added to each other, the added signals are subtracted from each other so as to obtain independent focal shift signals. Thereafter, since the focal shift signal of the inner-sided region is added to the focal shift signal of the outer-sided region, focal shift signals are obtained, and then, these focal shift signals are substracted from each other, so that a spherical aberration signal may be obtained. At this time, in such a case that a light amount ratio of the inner-sided subdivided region to the outer-sided subdivided region of the luminous flux is not uniform, while the resistor 310 is replaced by a variable resistor, the light amount ratio may be adjusted. A tracking error signal may be calculated in such a manner that while the push-pull system is employed, a difference is calculated between detection light amounts of light flux as to two regions which are obtained by subdividing the disk by the diameter of this disk along the radial direction thereof. In the normal push-pull system, a calculation is made of a difference in light receiving amounts of two regions which are subdivided by a diameter along a tangential direction. However, since the astigmatism focal shift detecting system is employed in the embodiment mode of FIG. 1, the direction of the luminous flux is rotated by 90 degrees in a least circle of confusion caused by the astigmatism, and then, a diffraction pattern caused by guide grooves of a disk appears along the tangential direction. As a consequence, the subdivision is performed by the diameter along the radial direction.

Figure 4:
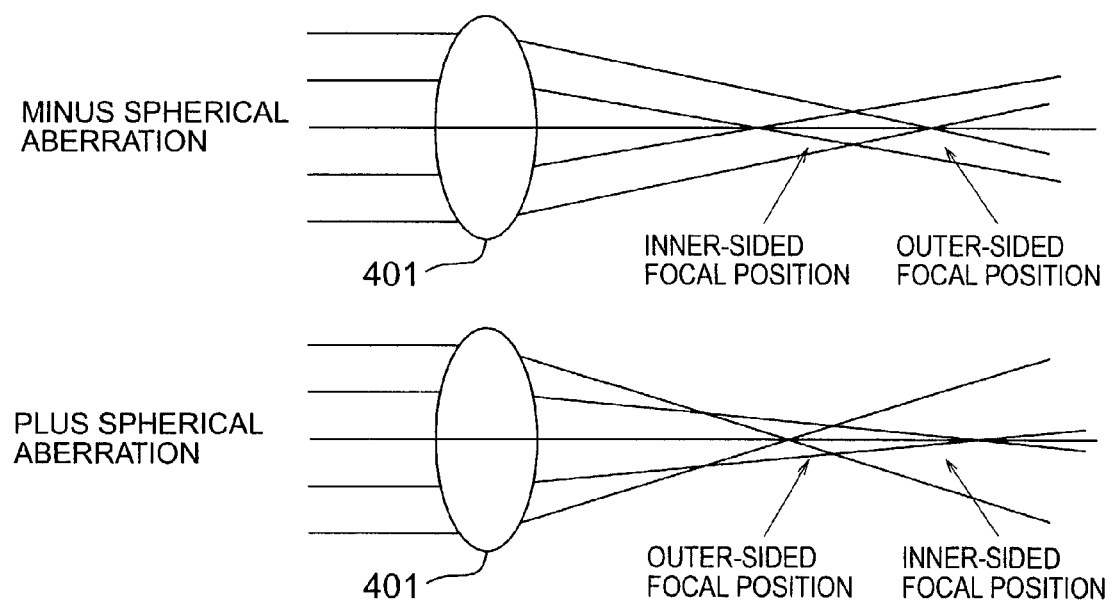
FIG. 4 is a diagram for explaining a principle detecting idea of spherical aberration.

Next, a detecting principle idea of spherical aberration will now be explained with reference to FIG. 4. When spherical aberration occurs, as indicated in this drawing, among light condensed by the lens 401, a position of a focal point as to light located near an optical axis is made different from a position of a focal point as to light located far from the optical axis. As a result, when the light is separated into an inner side and an outer side of a luminous flux, focal shift signals of the respective sides are shifted in connection with this positional sift of the focal points. As a consequence, a difference between the focal shift signal of the inner side of the luminous flux and the focal shift signal of the outer side thereof may represent spherical aberration. Also, in the above-described second prior art, since the luminous flux is separated into both the inner side and the outer side on the photodetector when the astigmatism focal shift is detected, the spherical aberration may be detected based upon the principle idea similar to that of the present invention. However, when the luminous flux is separated on the detector, in the case that the spherical aberration is large, the light on the inner side of the luminous flux is overlapped with the light on the outer side of the luminous flux, so that the light on the inner side of the luminous flux cannot be completely separated from the light on the outer side thereof, and furthermore, the signal is deteriorated by interference caused by the overlapped light. As a consequence, in accordance with the present invention, the luminous flux of the inner side is separated from the luminous flux of the outer side before being entered into the detector.

As will be explained with reference to drawings, a position of separating a luminous flux may be selected from several separation points, depending upon differences in effects. As a first separation point, a position between the first optical branching element and the photodetector may be conceived. In this case, while such a diffraction grating having no polarizing characteristic (namely, non-polarization diffraction grating) is employed, the luminous flux of the inner side may be preferably separated from the luminous flux of the outer side at different photodetector positions. At this time, since the phase of the diffraction grating is properly selected, in such a case that the light is not diffracted by 100%, but the zero-order light is lefted, such light which is not separated to the inner side and the outer side can be detected at the same time. For instance, when it is so assumed that this light corresponds to an RF signal, the light of the entire region of the luminous flux is detected without subdividing the photodetector. As a result, it is possible to avoid that noise produced from plural sets of current/voltage converting amplifiers is mixed. Also, as a second separation position, such a position between the first optical branching element and the objective lenses may be conceived. In this case, a polarizing diffraction grating may be preferably employed. Then, for example, since it is so arranged that the light is not diffracted in the luminous flux (luminous flux in going optical path) which is directed to the optical disk and the light is diffracted in the luminous flux (luminous flux in returning optical path) which is reflected from the optical disk to be returned, a loss in the light amount can be suppressed. As to the polarizing diffraction grating, compatibility between such a condition that the light is not diffracted in the luminous flux of the going optical path, and another condition to make such a construction that the zero-order light is left in the luminous flux of the returning optical path can be hardly established due to manufacturing aspect, and also precision of the film thickness can be hardly made, as compared with the non-polarization diffraction grating. However, this compatibility is not impossible in principle. Furthermore, in this case, the following structure may be realized. That is, the light is diffracted in the luminous flux of the going optical path, whereas the light is not diffracted in the luminous flux of the returning optical path. At this time, optical spots of a plurality of luminous flux to be separated are produced on the plane of the optical disk. If these optical spots are employed, then a tracking control signal may be obtained by a differential push-pull method (will be explained later). This differential tracking method may become advantage in the case that a track pitch is narrower than a diameter of an optical spot. Also, in addition, as a third separation position, a position between the semiconductor laser and the first optical branching element may be conceived. In this case, since the luminous flux reflected from the disk does not again pass through this separating element, the luminous flux of the inner side may be separated from the luminous flux of the outer side by employing the non-polarization diffraction grating. When the non-polarization diffraction gating is used, there are other merits that the diffraction efficiency can be freely selected, and at the same time, the cost of this non-polarization diffraction grating can be made cheaper than that of the polarizing diffraction grating. In this case, a plurality of optical spots caused by the diffracted luminous flux are formed on the optical disk. As previously explained, also in this case, there is a merit to employ the differential push-pull method in the case that a track pitch is made narrower than a diameter of an optical spot. As a fourth separation position, such a position may be conceived by that the first optical branching element is commonly used. In this case, there is a merit in such a case of a laser module in which both a semiconductor laser and a photodetector are mounted in the same package. In this case, a polarizing diffraction grating may be preferably employed as the optical branching element. Since the first optical branching element is commonly used with the polarizing diffractive grating, zero-order light which is not diffracted is returned to the semiconductor laser. As a result, while the light is not diffracted in the luminous flux of the going optical path, but is diffracted in the luminous flux of the returning optical path, all of such zero-order light may be diffracted without any remainder.

Also, since the luminous flux is separated to be detected, the aberration may be essentially reduced. Normally, as to aberration, an RMS value of wavefront aberration is directly employed as an evaluation index. If luminous flux is subdivided to restrict the subdivided luminous flux, then RMS wavefront aberration in each of the subdivided luminous flux may be decreased. As a consequence, it can be expected that a deterioration of a focal shift signal may be reduced, and also, an offset may be mitigated. Also, a symbol of spherical aberration in the below-mentioned description is defined as shown in drawings.

Figure 5:
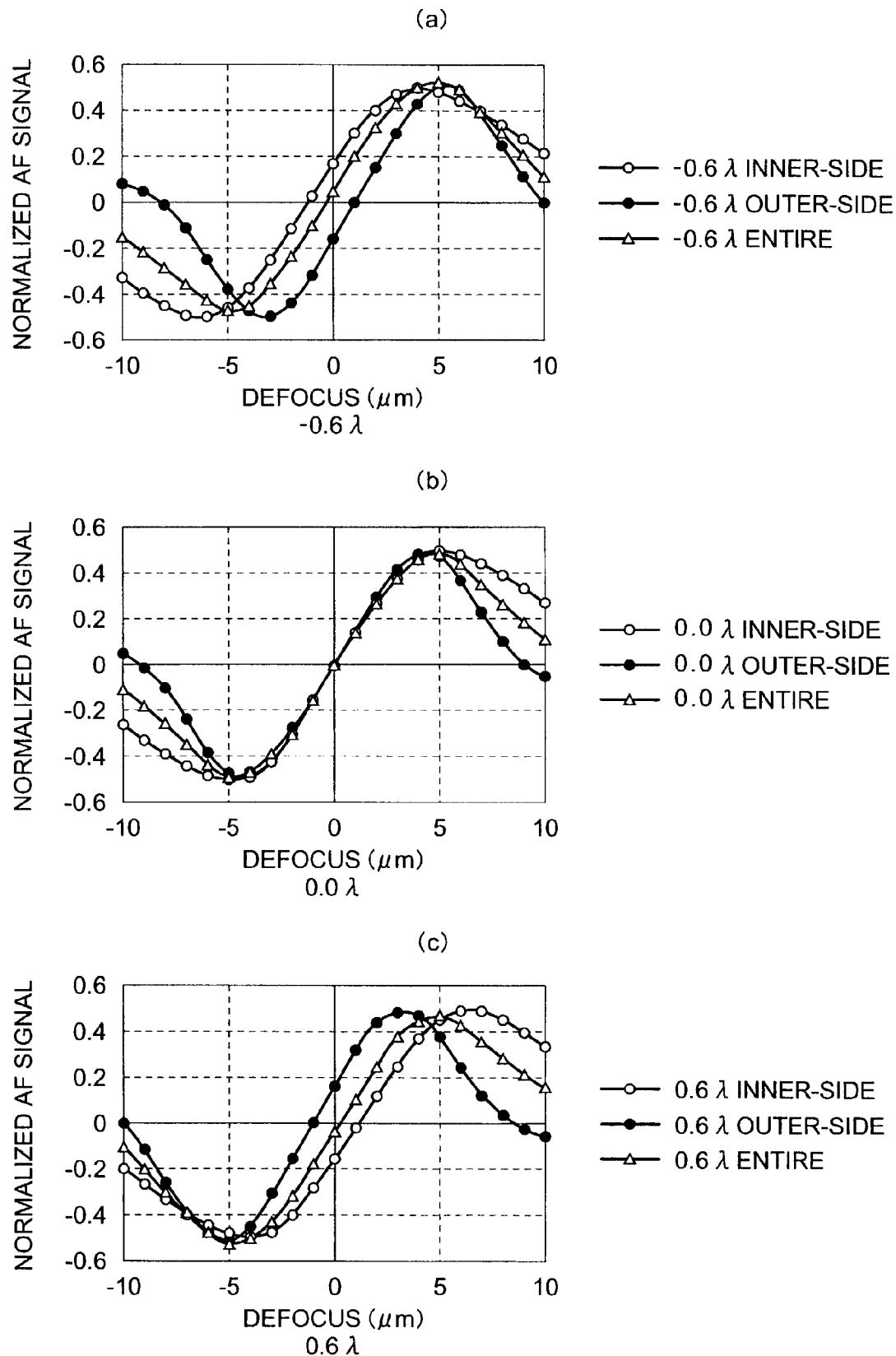
FIG. 5 is a diagram for representing a simulation of a separated luminous flux focal shift signal of the present invention based upon spherical aberration.

FIG. 5 represents a result obtained by that the principle detecting idea of spherical aberration according to the present invention could be confirmed by way of a simulation. This simulation was carried out in such a way that a light intensity distribution on the detector was calculated by the Fourier integrals based upon the scalar diffraction theory. The focal shift detecting system corresponds to the astigmatism method. As a calculation condition, a wavelength is 655 nm; a rim strength is 0.57; an NA of an objective lens is 0.6; an NA of a condenser lens in a detecting system is 0.088; astigmatism in the detecting system is 0.92 mm; a size of a four-split photodetector is 100 μm□; a width of a splitting line of the detector is 10 μm; and a diameter effective aperture ratio of a luminous flux boundary is 70.7%. An abscissa of the graph shows a focal shift amount of a spot on an optical disk, and an ordinate of the graph indicates a focal shift signal which is normalized by an amplitude. FIG. 5(a) shows that spherical aberration is expressed by −0.6λ by a wavefront aberration coefficient of Seidel. FIG. 5(b) indicates no aberration. FIG. 5(c) indicates such a case of +0.6λ, in which there are a signal produced only from an inner side of luminous flux, a signal produced from only from an outer side of the luminous flux, and a signal produced by detecting the entire sides of the luminous flux at the same time. It can be seen that the focal shift signals of the inner/outer sides of the luminous flux are shifted.

Figure 6:
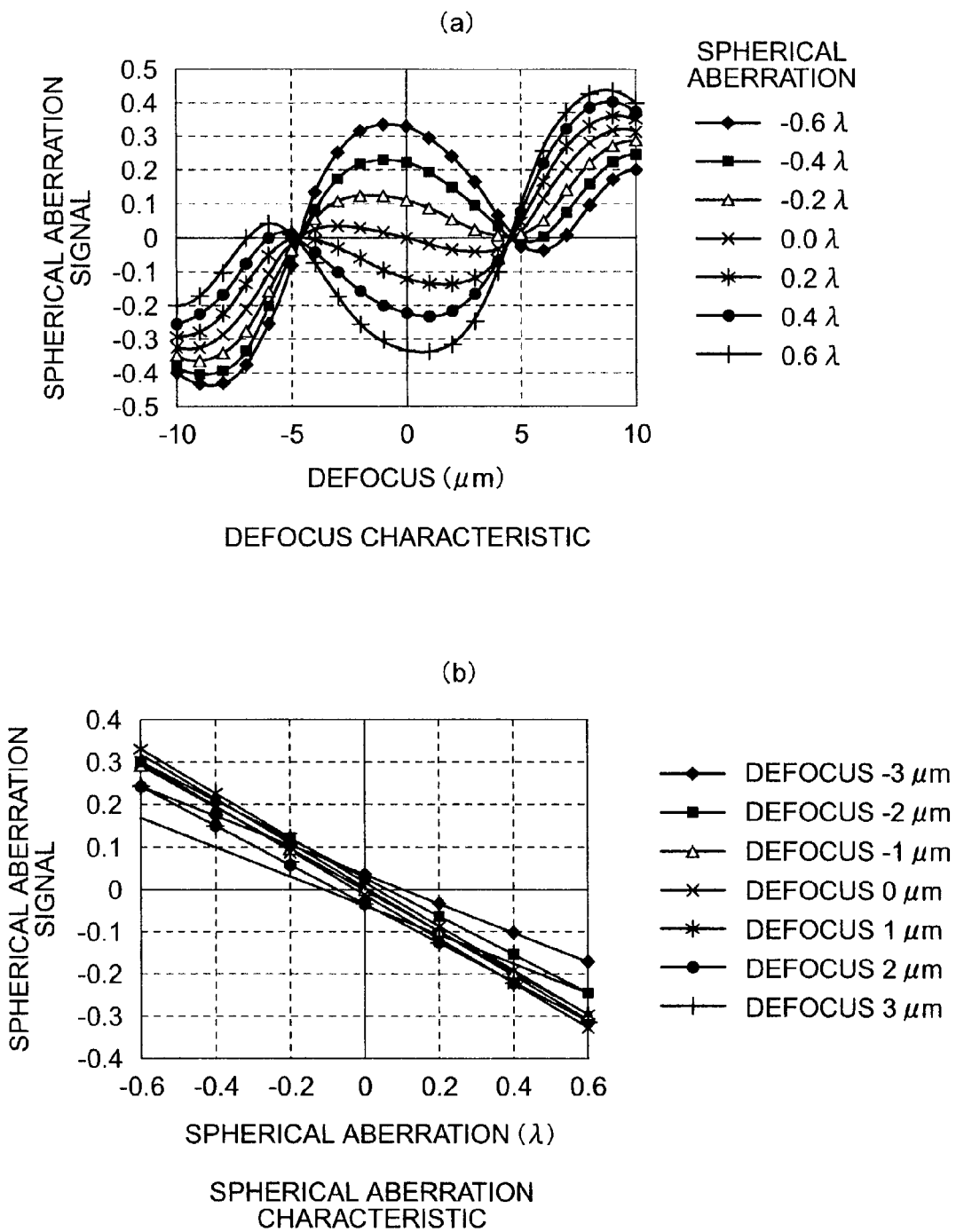
FIG. 6 is a diagram for indicating a simulation of a spherical aberration signal according to the present invention.

FIG. 6 shows a calculation result obtained by calculating the spherical aberration signal in the present invention with employment of this result. In FIG. 6(a), an abscissa indicates a defocus amount on an optical disk, and an ordinate represents a spherical aberration signal while spherical aberration is changed. It can be seen that while a focusing position is set as a center, a signal which is directly proportional to spherical aberration is obtained within a range between approximately +3 μm and approximately −3 μm. In FIG. 6(b), an abscissa shows spherical aberration, and an ordinate indicates a spherical aberration signal while a defocus amount is changed. When a defocus phenomenon appears, an offset is slightly applied to the spherical aberration signal. However, it may be recognized that such a signal can be detected which is directly proportional to the spherical aberration under substantially better condition.

Figure 7:
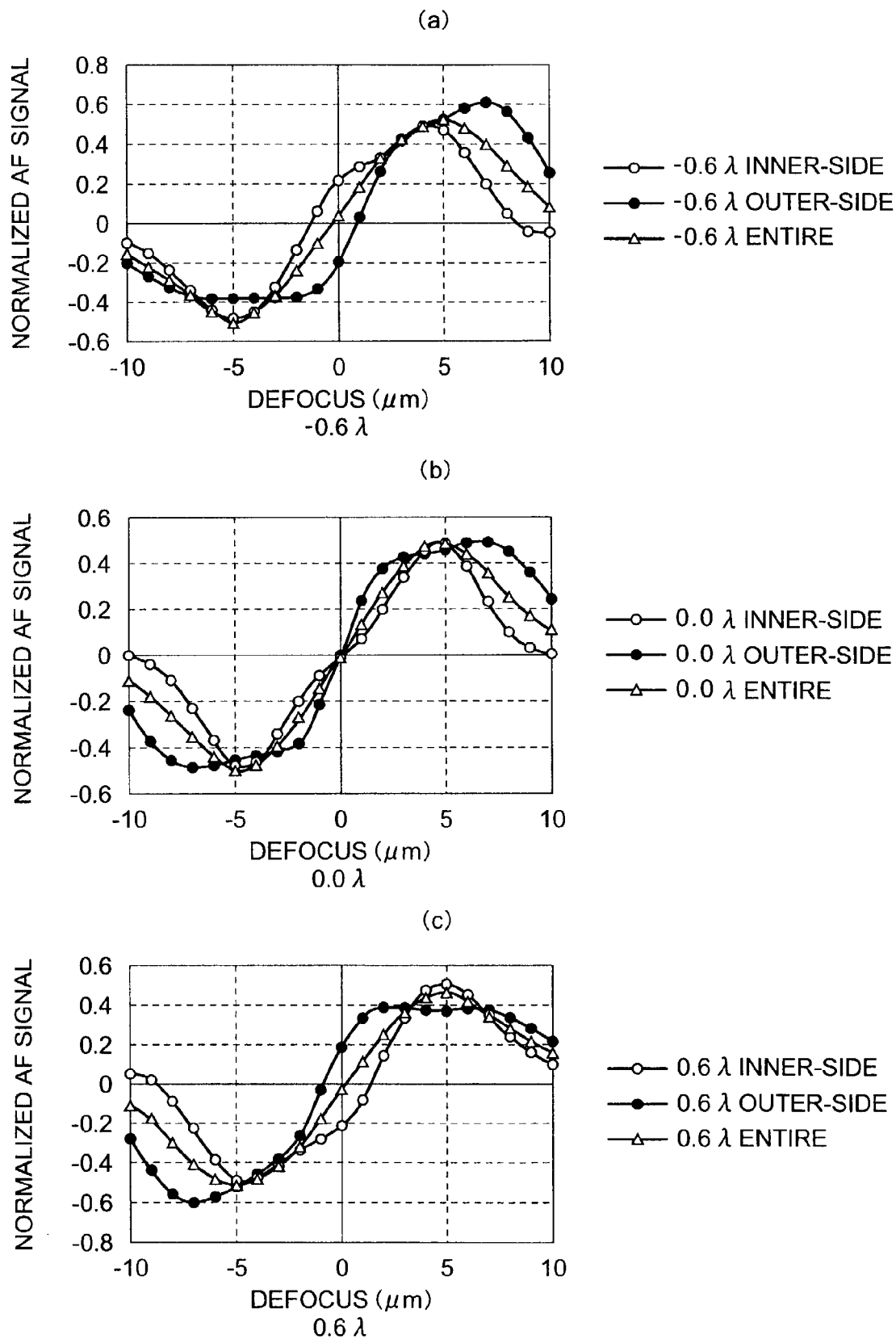
FIG. 7 is a diagram for representing the simulation of the separated luminous flux focal shift signal of the prior art based upon spherical aberration.

In comparison with the present invention, FIG. 7 indicates a result obtained by that an inner-side region and an outer-side region of luminous flux are subdivided not in the luminous flux, but on a detector in accordance with the second prior art, and then, focal shift signals of the respective divided regions are calculated. It can be seen that waveforms of the focal shift signals are considerably deteriorated, as compared with those of FIG. 5. In particular, when there is spherical aberration, offsets in DC manners are produced in both the inner-side region and the outer-side region.

Figure 8:
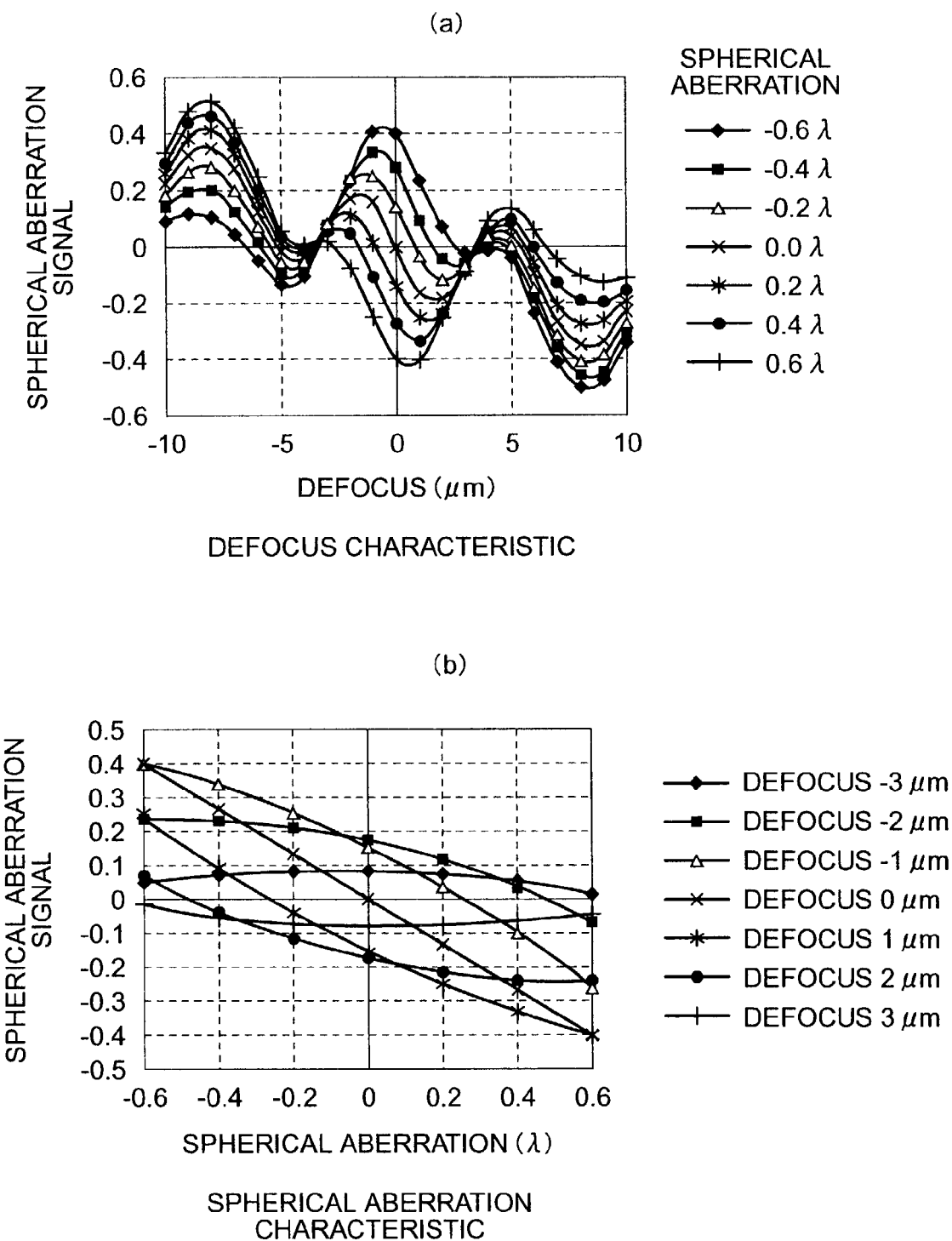
FIG. 8 is a diagram for indicating the simulation of the spherical aberration signal in the prior art.

FIG. 8 shows a calculation result obtained in such a manner that a calculation similar to FIG. 6 is carried out based upon the prior art, while luminous flux is subdivided on the detector. It can be seen that the spherical aberration signal is rapidly changed with respect to the defocusing phenomenon, as compared with that of FIG. 6. As a result, as shown in FIG. 6(b), it can also be understood that a sensitivity of a signal with respect to spherical aberration is rapidly lowered due to the defocusing phenomenon, and a DC offset is increased.

Figure 9:
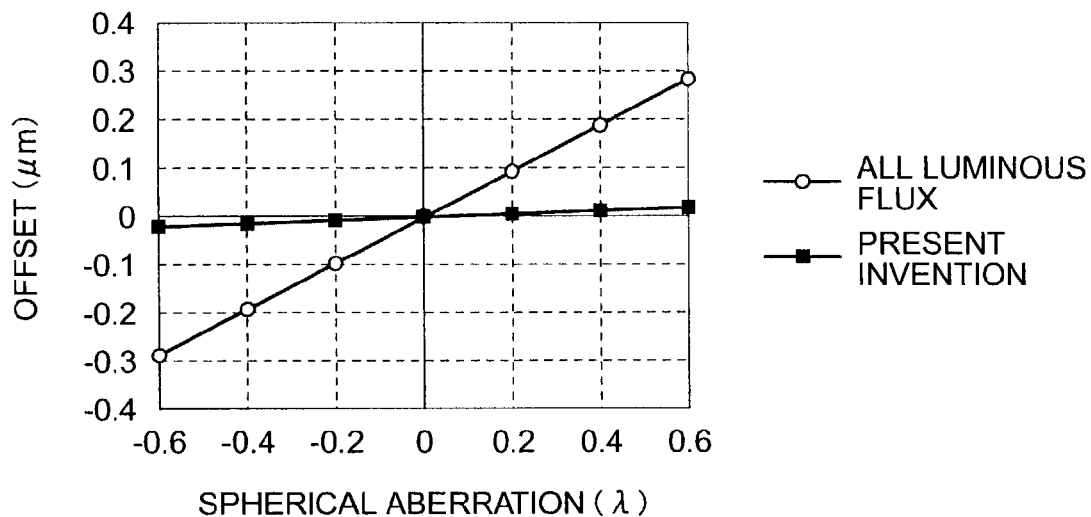
FIG. 9 is a diagram for showing a spherical aberration signal according to the present invention.

FIG. 9 represents a calculation result of offsets of a focal shift signal with respect to spherical aberration. It can be seen that as to all luminous flux, an offset of a focal shift signal is increased due to spherical aberration. However, it can be seen that when an inner side of the luminous flux and an outer side of the luminous flux are separated from each other to be detected in accordance with the present invention, an offset is extremely decreased.

Figure 10:
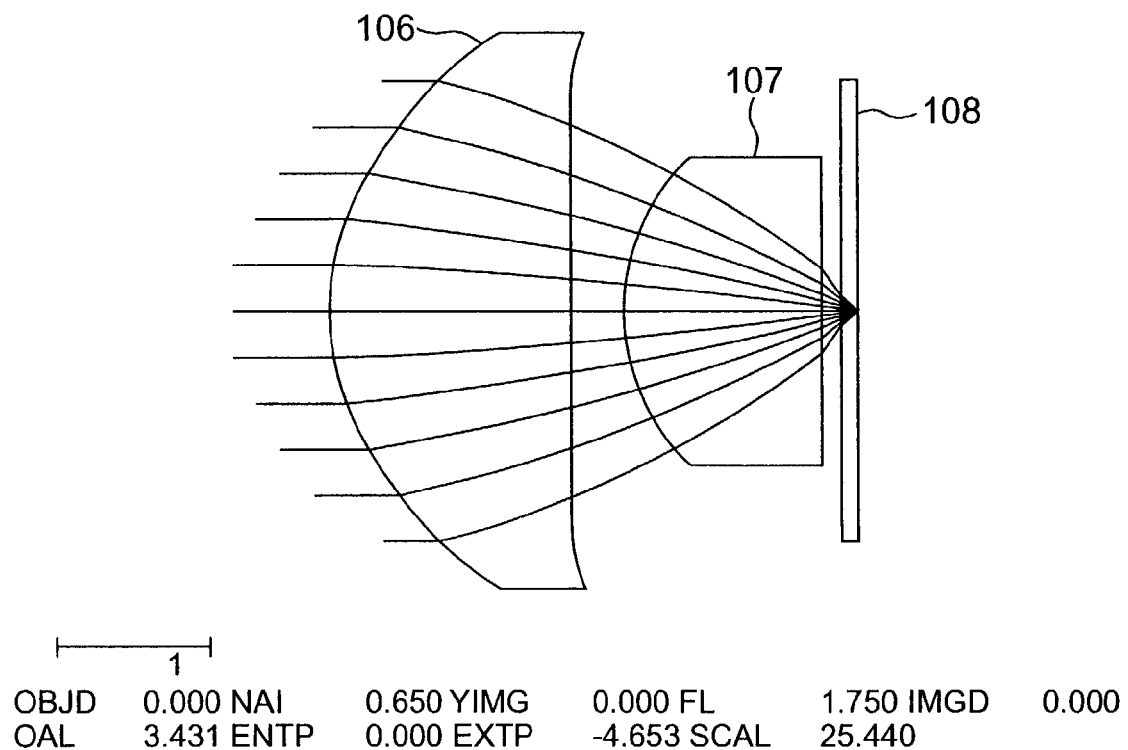
FIG. 10 is a diagram for representing a model of a two-lens calculation example using the prior art.

FIG. 10 indicates a calculation model used to confirm a compensation effect of a two-sheet lens capable of compensating detected spherical aberration by a lens interval. This is the lens shape indicated in the above-described first prior art, and is a two-group/two-sheet of objective lenses having a wavelength of 410 nm, and an NA of 0.85. A thickness of the disk base plate 108 is 0.1 mm.

FIG. 11 indicates a plane shape of this lens. Plane numbers are sequentially ordered from the left side of FIG. 10.

Figure 12:
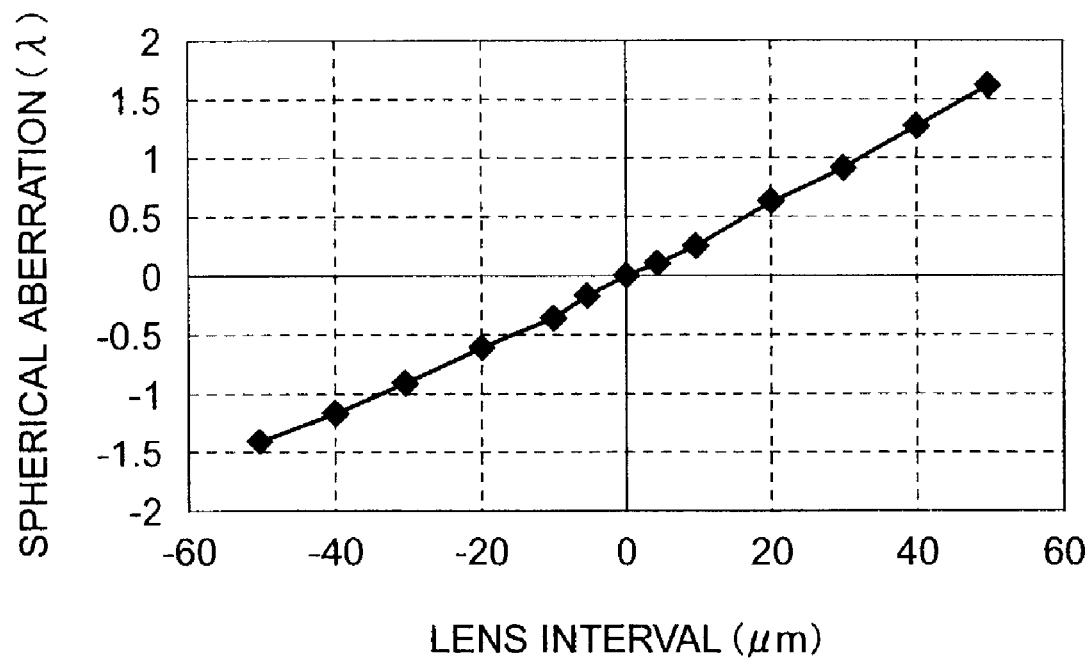
FIG. 12 is a diagram for showing a change in spherical aberration caused by a two-lens interval.

FIG. 12 shows a calculation result of spherical aberration which occurs when an interval between lenses is changed. An ordinate of this drawing shows a spherical aberration coefficient of Seidel which is expressed in the unit of a wavelength. It can be seen that the spherical aberration is changed based upon an interval between planes.

(Embodiment 2)

Figure 13:
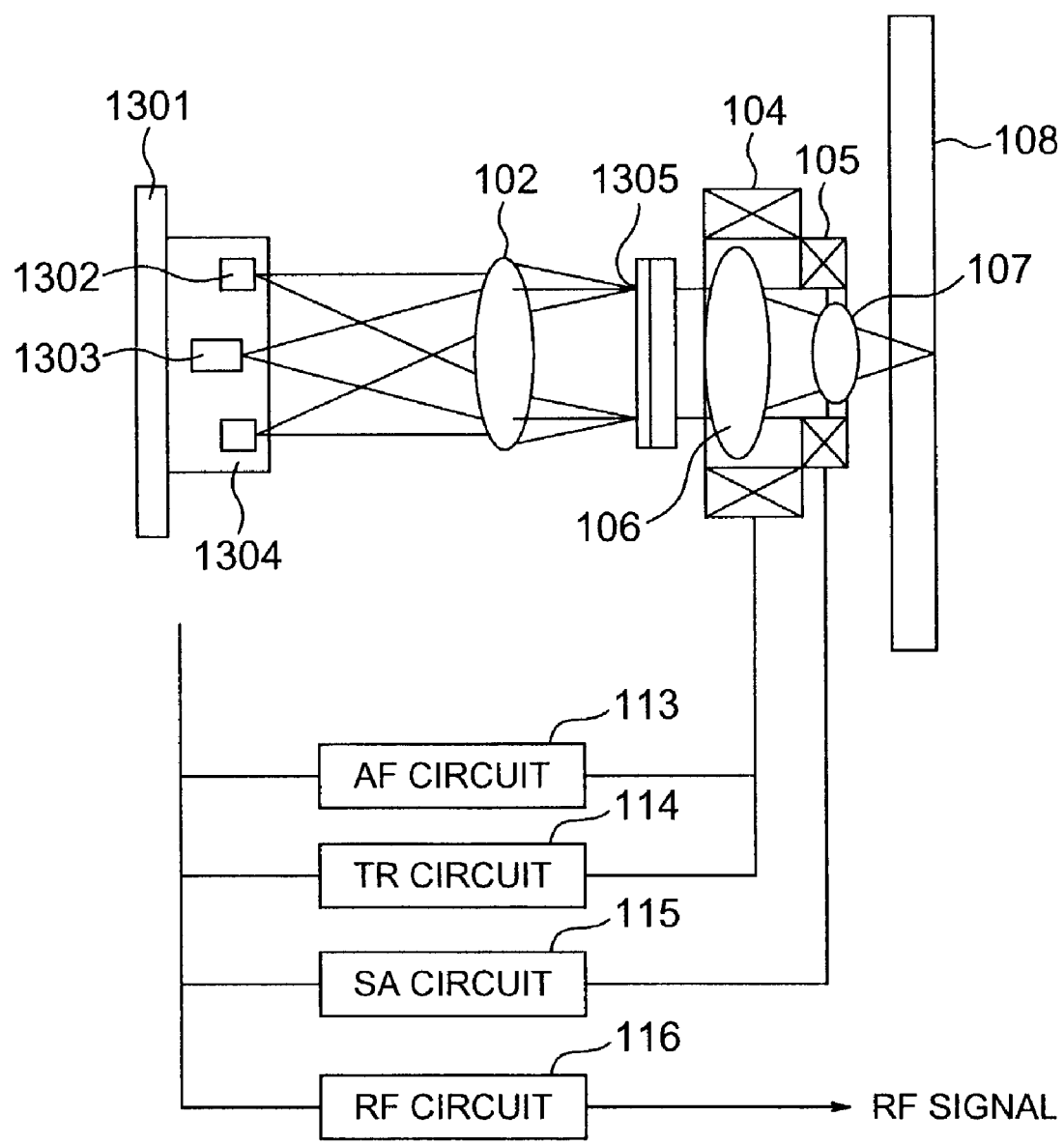
FIG. 13 is a diagram for indicating an optical disk apparatus according to an embodiment mode in the case that two optical branching elements are constructed in an integral form.

FIG. 13 shows on optical disk apparatus according to an embodiment of the present invention in the case that both a first optical branching element and a second optical branching element are formed in an integral form. In this embodiment, a semiconductor laser 1303, and both a photodetector 1302 and another photodetector 1304 are constructed in a single package 1301 in an integral form. The two optical branching elements constitute a composite optical branching element 1305 in which both a ¼-wavelength plate and a polarizing diffraction grating are formed in an integral form. The composite optical branching element 1305 is operated in such a manner that a polarizing diffraction grating provided on an incident side is not actuated as to polarized light entered from the semiconductor laser, but this polarized light is converted into circularly polarized light by a ¼-wavelength plate provided on the projection side. Also, light reflected on the optical disk 108 is again entered into the ¼-wavelength plate so as to be converted into linearly polarized light, the polarization direction of which is rotated by 90 degrees, as compared with that when the light is emitted from the semiconductor laser, and then, this linearly polarized light is entered into the polarizing diffraction grating. At this time, a phase shift of the diffraction grating is effected to the linearly polarized light, so that this linearly polarized light is diffracted. Then, the diffracted light is condensed to the photodetectors 1302 and 1304 by the collimating lens 102. As previously indicated, as to a pattern of the polarizing diffraction grating, in the case that the astigmatism system is employed as the focal shift detecting system, a curved line diffraction grating may be employed which diffracts light along a direction of a detector and at the same time, causes astigmatism. As a light receiving plane pattern of the photodetector, the semiconductor laser 1303 may be arranged in such a manner that a light emitting point of a laser is positioned at a center of FIG. 3. For example, if silicon is employed as a substrate of a photodetector, then a mirror inclined at 45 degrees can be readily formed by way of an anisotropic etching. As a result, if laser light emitted from a semiconductor laser is raised by employing this mirror, then both the semiconductor laser and the photodetector may be made compact in an integral body by merely arranging the photodetector at a peripheral portion of the semiconductor laser.

(Embodiment 3)

Figure 14:
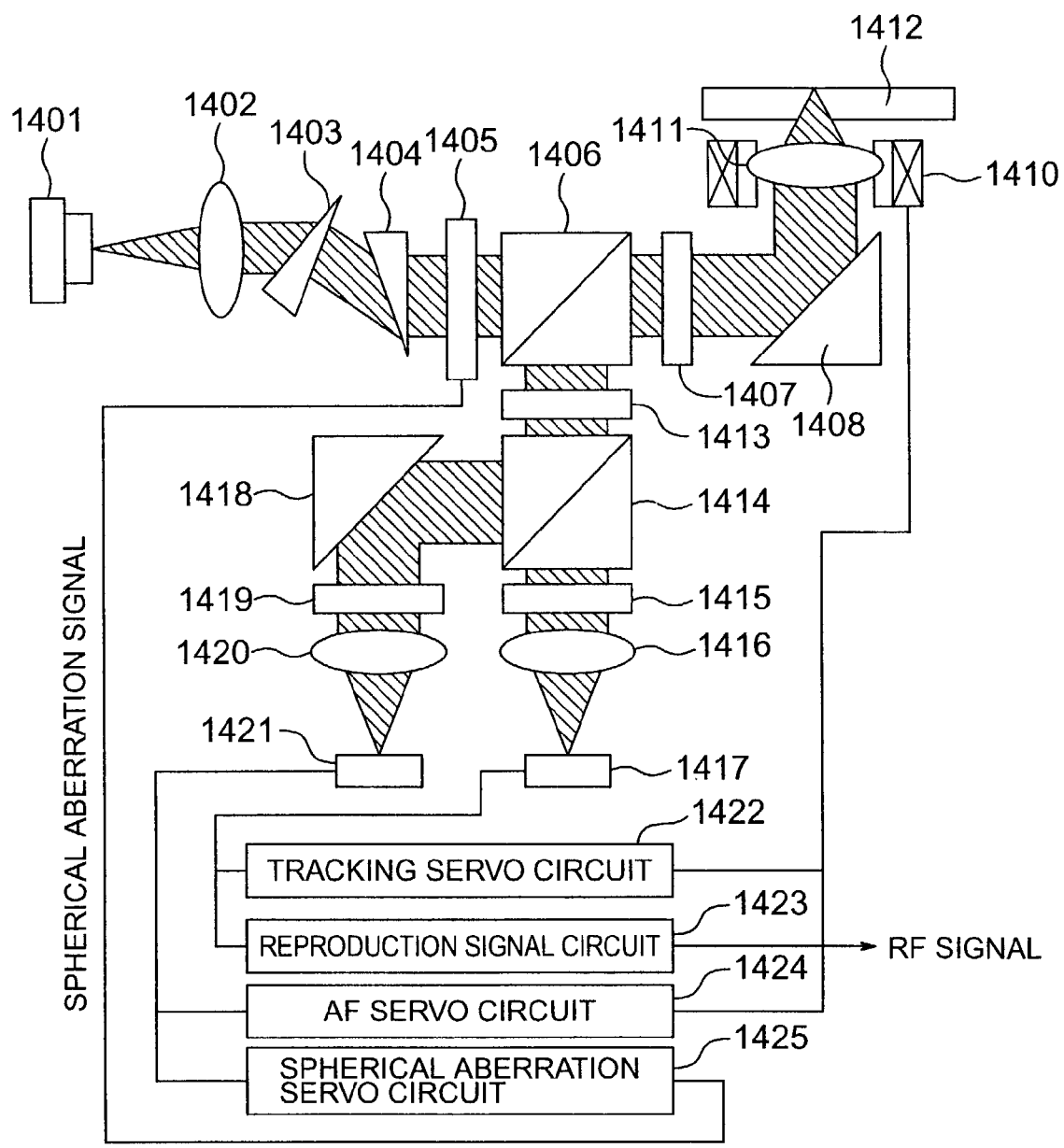
FIG. 14 is a diagram for showing an optical disk apparatus according to another embodiment mode of the present invention.

FIG. 14 shows an optical disk apparatus according to a further embodiment mode. While light emitted from a semiconductor laser 1401 is collimated by a collimating lens 1402 into parallel light and also an ellipse-shaped beam of an intensity distribution is converted into a circular beam by beam forming prisms 1403 and 1404, spherical aberration is added by a liquid crystal phase compensating element 1405. The liquid crystal phase compensating element 1405 corresponds to such a compensating element that liquid crystal is sandwiched by two base plates on which transparent electrodes are patterned, and a phase of penetration light can be changed by applying an AC voltage to the transparent electrodes. The transparent electrodes are separated into a plurality of regions in correspondence with a wavefront shape of spherical aberration, and voltages are applied in such a manner that phase differences are lowered in the respective regions. The light which has passed through the liquid crystal is penetrated through a polarization beam splitter 1406, a ¼-λ (wavelength) plate 1407, a raising mirror 1408, and an objective lens 1411, and then, is condensed onto an optical disk 1412. The objective lens 1411 is mounted on an actuator 1410 so as to perform a focus control operation and a tracking control operation. Light reflected from the optical disk 1412 is returned via the same optical path up to the polarization beam splitter 1406, and then, this reflection light is reflected on this polarization beam splitter 1406 to be entered into the ½-λ plate 1413. This ½-λ plate 1413 is employed in the case that a separation ratio of luminous flux at the next polarization beam splitter 1414 is controlled by rotating the ½-λ plate 1413 around the optical axis thereof. The light which has passed through the polarization beam splitter 1414 is used to detect a tracking signal by the diffraction grating 1415 in such a way that the luminous flux is subdivided into four sets of this luminous flux by diameters thereof along a radial direction and a tangential direction, and then, the four-divided luminous flux is entered into the photodetector 1417. Since output signals of this photodetector 1417 are calculated by a tracking servo circuit 1422 and a reproduction signal circuit 1423, both a tracking signal and a reproduced RF signal are detected. The tracking signal is fed back to the actuator 1410 in combination with a focal shift signal (will be explained later). On the other hand, the light reflected on the polarization beam splitter 1414 is reflected by a reflection mirror 1418, luminous flux is subdivided by a diffraction grating 1419, and then, the subdivided luminous flux is condensed onto a photodetector 1421 by a condenser lens 1420. Based upon output signals from the photdetector 1421, a focal shift signal is detected by an AF servo circuit and a spherical aberration signal is detected by a spherical aberration servo circuit. Then, the focal shift signal is fed back to the actuator 1410, and the spherical aberration signal is fed back to the liquid crystal phase compensating element 1405. In this case, different from the previous embodiment mode, as to such a case that the knife edge method is employed so as to detect a focal point, both structures of the diffraction grating 1419 and of the photodetector 1421 will now be explained.

Figure 15:
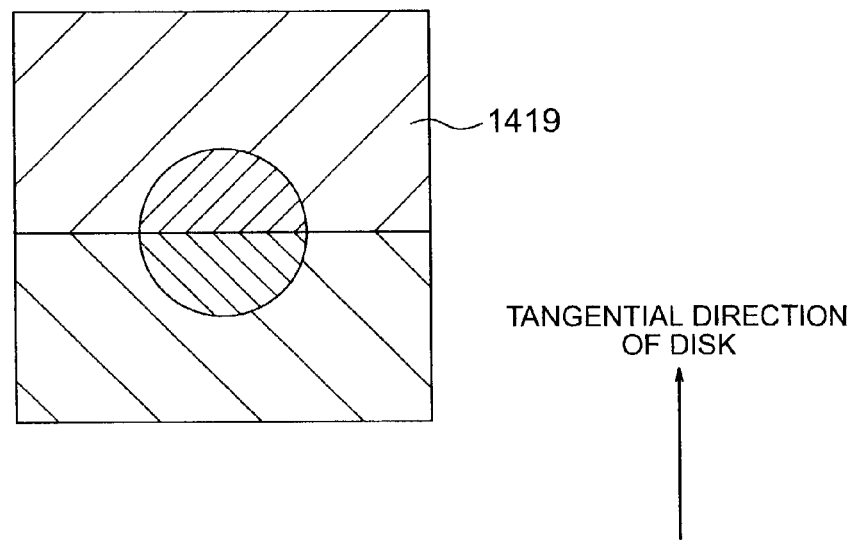
FIG. 15 is a diagram for explaining a diffraction grating of FIG. 14.

FIG. 15 shows an embodiment mode of the diffraction grating 1419. This diffraction grating 1419 separates luminous flux into an inner side and an outer side of the luminous flux, and at the same time, subdivides luminous flux reflected from an optical disk as to a diameter of a radial direction of the optical disk so as to detect the inner-sided luminous flux and the outer-sided luminous flux, separately, so that this diffraction grating may independently detect a focal point error signal caused by the inner-sided luminous flux, and another focal point error signal caused by the outer-sided luminous flux.

Figure 16:
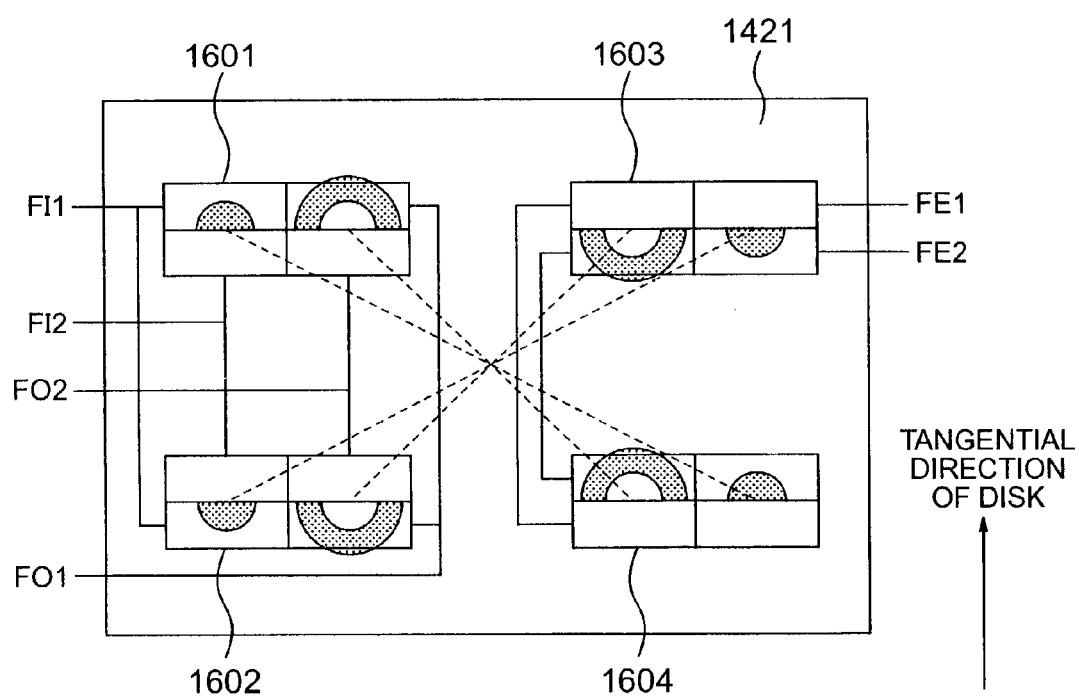
FIG. 16 is a diagram for explaining a photodetector of FIG. 14.

FIG. 16 represents the photodetector 1421 and diffraction light which is entered into the photodetector 1421 and is diffracted by the diffraction grating 141. For the sake of convenience, the diffraction light indicates such a case that a focal shift is present, and zero-order light is not indicated in this drawing. In order that substantially no zero-order light is produced, a depth of gratings of the diffraction grating 1419 may be easily adjusted. Alternatively, while such a zero-order light is produced, the light receiving portion is located also at a center portion, and thus, a total light amount may be detected. In this case, the diffraction light is received by four-split optical detecting regions 1601, 1602, and also two-split optical detecting regions 1603, 1604. Since output signals derived from the four-split optical detecting regions 1601 and 1602 are detected in such a manner as shown in this drawing, and these detected signals are calculated in such a manner as shown in a lower portion of this drawing, a spherical aberration signal SAS may be detected. In order to compensate for adverse influences caused by a fluctuation in intensity distributions of the semiconductor laser, the inner-sided focal shift signal is multiplied by a gain "G" in a subtraction calculation between the outer-sided focal shift signal and the inner-sided focal shift signal. A focal shift signal "FES" may be obtained by similarly calculating output signals derived from the two-split optical detecting regions 1603 and 1604 in a calculation manner as shown in this drawing. In this case, the separate diffraction light has been employed. Alternatively, as apparent from the foregoing description, the focal shift signal may be obtained by adding the inner-sided focal shift signal to the outer-sided focal shift signal. In the above-described detecting system, with employment of the knife edge method, in the case that an optical spot on the disk plane is brought into the focusing condition, an optical spot on the photodetector is also focused. As a result, in the case that this detecting system is applied to, for example, a two-layer disk and the like, a size of a light receiving plane is designed to be properly a small size, so that a crosstalk phenomenon caused by another layer can be reduced.

Figure 17:
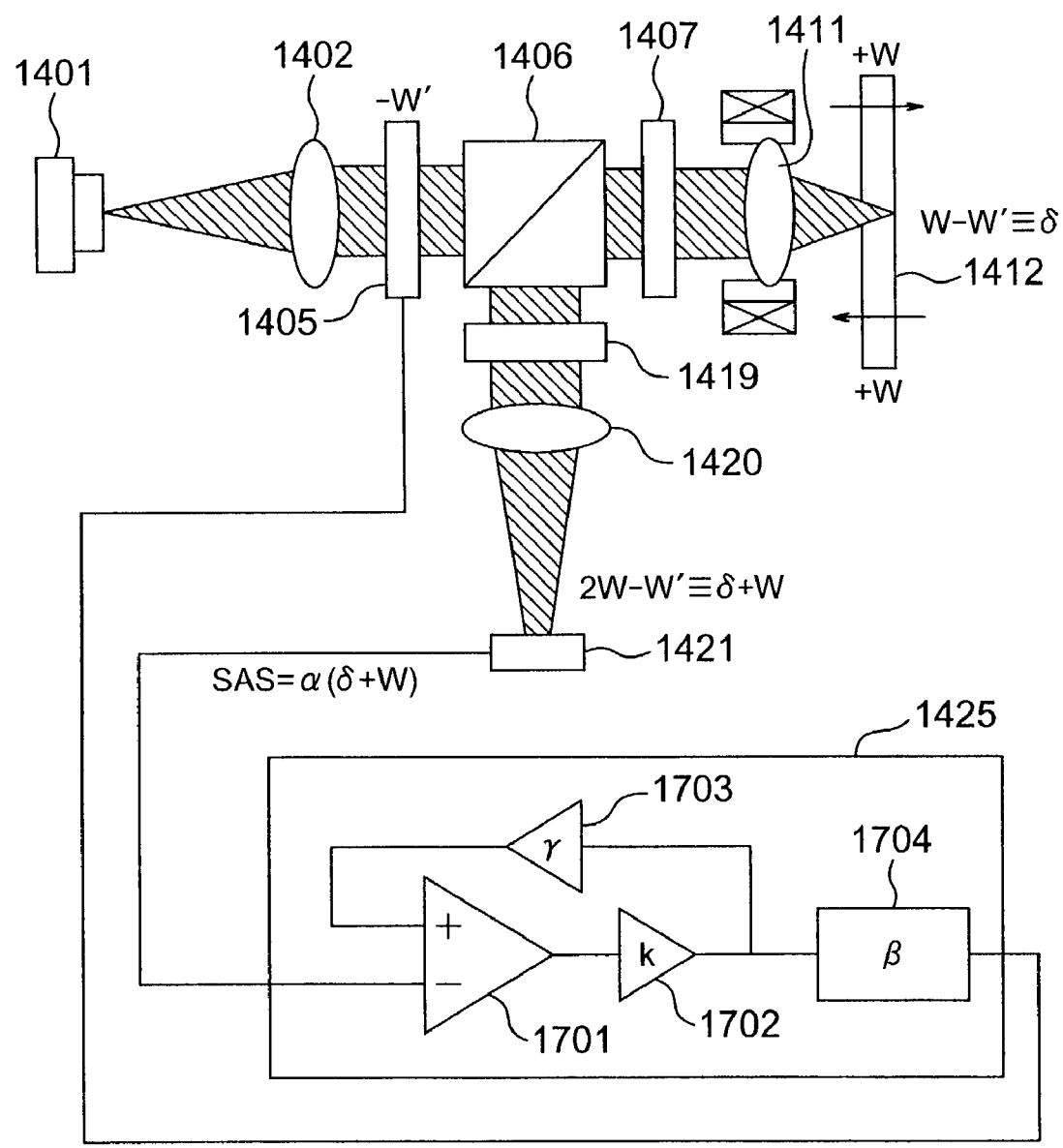
FIG. 17 is a diagram for explaining a spherical aberration compensating system of FIG. 14.

In this embodiment mode shown in FIG. 14, since the liquid crystal phase compensating element is effected only in the optical path of the light directed to the optical disk, the spherical aberration to be compensated does not give the compensating effect only in one way. However, the spherical aberration which is caused by the thickness error of the base plate of the optical disk will occur not only in the incident light, but also in the reflection light. As a result, the spherical aberration which is detected by the photodetector may occur in the reciprocative optical path. As a consequence, when the control operation is carried out in such a manner that the liquid crystal phase compensating element is directly driven by the spherical aberration signal so as to reduce the spherical aberration of the detected luminous flux to zero, there is such a problem that the spherical aberration of the focal point on the disk plane is excessively corrected. This problem may similarly occur even when the liquid crystal phase compensating element is interposed between the polarization beam splitter 1406 and the objective lens 1411. This is because the phase difference is normally added only by the linearly polarized light along a specific direction in the liquid crystal phase compensating element. In such a case that optical isolation achieved by the ¼-λ plate 1407 and the polarization beam splitter 1406 is not employed, the phases may be added in the reciprocative luminous flux by the liquid crystal phase compensating element. However, an optical utilization efficiency may be lowered. In such a case, a schematic diagram of a control system is shown in FIG. 17, while this control system may compensate for spherical aberration of an optical spot on a focal plane. In this drawing, an optical system is indicated in a simple manner. In such a case that spherical aberration W' is effected by the liquid crystal phase compensating element 1405, and spherical aberration W of a going optical path is effected due to a thickness shift of a base plate of an optical disk, spherical aberration of a focal point on a plane of the optical disk becomes W−W'=δ. Then, since spherical aberration is furthermore effected also to luminous flux of a returning optical path, spherical aberration of luminous flux at a position of the photodetector 1421 becomes 2W−W'=δ+W. It is so assumed that this spherical deviation is detected by the detecting system as such a spherical aberration signal of SAS=α(δ+W). In this formula, symbol "α" shows a gain of the detecting system, and is normally assumed as a negative gain due to a feedback control operation. This signal is inputted into a differential amplifier 1701, and a difference signal between the previous signal and the feedback signal is furthermore amplified by a multiplication factor of "k" by an amplifier 1702. This signal is amplified by a multiplication factor of "γ" by an amplifier 1703, and the amplified signal is used as the previous feedback signal, and at the same time, is entered into a liquid crystal drive circuit 1704. Thus, spherical aberration −W' which is added by the previously-shown liquid crystal phase compensating element 1405 is equal to a value obtained by multiplying the input signal to the liquid crystal drive circuit by "β". At this time, the below-mentioned expression 1 can be established:

$$k\left(SAS - \gamma \frac{-W'}{\beta}\right) = \frac{-W'}{\beta} \quad \text{(Expression 1)}$$

As a result, the following expression 2 may be conducted:

$$\delta = W - W' = \frac{1 + k(\alpha\beta + \gamma)}{1 - k(\alpha\beta - \gamma)} W \quad \text{(Expression 2)}$$

As a consequence, since the gain "γ" is controlled in such a manner that the following expression 3 may be established:

$$\gamma = -\alpha\beta \quad \text{(Expression 3),}$$

the below-mentioned expression 4 may be obtained:

$$\delta = \frac{1}{1 - 2k\alpha\beta} W \to 0 (k \to \infty) \quad \text{(Expression 4)}$$

When the gain "k" is sufficiently large, the spherical aberration "δ" on the disk plane can be approximated to zero.

(Embodiment 4)

Figure 18:
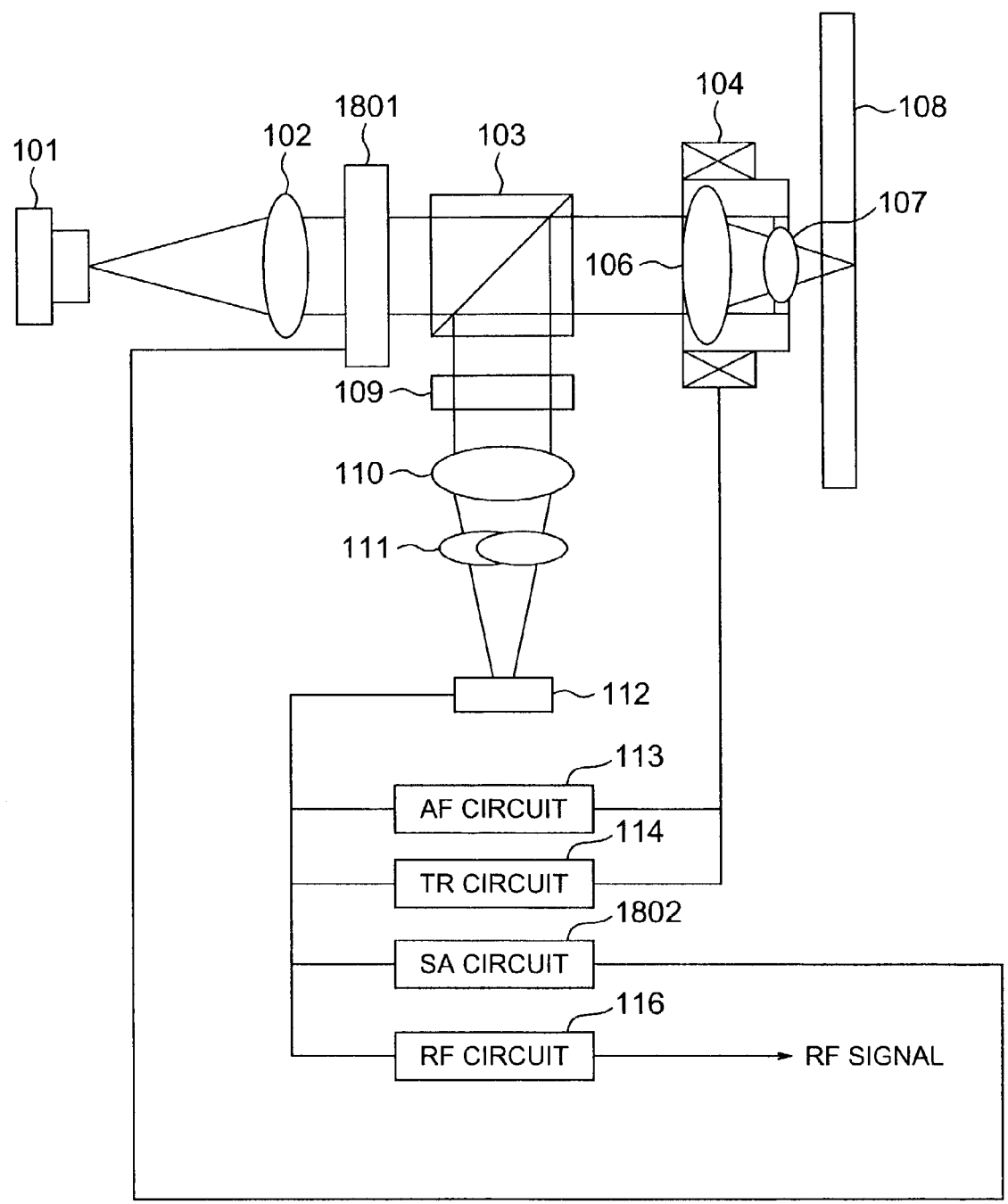
FIG. 18 is a diagram for showing an optical disk apparatus in which a spherical aberration compensating mechanism compensates an aberration amount of incident light, according to an embodiment mode of the present invention.

FIG. 18 is an optical disk apparatus according to another embodiment mode of the present invention.

Light emitted from a semiconductor laser 101 is collimated into parallel light by a collimating lens 102, and this collimated light passes through a beam splitter 103 via spherical aberration correcting actuator 1801 and then this collimated light is condensed over a base plate onto a recording film plane of an optical disk 108 by a two-group/two-sheet of objective lenses 106 and 107. The beam splitter corresponds to a first optical branching element as recited in a claim. In the two-group/two-sheet of objective lenses, a first lens 106 is mounted on a two-dimensional actuator 104 and is driven along both an optical axis direction and a radial direction of the optical disk. The second lens 107 is driven in combination with the first lens in an integral form. Light reflected from the optical disk 108 is reflected on the beam splitter 103 to be entered into an optical separating hologram 109. Both light (not shown) located in the vicinity of an optical axis and light (not shown) located at a peripheral portion of the optical axis are separated along different directions, and both the separated light and light as entered via a cylindrical lens 111 into a photodetector 112 by a condenser lens 110. While the photodetector 112 owns a plurality of light receiving regions, a plurality of the above-described light are subdivided and detected by the plural light receiving regions so as to be converted into optical currents. These optical currents are detected by a signal detecting circuit 113, a tracking error signal detecting circuit 114, a spherical aberration signal detecting circuit 1802, and a reproduction signal detecting circuit 116 so as to be outputted as voltage signals, respectively. A focal shift signal is fed back as a drive signal of the two-dimensional actuator 106 along a focal-point direction so as to execute a control operation in such a manner that an optimum image point can be continuously focused onto the optical disk. A tracking error signal is fed back as a drive signal of the two-dimensional actuator 104 along a disk radial direction. A spherical aberration signal is fed back to the spherical aberration correcting actuator 1801 in order to perform a control operation in such a manner that spherical aberration caused by a fluctuation in thicknesses of a base plate and also by a lens interval shift can be compensated. The reproduction signal detecting circuit 116 reproduces signals recorded on the optical disk by involving a current-to-voltage conversion, a waveform equalizing process operation, a binary process operation, and the like. In FIG. 18, the collimating lens 102 may be arranged between the beam splitter 103 and the first lens 106 by being commonly used with the condenser lens 109. Also, in order to improve a light utilization efficiency, a ¼-wavelength plate is positioned between the beam splitter 103 and the first lens 106, and this beam splitter 103 may be operated as a polarization beam splitter. In this embodiment, as the focal shift detecting system, the cylindrical lens 111 is arranged in order to indicate such a case that an astigmatism system is employed. However, for example, when a knife edge system and a beam size system is employed, the cylindrical lens 111 is no longer required. Also, in the case of the astigmatism system, such an element capable of producing astigmatism may be employed. For instance, the cylindrical lens 111 may be replaced by an inclined parallel flat plate. Also, in this embodiment mode, the spherical aberration signal is fed back to the interval of the two-group/two-sheet of objective lenses as the spherical aberration compensating mechanism. This compensating mechanism may be alternatively realized by mounting, for example, the collimating lens 102. Alternatively, while a liquid crystal variable phase modulating element driven by a voltage is employed, a wavefront may be directly modulated. In this embodiment mode, since the spherical aberration correction is entered only in the incident light, the above-described control system may have the below-mentioned problem. In this control system, the spherical aberration is detected from the reflection light, and this detected spherical aberration is directly fed back.

It is now assumed that a spherical aberration error detected in this arrangement is "ε". While wavefront aberration of only "y" is applied to incident luminous flux by a spherical aberration compensating mechanism, this incident luminous flux is entered into a disk plane. Assuming now that spherical aberration occurred on the disk plane is "x", aberration occurred on the disk plane becomes 2x, as viewed by the reflection light, but the aberration applied by the spherical aberration compensating mechanism directly remains. As a result, if the control operation is carried out in such a manner that the detection error "$\epsilon$" of the spherical aberration detecting system becomes zero, then y=2x, and over compensation by "x" is made on the disk plane. If such a control operation by which x=y is not carried out, then the spherical aberration occurred on the disk plane cannot become zero.

Figure 19:
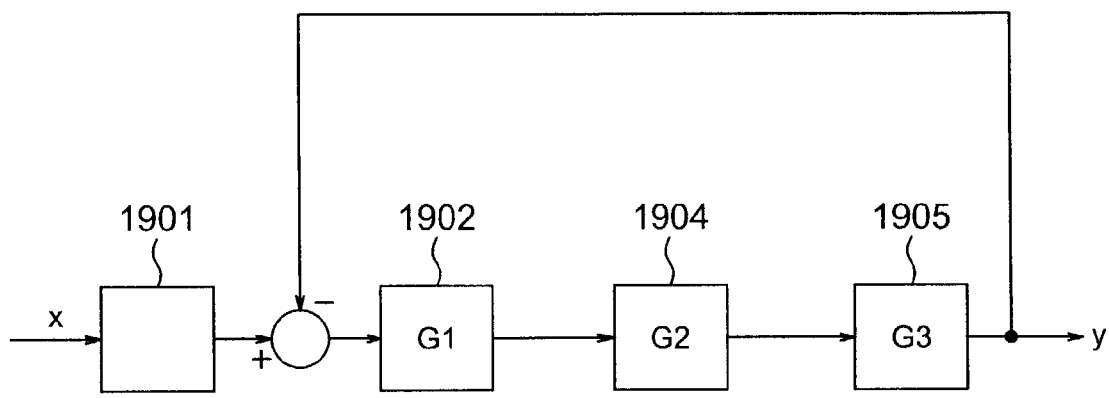
FIG. 19 is a diagram for showing a control block of the above-described embodiment mode.

As a consequence, a block arrangement of such a control system as shown in FIG. 19 is conceived.

A block 1901 indicates that aberration occurred in a reflection stage is multiplied by 2. A block 1902 shows a spherical aberration detector which outputs the aberration error "$\epsilon$". This control system is basically constituted by an aberration detector 1902, a control compensating system 1904, and a spherical aberration actuator 1905. A control amount corresponds to the spherical aberration "y" of the incident light, and is driven by the spherical aberration compensation actuator 1905. Although a target value "x" cannot be directly measured, a deviation amount of 2x-y can be measured. As a result, such a feedback control system that "x-y" becomes zero is constituted by employing this control system. A different point of this control system from the normal control system is such that the control compensating system 1904 is inserted. As a consequence, an open-loop transfer function "G" defined from the phase detecting unit up to the spherical aberration compensating actuator is given as follows:

$$G = G_1 G_2 G_3 \quad \text{(Expression 5)}$$

Also, a close-loop transfer function "H" may be expressed by the following expression 6:

$$H = \frac{G_1}{1 + G_1} \quad \text{(Expression 6)}$$

Furthermore, a transfer function to "y" viewed from "x" becomes 2·H, and may be expressed by the below-mentioned expression 7:

$$y/x = 2H \quad \text{(Expression 7)}$$

$$x - y = \frac{G-1}{G+1} x \quad \text{(Expression 8)}$$

In order to control "x-y" to zero, the below-mentioned equation must be satisfied within a range capable of involving "x".

$$G = 1 \quad \text{(Expression 9)}$$

In other words, $$G_2 = 1/G_1 G_3 \quad \text{(Expression 10)}$$

As a consequence, G2 may be selected in order to satisfy the condition of the above-described expression (9).

As G2, the below-mentioned embodiments may be conceived.

(1) A product as to inverse functions of G1 and G3 is formed in accordance with an expression "x".

Figure 46:
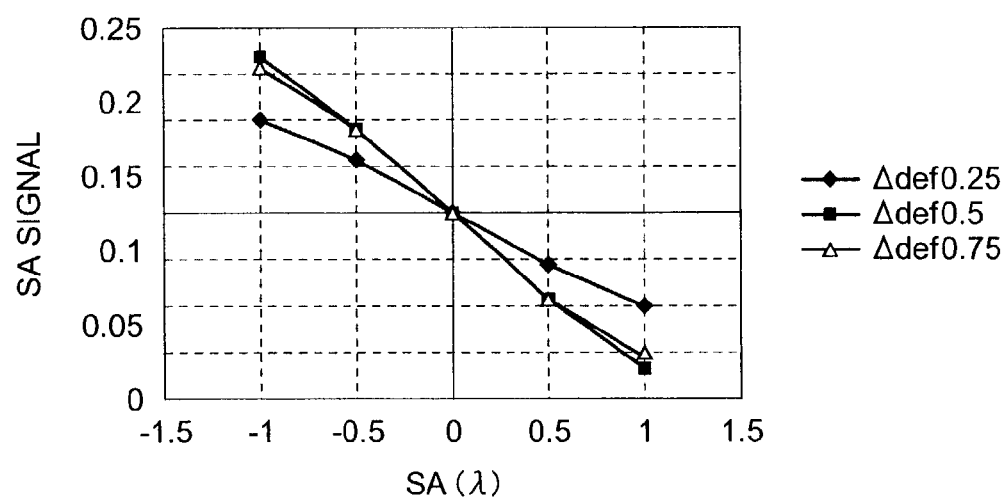
FIG. 46 is a diagram for indicating a calculation result of a spherical aberration signal by a difference in the push-pull signals when a focus offset is applied.

For instance, when a liquid crystal plate is used as the spherical aberration compensating actuator, a frequency characteristic of a wavefront phase amount with respect to a drive input represents such a characteristic of a low-pass filter as shown in FIG. 46. As a consequence, G3 is expressed by the below-mentioned transfer function:

$$G_3 = \frac{K_3}{sT+1} \quad \text{(Expression 11)}$$

G1 may be regarded as "k1", namely substantially constant within a subject range. As a consequence, G2 may become the below-mentioned transfer function:

$$G_2 = \frac{sT+1}{K_1 K_3} \quad \text{(Expression 12)}$$

Figure 47:
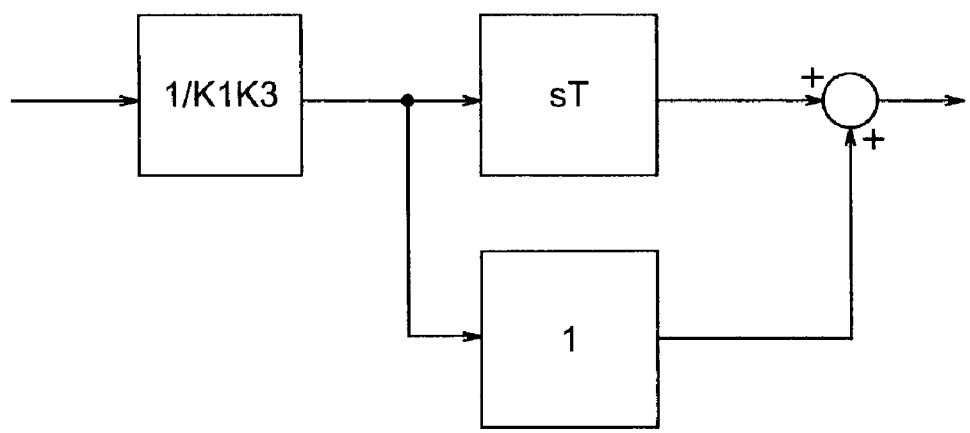
FIG. 47 is a block diagram of a control compensation system.
Figure 48:
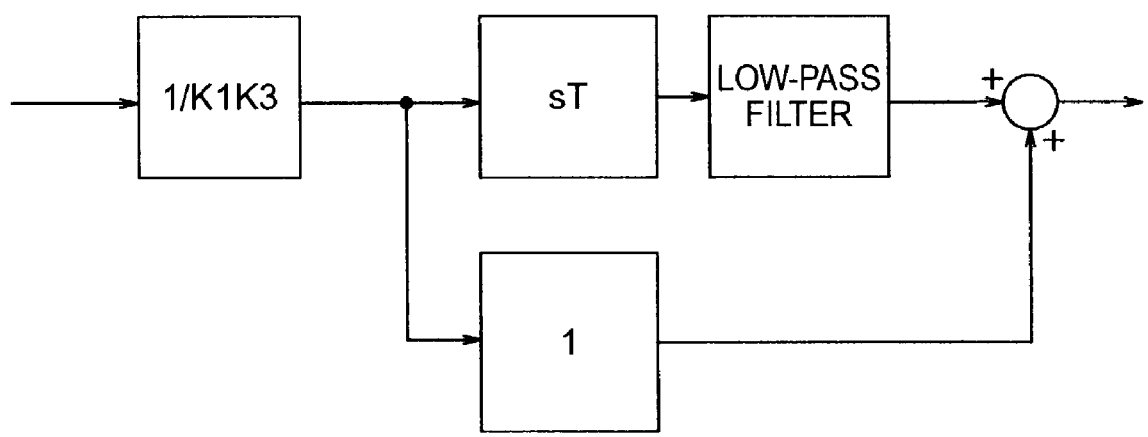
FIG. 48 is a block diagram for showing a control compensation system into which a low-pass filter is inserted.

In other words, G2 may become such a transfer function made of a summation constituted by a transfer function having a gain of an inverse number of a product between k1 and k2, another transfer function of a differential of a time constant "T", and also a constant 1. G2 may be expressed as shown in FIG. 47. Since the differential is involved in this control system a low-pass filter whose gain is lowered from a frequency higher than a control range may be interposed between G1 and G3 in order to arrange an actual control system in such a way that noise is not increased in a high range, and further, this noise gives no adverse influence to the control system. Preferably, the above-described low-pass filter may be inserted after a differential circuit as shown in FIG. 48.

(2) In this embodiment, such a system capable of reducing the aberration detecting error to zero is considered as a basic system. This basic system is arranged by an aberration detector 1902, a phase compensating element 4902, an amplifier 4901, and a spherical aberration compensating actuator 1905. A control amount corresponds to the spherical aberration "y" of the incident light, and is directly proportional to an input of the spherical aberration compensating actuator 1905. Although the target value "x" cannot be directly measured, such a deviation amount of "2x-y" can be measured. As a result, if the deviation amount is fed back in a similar manner to the prior art, then it becomes 2x=y.

Figure 49:
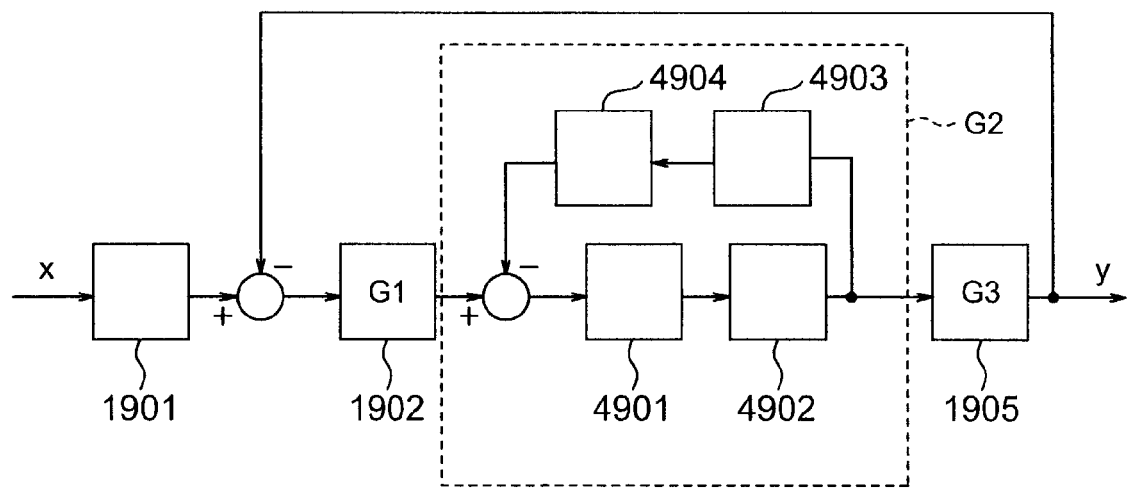
FIG. 49 is a block diagram for indicating a control system for compensating spherical aberration as to only an one-way optical path.

Therefore, motion of the spherical aberration compensating actuator 1905 is electrically simulated in a block 4903, the spherical aberration simulated in a block 4904 is converted into an electric signal, and then, this electric signal is subtracted from an aberration detection signal. As a consequence, the resultant signal obtained by subtracting the electric signal from the aberration detection signal becomes such a signal which is directly proportional to (2x-y)-y=2(x-y). When this signal is fed back, such a control operation that x=y may be realized. A block diagram capable of realizing this control operation is indicated in FIG. 49. As a transfer function of the block 4903, it may be set as G3, and as a transfer function of the block 4904, it may be set as G1. Assuming now that the transfer function of the phase compensating element 4902 is "g1", and also, the transfer function of the amplifier 4901 is set to "g2" in this structure, a transfer function G2 may be expressed as follows:

$$G_2 = \frac{1}{G_1 G_3 + \frac{1}{g_1 g_2}}. \quad \text{(Expression 13)}$$

When (g1×g2) is sufficiently larger than 1, the transfer function G2 may be given as follows:

$$G_2 = 1/G_1 G_3 \quad \text{(Expression 14)}$$

Accordingly, the transfer function G2 becomes an inverse function of a product between G1 and G3.

Figure 20:
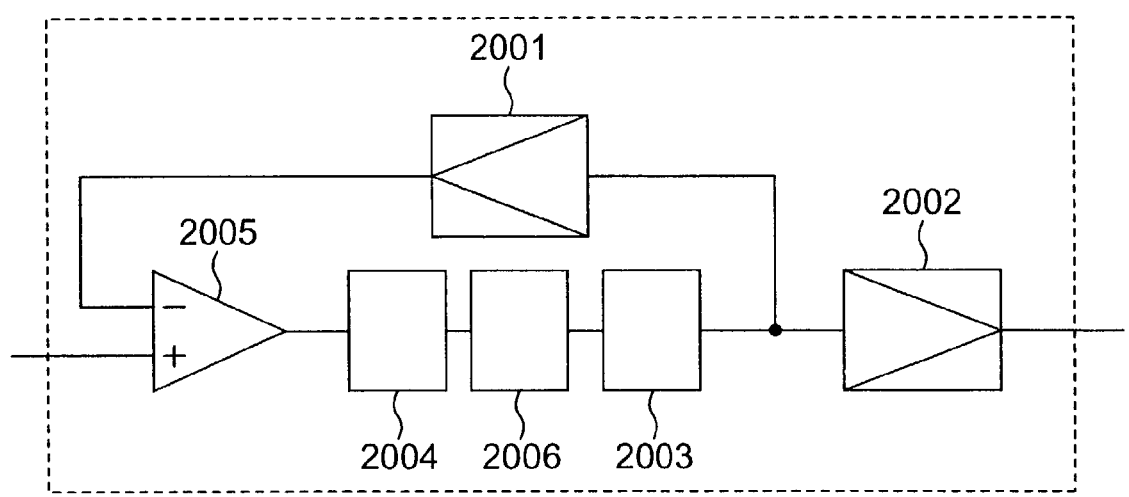
FIG. 20 is a circuit diagram of a spherical aberration correcting circuit employed in the above-described embodiment mode.

To construct the above-described control system, a block of G2 may be arranged as shown in FIG. 20. That is, while a spherical aberration signal is entered into a plus terminal of a differential amplifier 2005, a drive voltage of a drive circuit 2002 for driving a spherical aberration compensating actuator is inputted into a minus terminal thereof by such a signal which is penetrated through simulation circuit 2001 having such a transfer function that a transfer function of the spherical aberration compensating actuator (containing characteristic of actuator drive circuit) is series-connected to a transfer function of an aberration detector. An output of the differential amplifier 2005 is entered to an amplifier 2004, and an output of this amplifier 2004 is entered via a secondary integrating circuit 2006 to a phase lead compensating circuit 2003. Then, an output of this phase lead compensating circuit 2003 may become the drive circuit 2002 which drives the spherical aberration compensating actuator 1905. The output of the drive circuit 2002 is entered into the spherical aberration compensating actuator 1905, so that the spherical aberration may be applied to the incident light.

Figure 21:
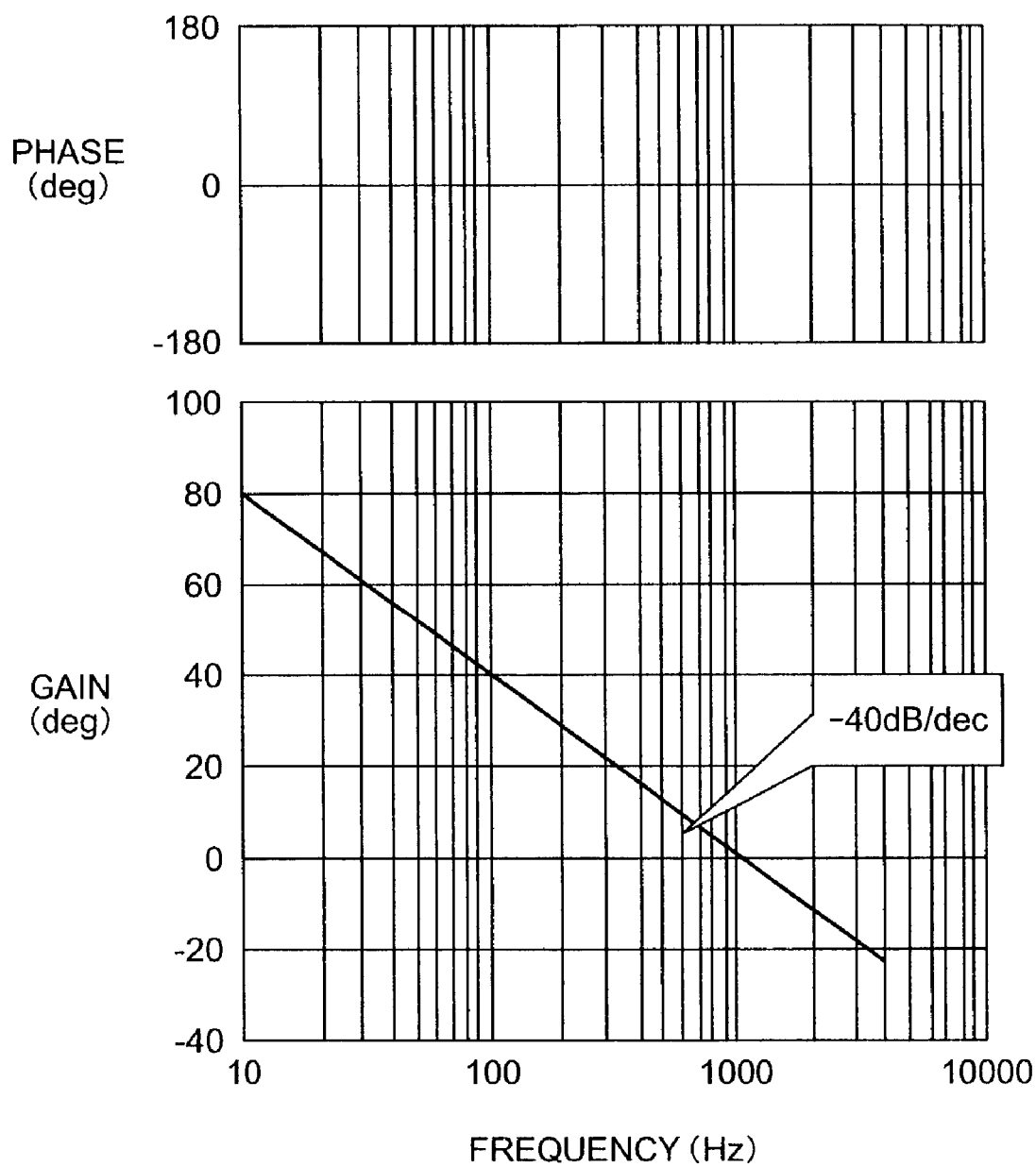
FIG. 21 is a diagram for showing a transfer frequency characteristic in a portion of a control system.

Next, a description will now be made of a method for designing a control system, while the structure of the above-described control system (2) is exemplified. The phase compensating circuit 4902 is constructed of both the secondary integrating circuit 2006 and the phase lead circuit 2003. The secondary integrating circuit owns such a frequency characteristic that a gain thereof is decreased by –40 dB/dec with respect to a frequency. A characteristic of the secondary integrating circuit is expressed as $K/(s^2)$. In this case, $s = j\omega$ may constitute such a frequency characteristic as indicated in FIG. 21.

Figure 22:
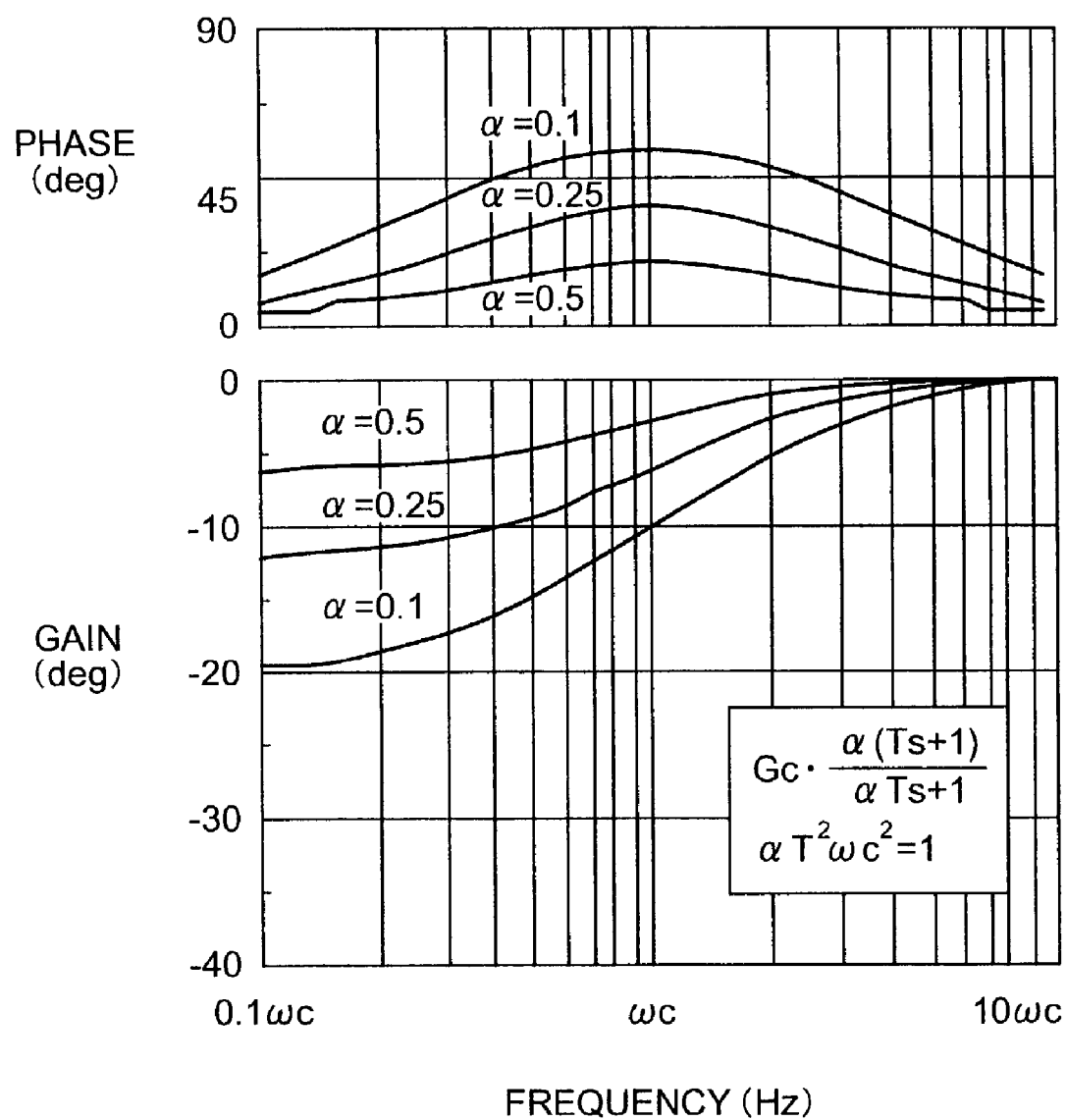
FIG. 22 is a diagram for representing a frequency characteristic of a phase lead compensating circuit.

Furthermore, in order to improve a response characteristic of the control system, a phase lead/delay circuit having a frequency characteristic represented in FIG. 22 is inserted. The frequency compensation by the phase lead circuit may cause a servo system to be brought into a stable condition. In order that the servo system becomes stable, in accordance with a simple stability judging method of Nyquist, a phase must be larger than, or equal to –180 degrees in such a frequency "ωc" (cross frequency) that the gain of the open-loop transfer function (namely, open-loop transfer function is equal to G1G2G3 in this case) becomes 0 dB. If the phase is delayed by 180 degrees, then the control system will oscillate.

As a consequence, how degree the phase at the cross frequency "ωc" is lead from –180 degrees may constitute an evaluation amount of a stability. As a consequence, in the control system, the servo system is stabilized in such a way that in the phase lead circuit having the frequency characteristic as indicated in FIG. 22, the phase at the cross frequency "ωc" is led from –180 degrees and a phase margin is increased by 40 to 50 degrees. In the case that α=0.1, the gain characteristic of the phase lead compensating circuit is increased by 20 dB in the high frequency range.

Figure 23:
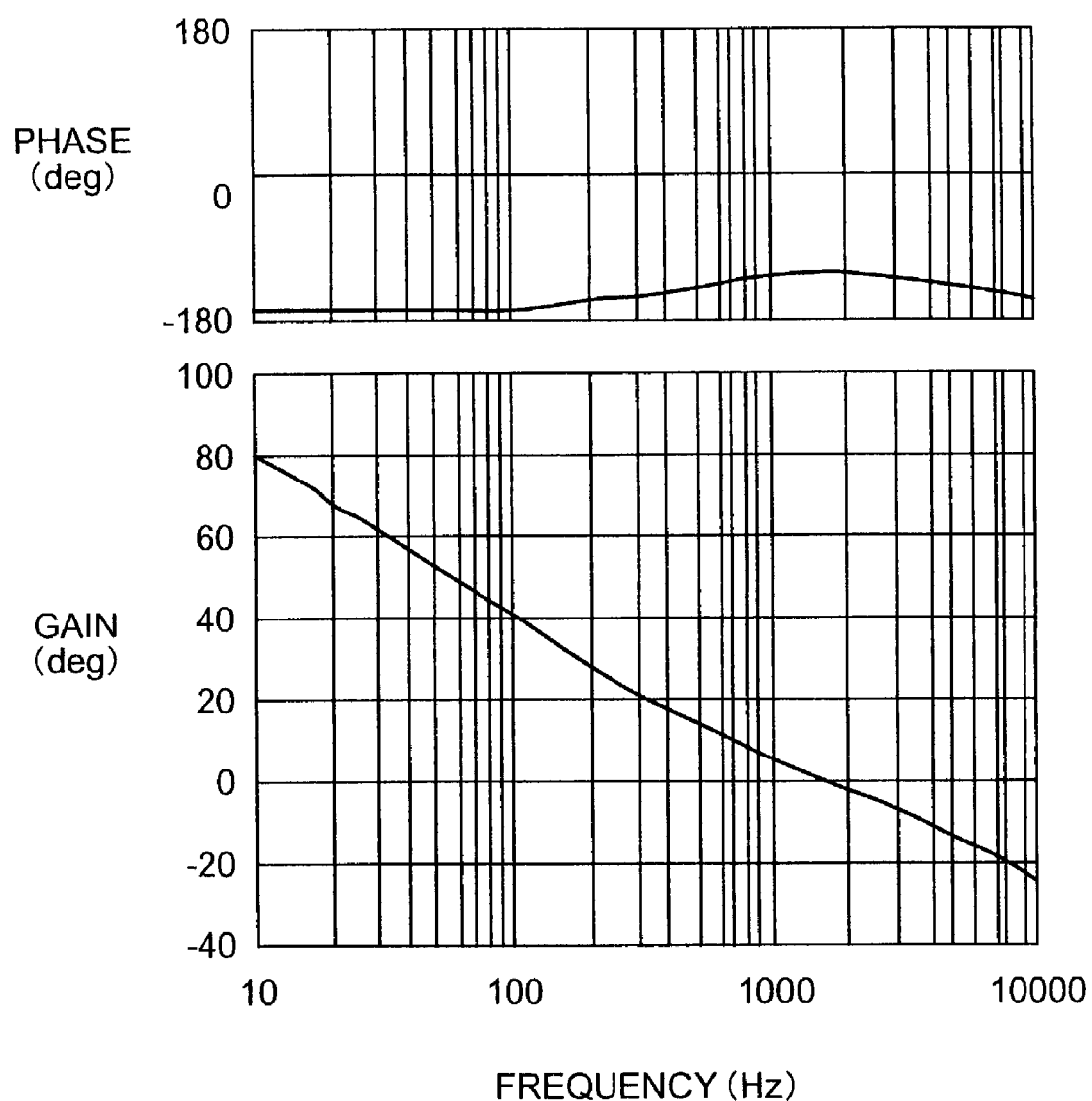
FIG. 23 is a diagram for indicating an open-loop transfer characteristic of the control system.

An open-loop characteristic obtained after the phase lead compensating circuit has been assembled is indicated in FIG. 23. In this embodiment, the cross frequency is selected to be 1.7 KHz.

(Embodiment 5)

Figure 24:
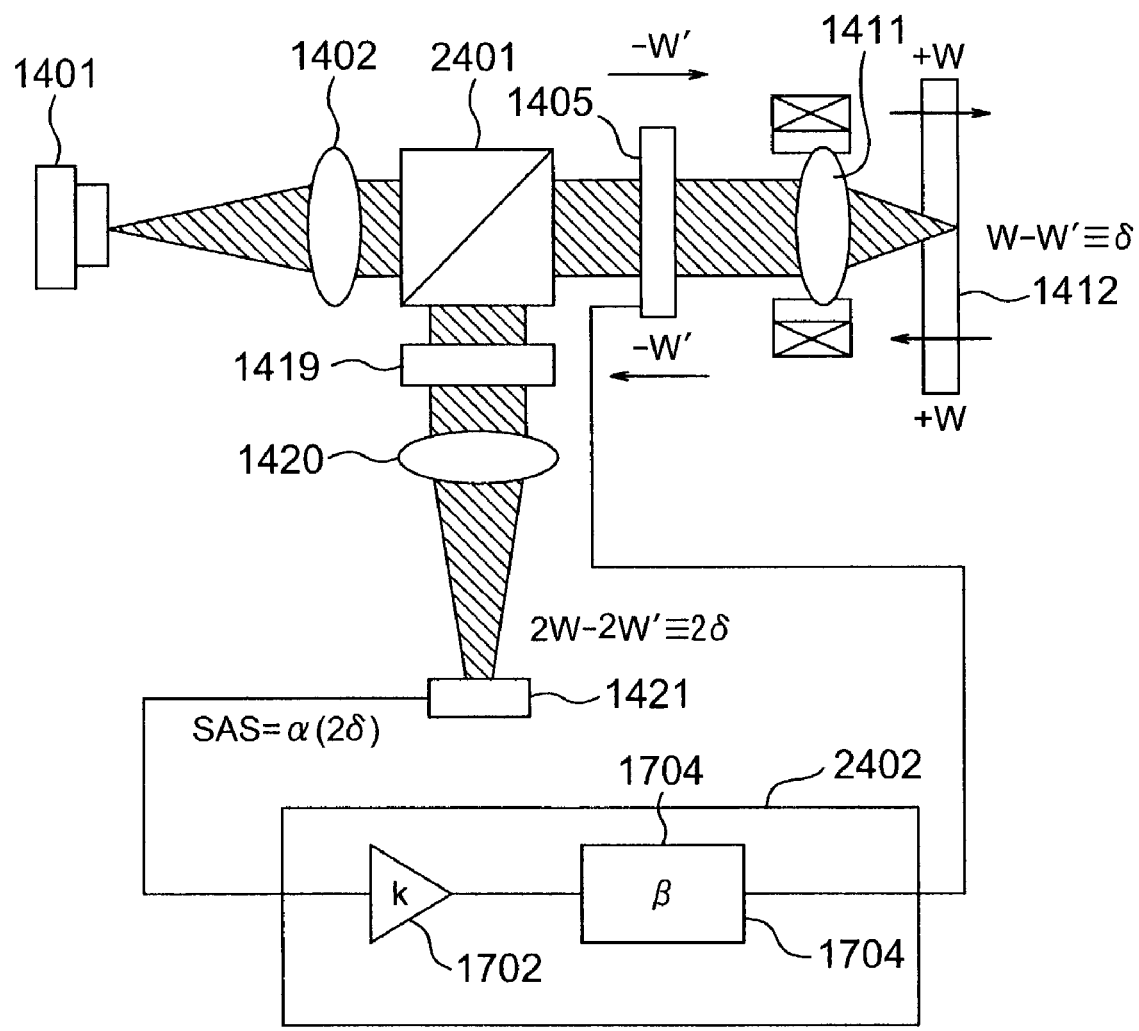
FIG. 24 is a diagram for indicating an optical disk apparatus according to an embodiment mode of the present invention in the case that a non-polarization beam splitter is employed.

FIG. 24 is an embodiment of an optical disk apparatus in such a case that a non-polarization beam splitter 2401 is employed. Since the non-polarization beam splitter 2401 is employed, even in such a case that the liquid crystal phase compensating element 1405 is employed, if this liquid crystal phase compensating element 1405 is interposed between the beam splitter 2401 and the objective lens 1411, then spherical aberration may effect both luminous flux of a going optical path and luminous flux of a returning optical path. As a result, since a detected spherical aberration signal may be obtained as a value which is directly proportional to spherical aberration occurred on the disk plane, a feedback control circuit may employ a spherical aberration control circuit 2402 which is constituted by an amplifier 1702 and a liquid crystal drive circuit 1704 and is similar to that of the prior art.

Figure 25:
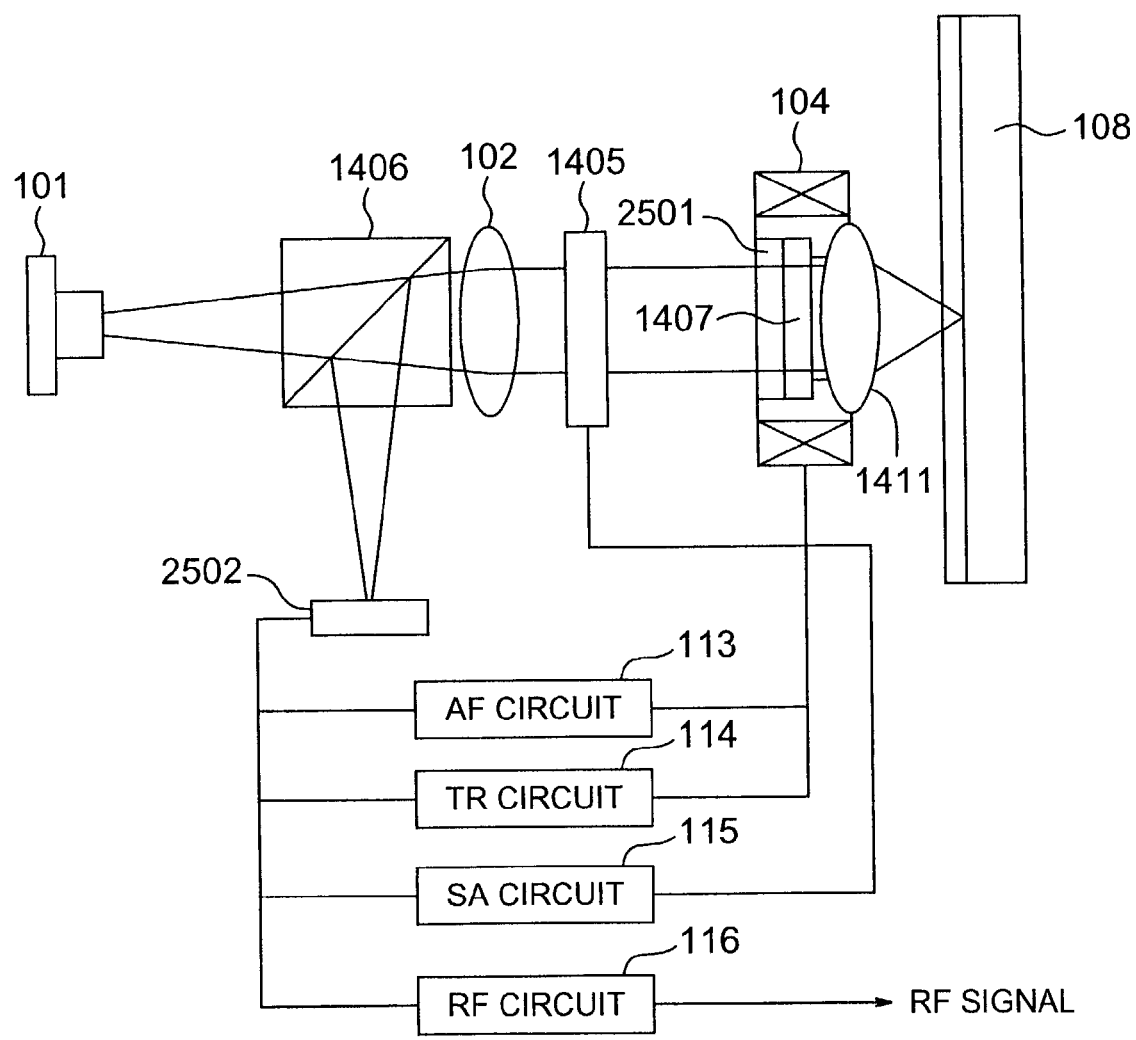
FIG. 25 is a diagram for indicating an optical disk apparatus, according to an embodiment mode, capable of suppressing an occurrence of spherical aberration in an one-way optical path.

FIG. 25 is an embodiment mode of an optical disk apparatus in the case that a lens by which spherical aberration may probably occur is not arranged in an optical path through which light will pass only in one way, for instance, such a lens is not arranged in an optical path from a semiconductor laser up to an optical branching element, and in another optical path from the optical branching element up to a photodetector. Light emitted from the semiconductor laser 101 is penetrated through the polarization beam splitter 1406, and then, is collimated to obtain parallel light by the collimating lens 102, and spherical aberration is applied to this collimated light by the liquid crystal phase compensating element 1405. Furthermore, this light passes through both the polarization diffraction grating 2501 and the ¼-λ plate 1407, which are mounted on the objective lens actuator 104, and then, is condensed on the optical disk 108 by the objective lens 1411. The reflected light is processed by the ¼-λ plate 1407 to be converted into linearly polarized light which is located perpendicular to that when the light is entered, and then, this learly polarized light is diffracted by the polarization diffraction grating 2501. While this diffracted light passes through the liquid crystal phase compensating element 1405 and is condensed by the collimate lens 102, this condensed light is reflected on the polarization beam splitter 1406 and then the reflected light is received by the photodetector 2502. When the optical disk apparatus is arranged in this manner, since the light necessarily passes through such an optical component as a lens in the reciprocative optical path, which may probably cause the spherical aberration, an occurrence of offset can be prevented in such a system that when the spherical aberration is compensated, the aberration applied by the liquid crystal phase compensating element occurs only in one optical path.

Figure 26:
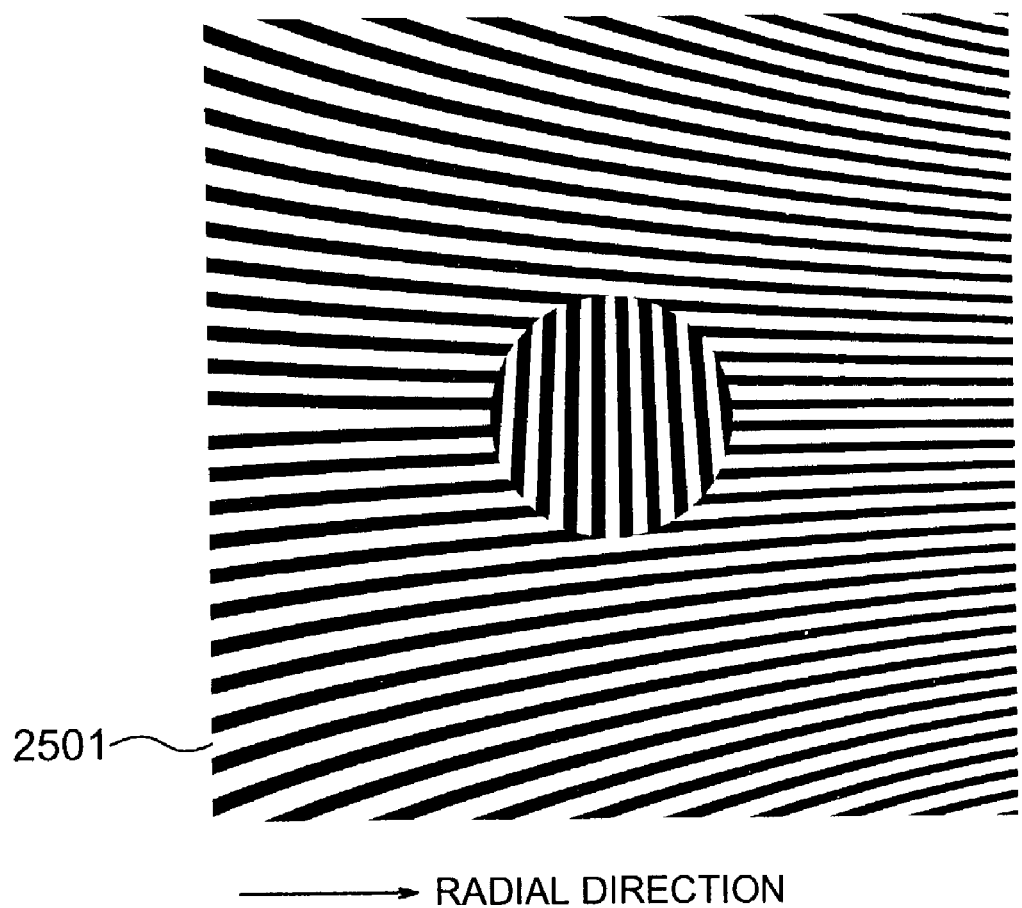
FIG. 26 is a diagram for showing a pattern of a polarizing diffraction grating employed in the embodiment mode of FIG. 25.

FIG. 26 is a diagram for indicating a pattern of the polarization diffraction grating 2501 employed in this optical disk apparatus. This pattern constitutes such a grating pattern that astigmatism having the same dimensions and directed to 45 degrees is produced in diffracted light by both luminous flux located in the vicinity of an optical axis and luminous flux located at a peripheral portion of this optical axis, and at the same time, the diffracted light is separated along right/left directions in the vicinity of the optical axis and the diffracted light is separated along upper/lower directions at the peripheral portion of the optical axis.

Figure 27:
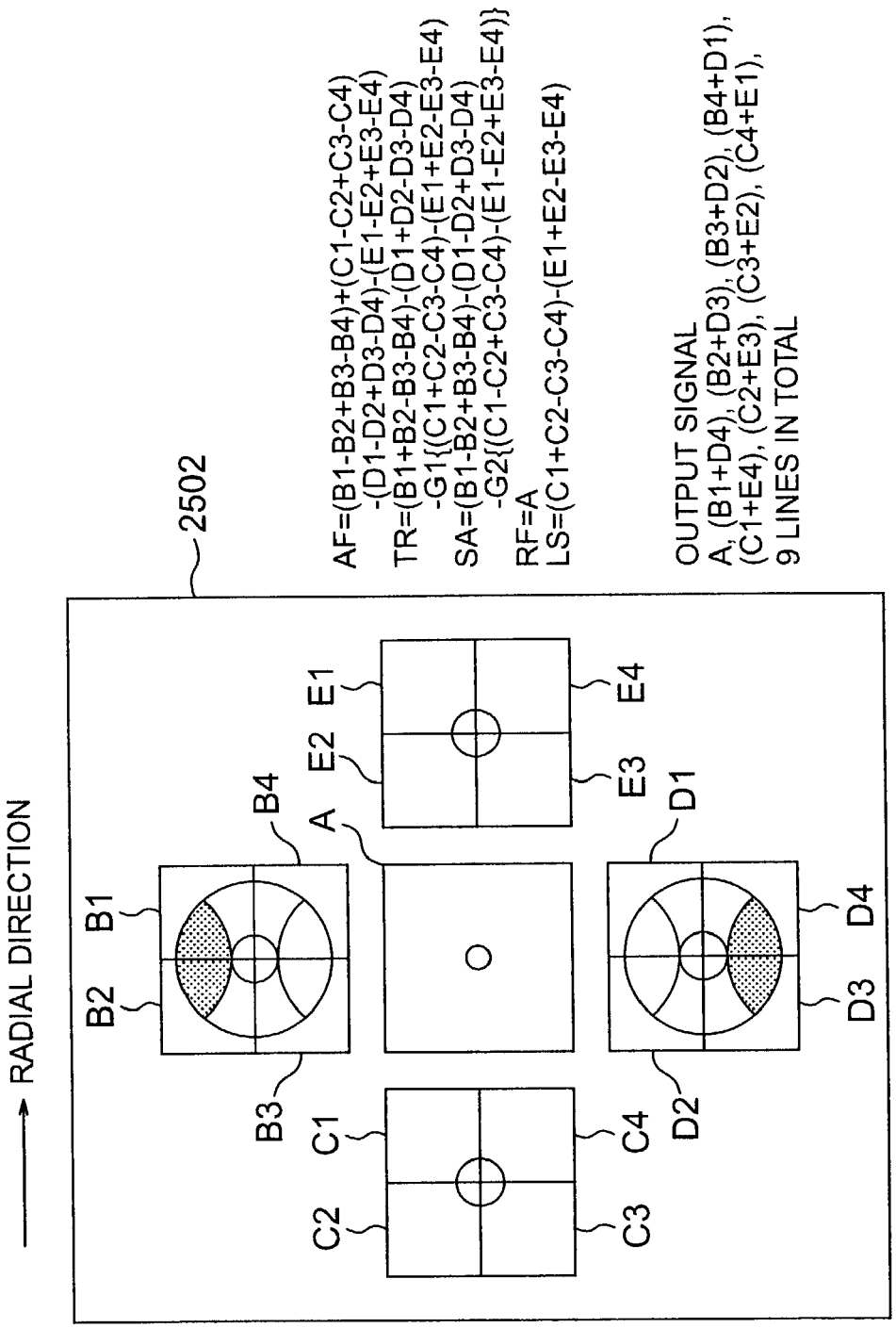
FIG. 27 is a diagram for indicating a detector pattern and a signal calculation method employed in the embodiment mode of FIG. 25.

FIG. 27 shows the photodetector 2503, patterns of luminous flux which is entered into this photodetector 2503, and calculation formulae of respective signals. In a light receiving portion "A" of a center portion, rays of zero-order light are entered which are not diffracted by the polarizing diffraction grating 2501. At this time, when a spot on the optical disk is focused, the position of the photodetector 2502 is adjusted in such a manner that this zero-order light may be focused on the light receiving portion A. At this time, although the diffracted light is not condensed by the astigmatism but is widened, since the lens power of condensing/diverganting operations is not present in the pattern of the polarizing diffractive grating 2501 of FIG. 26, a least circle of confusion is formed on the photodetector 2502. Thus, each of these diffracted light is received by a four-split optical detecting region, and such a calculation is carried out so as to detect a focal point by subtracting summed outputs along a diagonal direction from each other, and then, the subtracted values are added to each other, so that a focal shift signal (AF) can be acquired. It should be noted that as to the astigmatism of the diffraction grating, since symbols are inverted in +first-order diffraction light and − first-order diffraction light or the focal shift signals are added by considering polarities thereof. Since the least circle of confusion caused by the astigmatism along the 45-degree direction becomes such a distribution that the distribution in the parallel luminous flux is rotated by essentially 90 degrees, the diffraction pattern caused by the guide groove of the optical disk appears along the tangential direction. In this drawing, in order to indicate the polarity of the diffraction pattern, such an example is exemplified in which only a single side of the diffraction pattern becomes dark by supposing a condition that a slight tracking deviation is present. In this example, for example, assuming now that a pitch of guide grooves of the optical disk is 0.32 μm; NA of the objective lens is 0.85; and a wavelength of light is 0.4 μm, since the pitch is narrower than a spot diameter (λ/NA=0.47 μm), such a region having no diffraction pattern caused by the guide grooves is present in a center portion of luminous flux. As a result, when a tracking signal calculation in such a region is carried out, this tracking signal may constitute a lens shift signal (LS), while the luminous flux located in the vicinity of the optical axis is set in this region where these is no diffraction pattern caused by the guide grooves. This lens shift signal (LS) is multiplied by a proper coefficient, and the multiplied lens shift signal is subtracted from a tracking signal of outer-sided luminous flux (TR), so that this may solve the offset problem caused by the objective lens shift which may cause the problem in the tracking signal calculation of the push-pull system. As previously described, the spherical aberration may be detected in such a way that both the focal shift signal of the outer-sided luminous flux and the focal shift signal of the inner-sided luminous flux are acquired, and then, these focal shift signals are subtracted from each other (SA).

(Embodiment 6)

Figure 28:
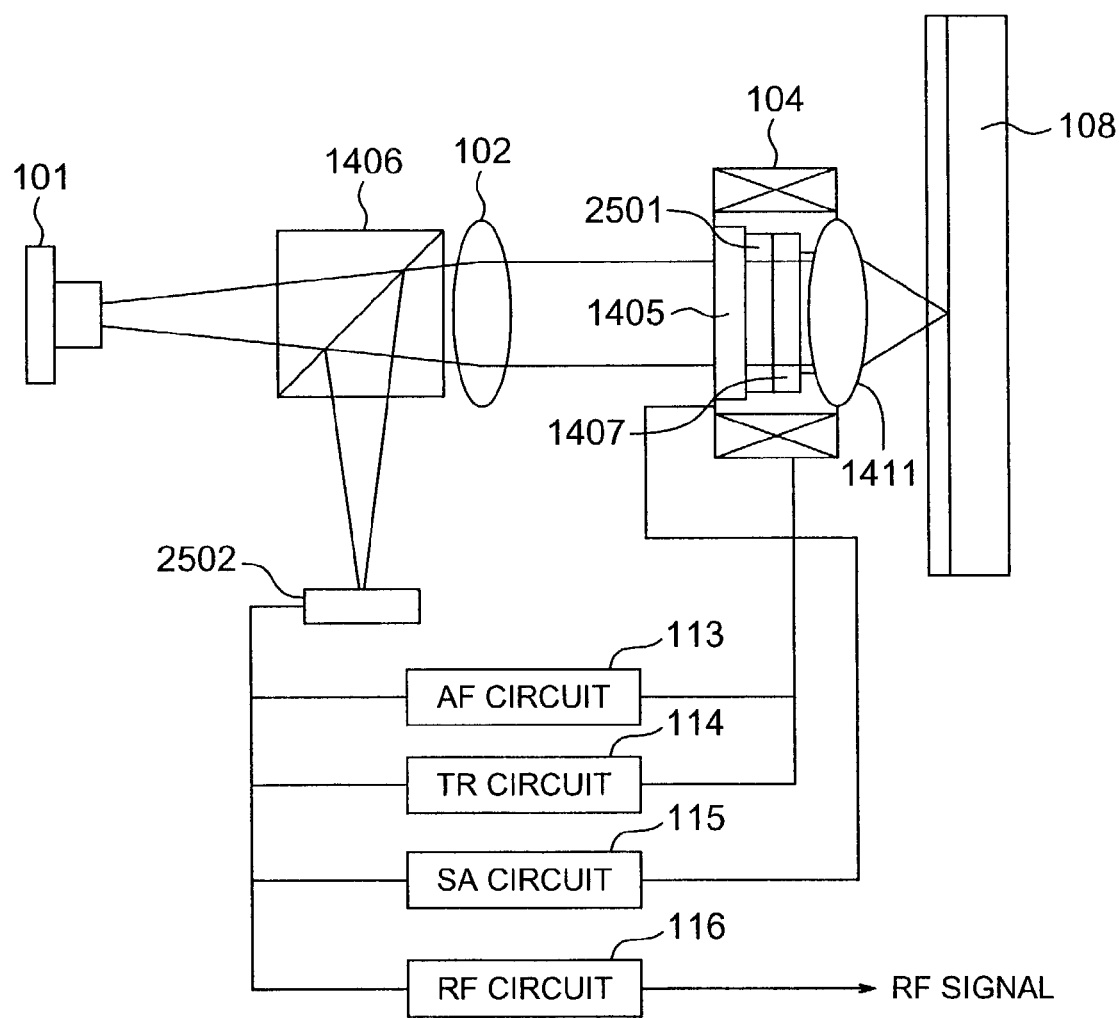
FIG. 28 is a diagram for representing an optical disk apparatus according to an embodiment mode of the present invention, in which a liquid crystal phase compensating element is mounted on an actuator.

FIG. 28 is an embodiment mode of an optical disk apparatus in the case that the liquid crystal phase compensating element 1405 is mounted on the two-dimensional actuator 104 in the above-described embodiment mode of FIG. 25. In this embodiment mode shown in FIG. 25, since the objective lens 1411 is driven by the two-dimensional actuator 104 independent from the liquid crystal phase compensating element 1405, the spherical aberration applied by the liquid crystal phase compensating element 1405 is shifted from the optical axis of the objective lens 1411 by the drive amount by the two-dimensional actuator 104. The spherical aberration shifted from the optical axis by "Δ" is expressed by the following expression 15:

$$W(\Delta) = W_{40}\{(x-\Delta)^2 + y^2\}^2 \quad \text{(Expression 15)}$$
$$\cong W_{40}\{x^2 + y^2 - 2\Delta x\}^2$$
$$= W_{40}\{\rho^2 - 2\Delta\rho\cos\theta\}^2$$
$$\cong W_{40}\{\rho^4 - 2\Delta\rho^3\cos\theta\}$$

As a result, comma aberration may occur which is approximately proportional to "Δ" in addition to the original spherical aberration. If this comma aberration is present within an allowable range, then there is no specific problem. In the case that a spherical aberration amount to be compensated is large, or the shift "Δ" is large and the occurring comma aberration exceeds the allowable range, as represented in FIG. 28, since the liquid crystal phase compensating element 1405 is mounted on the objective lens 1417, the occurrence of the comma aberration can be suppressed.

(Embodiment 7)

Figure 29:
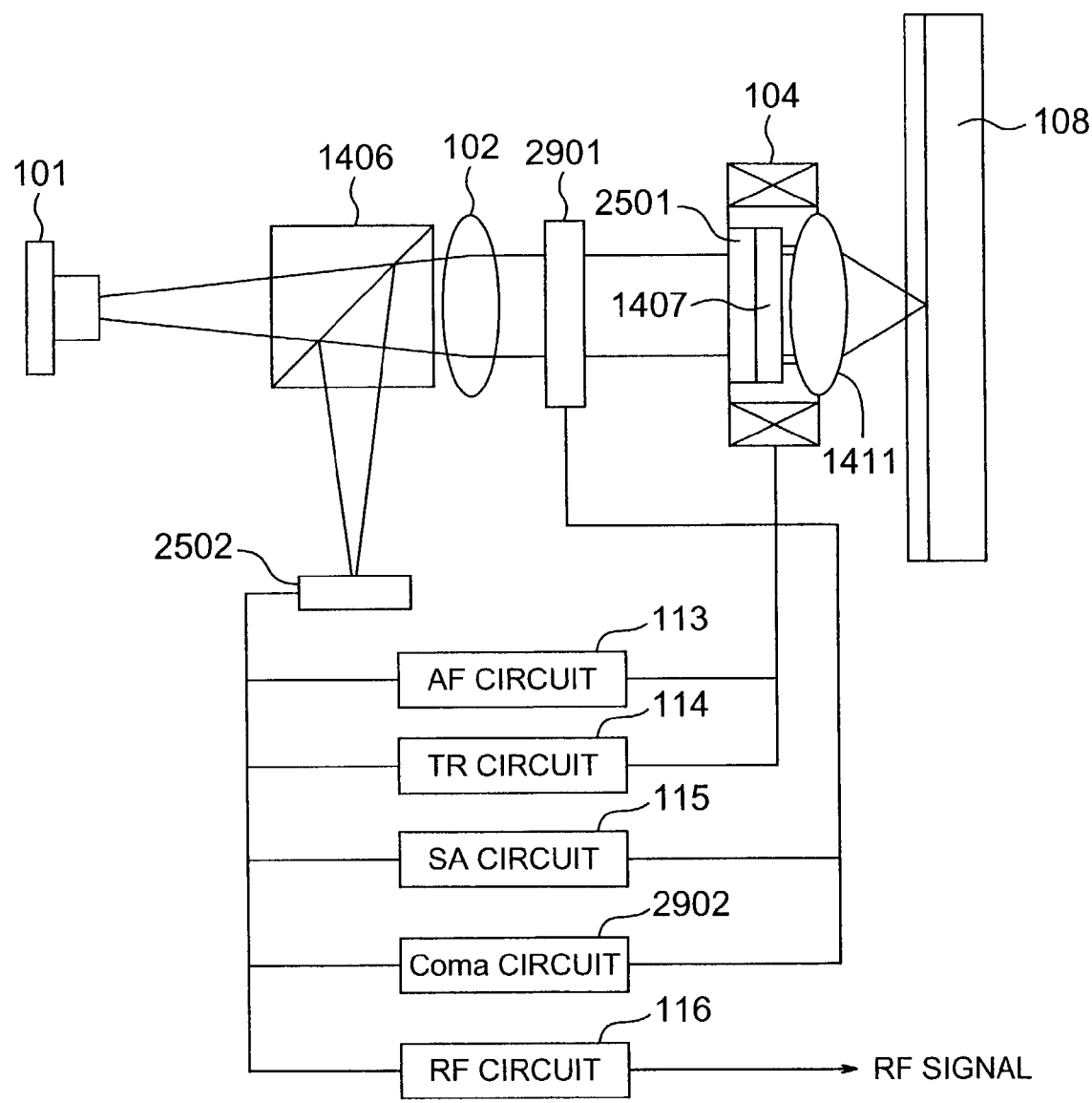
FIG. 29 is a diagram for showing an optical disk apparatus equipped with a comma aberration compensating function, according to an embodiment mode of the present invention.

Also, as another method of suppressing an occurrence of comma aberration, as embodiment mode of an optical disk apparatus equipped with a comma aberration compensating function is shown FIG. 29. In this embodiment mode, as the liquid crystal phase compensating element, such a liquid crystal phase compensating element 2901 capable of compensating spherical aberration and at the same time capable of compensating comma aberration is employed. Either comma aberration or a lens shift, which are produced in such a case that the objective lens 1411 is shifted from an axis of the liquid crystal phase compensating element 2901 by the two dimensional actuator 104 in conjunction with eccentricity of the optical disk 108, is detected from an output of a photodetector 2502 by way of a calculation by employing a comma aberration circuit 2902. Then, the detected comma aberration, or the detected lens shift is fed back to a comma aberration drive electrode of the liquid crystal phase compensating element 2901. At this time, as this photodetector 2502, such a photodetector as explained in FIG. 27 may be employed. Also, the liquid crystal phase compensating element 2901 may be alternatively arranged between the semiconductor laser 101 and the beam splitter 2901 by designing the collimating lens while considering such a spherical aberration occurred when divergent light is entered thereinto. Also, in the case that the non-polarization beam splitter as shown in FIG. 24 is employed, while the arranging position of the liquid crystal phase compensating element 2901 remains as shown in this drawing, the polarizing diffraction grating 2501 may be replaced by such a non-polarizing diffraction grating, and the ¼-λ plate 1407 may be eliminated.

In this case, such a liquid crystal phase compensating element capable of simultaneously compensating both comma aberration and spherical aberration is indicated in FIG. 30. Such a liquid crystal phase compensating element is described in, for instance, Japanese Laid-open Patent Application No. HEI 2001-84631. FIG. 30(*a*) shows a sectional structure of this element. In this drawing, transparent electrodes 3004*a* and 3004*b* are patterned on surfaces of glass base plates 3001*a* and 3001*b*. Furthermore, insulating films 3005*a*, 3005*b*, and orientation films 3006*a*, 3006*b* are stacked on these surfaces, and liquid crystal 3003 is sandwiched by the stacked layer, which is tightly sealed by employing a sealing member 3002. The electrode 3004*b* may be wired from the base plate 3001*a* via a conductive film which is patterned as the sealing member. FIG. 30(*b*) is a plan view for indicating the transparent electrode 3004a for compensating the spherical aberration and FIG. 30(c) is a plan view for showing the transparent electrode 3004b for compensating the comma aberration. As indicated in FIG. 30(d) and FIG. 30(e), AC voltages are applied to input voltages V1, V2, V3, and V4 in order to reduce the aberration as shown by wavefronts 3008a and 3008b by adding phase shifts with respect to wavefronts 3007a and 3007b having aberration in a segment shape.

Figure 31:
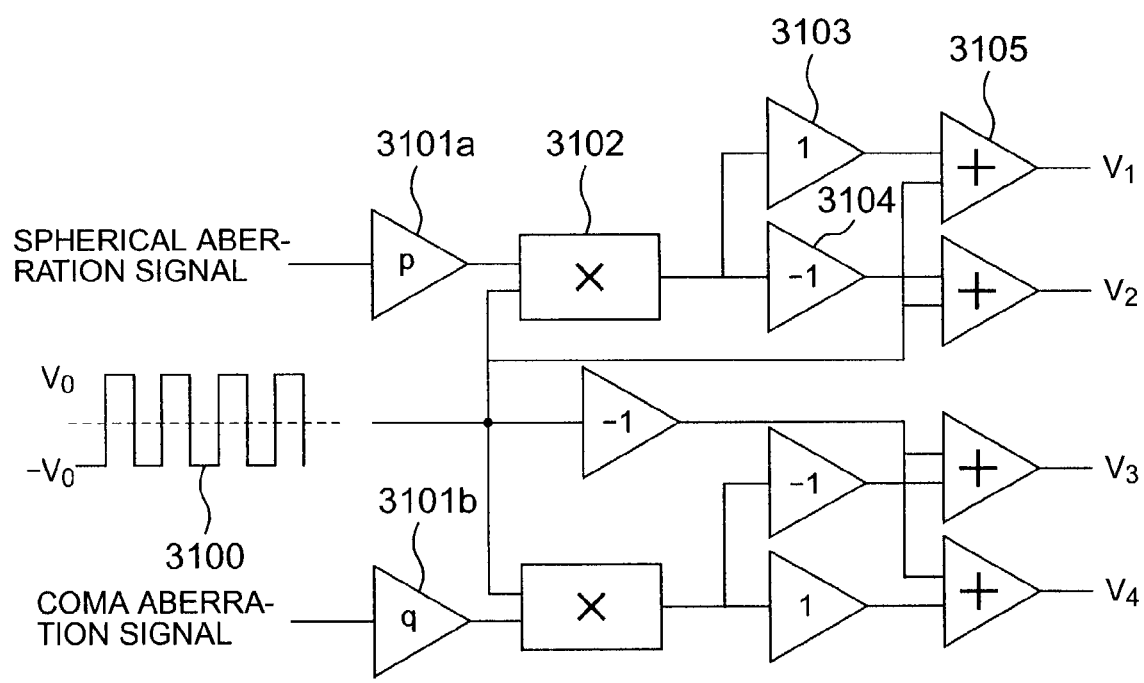
FIG. 31 is a circuit diagram of a liquid crystal drive circuit.

FIG. 31 shows a drive circuit for applying a voltage to the liquid crystal of FIG. 30. While an AC voltage 3100 having a rectangular waveform of +V0 and −V0, and an invented waveform thereof are used as a reference application voltage for the spherical aberration and also a reference application voltage for the comma aberration, amplitudes of these application voltages are modulated by a spherical aberration signal and a comma aberration signal. The amplitudes of these input voltages V1 and V2, and the amplitudes of the input voltages V3 and V4 are increased, or decreased in an asymmetrical manner by the spherical aberration signal and the comma aberration signal with respect to the reference voltages, respectively. Since the above-described voltage modulations are carried out, such compensated wavefronts as indicated in FIG. 30(d) and FIG. 30(e) can be continously realized.

FIG. 30 and FIG. 31 indicate the embodiment mode of the liquid crystal phase compensating elements which are used to simultaneously compensate both the spherical aberration and the comma aberration. In such a case that only the spherical aberration is compensated, while the transparent electrode for compensating the comma aberration may be made as an uniform electrode having no split, as the drive voltage, either the ground level may be used, or an invented waveform of a reference signal having a constant amplitude may be employed.

Figure 32:
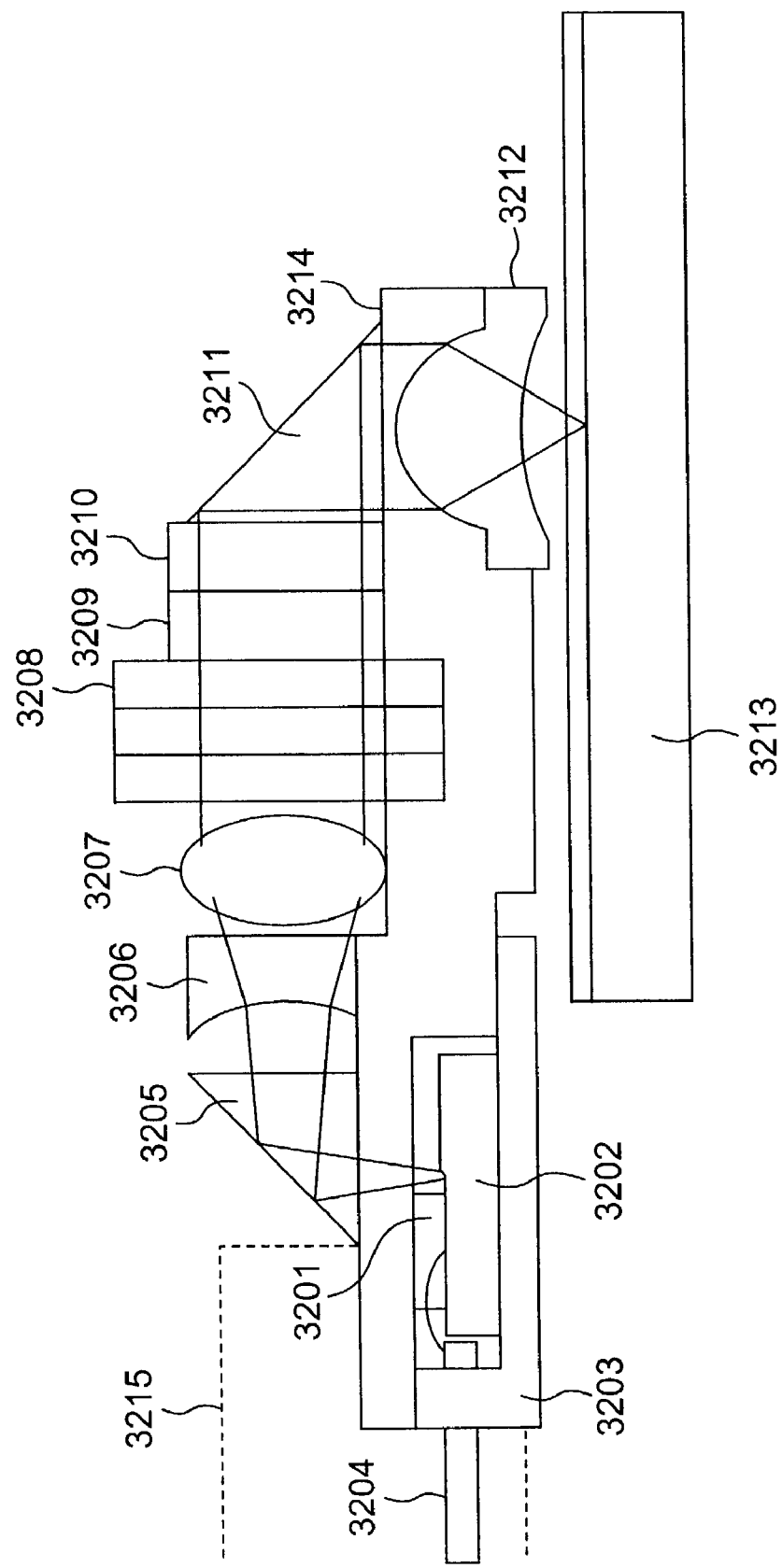
FIG. 32 is a diagram for showing a compact optical head according to an embodiment mode of the present invention.

FIG. 32 shows an optical head according to an embodiment mode of the present invention, in which an effective luminous flux system of an objective lens is smaller than, or equal to 1 mm; and a semiconductor laser, a spherical aberration adding mechanism, an optical branching element, an objective lens, and a photodetector are arranged in an integral form. A semiconductor laser chip 3201 is mounted on a substrate 3202 of a photodetector, and semiconductor laser light may be raised in a vertical direction by a 45-degree reflection mirror which is formed on the substrate 3202 of the photodetector by an etching process. While the photodetector substrate 3202 is fixed on a supporting base plate 3203, this supporting base plate 3203 is adhered to an optical head housing 3214 in such a manner that the semiconductor laser chip 3201 is tightly sealed. The optical head housing 3214 is made of either glass or a metal in which a hole is formed at a position through which light passes through. The semiconductor laser light penetrates the optical head housing 3214, and then is reflected from a reflection prism 3205, and is converted into collimated light by a concave lens 3206 and a convex lens 3207. In this case, the concave lens 3206 is employed so as to shorten a length of an optical path. If there is a spare in the optical path length, then only the convex lens 3207 may be employed. Next, the collimated light passes through a liquid crystal phase compensating element 3208 and a polarizing diffraction grating 3209, and is converted from linearly polarized light into circularly polarized light by a ¼-λ plate 3210. Then, this circularly polarized light is reflected on a reflection prism 3211, and then, is condensed onto an optical disk 3216 by an objective lens 3212. It should be understood that the size of the liquid crystal phase compensating element 3208 is made larger than a diameter of luminous flux in relation to a dimension of a sealing member. The reflected light passes through the objective lens 3212 and the reflection prism 3211, the polarized light becomes linearly polarized light which is rotated by 90 degrees from a polarization direction of luminous flux in the going optical path by the ¼-λ plate 3210, and then, this linearly polarized light is diffracted by the polarizing diffraction grating 3209. The diffracted light passes through the liquid crystal compensating element 3208 and then is condensed onto the photodetector substrate 3202. A signal line from the photodetector substrate 3202 is outputted from a signal terminal 3204 by a bonding wire. In the above-described optical system, since an effective luminous flux diameter in the objective lens 3212 is made smaller than, or equal to 1 mm, the entire optical system can be made compact. Since the entire optical components are made in an integral form and the integrated optical components are mounted on an actuator arm 3215, such an adverse influence as an optical axis shift of the liquid crystal phase compensating element 3208 which is caused by the tracking operation can be eliminated. Furthermore, since the optical head can be made compact and slim, the overall optical disk apparatus can be advantageously made compact.

Figure 33:
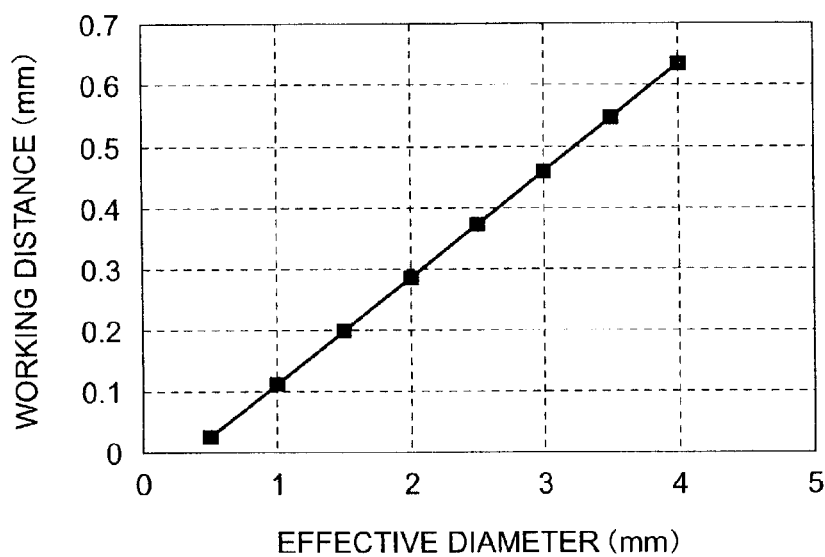
FIG. 33 is a diagram for indicating a relationship between a working distance of an objective lens and an effective diameter of the objective lens.

When the effective luminous flux diameter of the objective lens is made smaller than, or equal to 1 mm, how long the interval between the objective lens and the optical disk, namely a working distance can be secured may constitute a problem. FIG. 33 indicates a calculation result of the working distance with respective effective diameter under such a condition that an NA is 0.85; a thickness of a disk base plate is 0.1 mm; a refractive index of the base plate is 1.62; a refractive index of the objective lens is 1.8; and also, a radius curvature of a first plane of a single type objective lens is equal to a half of the luminous flux diameter. In this case, based upon Japanese book "Lens Designing Method" (written by MATUSI, published by KYORITSU publisher, No. 7, 1989), the working distance "WD" may be calculated by the following expression 16 under such a lens thickness that a value of spherical aberration becomes minimum, which is conducted from the aberration theory in the analytic manner:

$$WD = \left\{1 - \left(1 - \frac{1}{n}\right)\frac{t}{R_1}\right\}f - \frac{d}{n_s} \quad \text{(Expression 16)}$$

In this expression, symbol "n" indicates a refractive index of a lens, symbol "t" shows a thickness of the lens, symbol "R1" represents a first plane radius curvature of the lens, symbol "f" shows a focal distance, symbol "d" denotes a thickness of a disk base plate and also, symbol "ns" indicates a refractive index of the base plate. Such a condition that the first plane radius curvature is equal to ½ of the luminous flux diameter corresponds to a sever condition under which a lens can be geometrically established. However, in an actual case, since the lens is a non-spherical shape, if a distance is approximated to this non-spherical shape, then the lens can be established. As a result, even when NA is equal to 0.85 and the thickness of the base plate is equal to 0.1 mm, it can be seen that such a condition may be secured. That is, the effective diameter is 1 mm, and the working distance is approximately 0.1 mm. This condition is nearly equal to the working distance of 0.13 mm as to the two-sheet of lenses having the effective diameter of 3 mm shown in FIG. 11, namely can be sufficiently realized.

Figure 34:
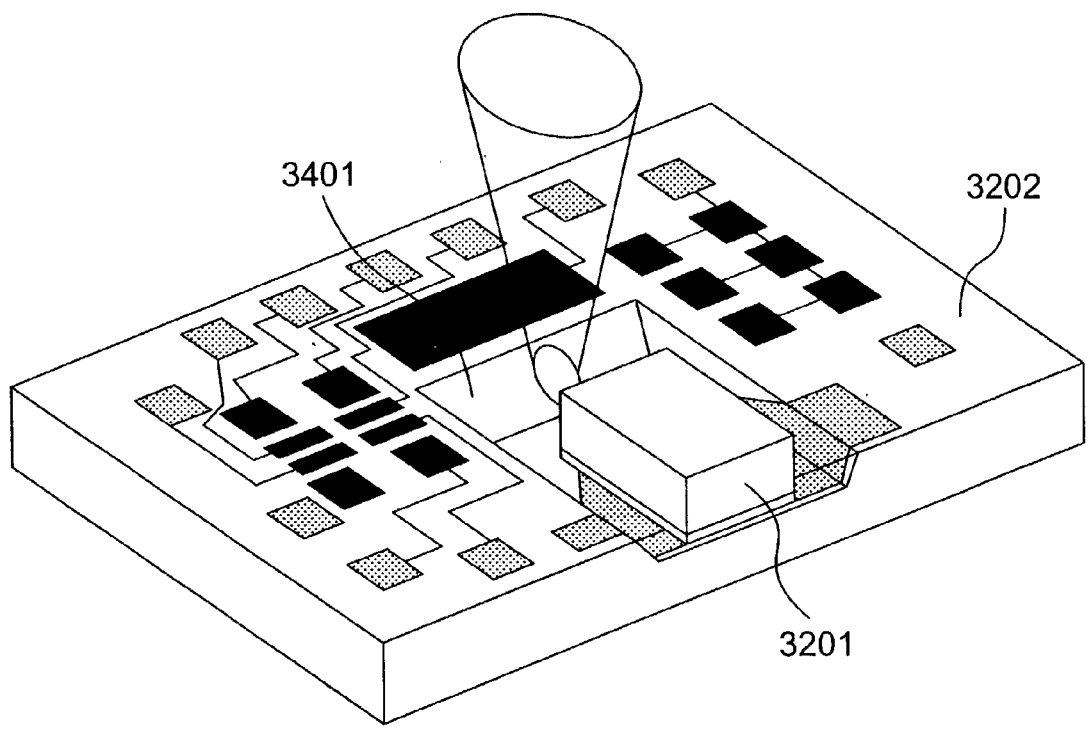
FIG. 34 is a perspective view of a laser module.

FIG. 34 shows a laser module, according to an embodiment mode of the present invention, in which the semiconductor laser chip 3201 is constructed on the photodetector substrate 3202 in an integral form. The divergent laser light emitted from an edge surface of the semiconductor laser chip 3201 is vertically raised from the substrate by the 45-degree mirror 3401 which is fabricated by way of the etching process. Since the photodetector substrate 3202 employs a silicon substrate, if the 45-degree mirror 3401 is such a substrate which is cut by shifting the crystal axial orientation by 9.7 degrees, then the inclination plane of 45 degrees may appear by way of the anisotropic etching process.

Figure 35:
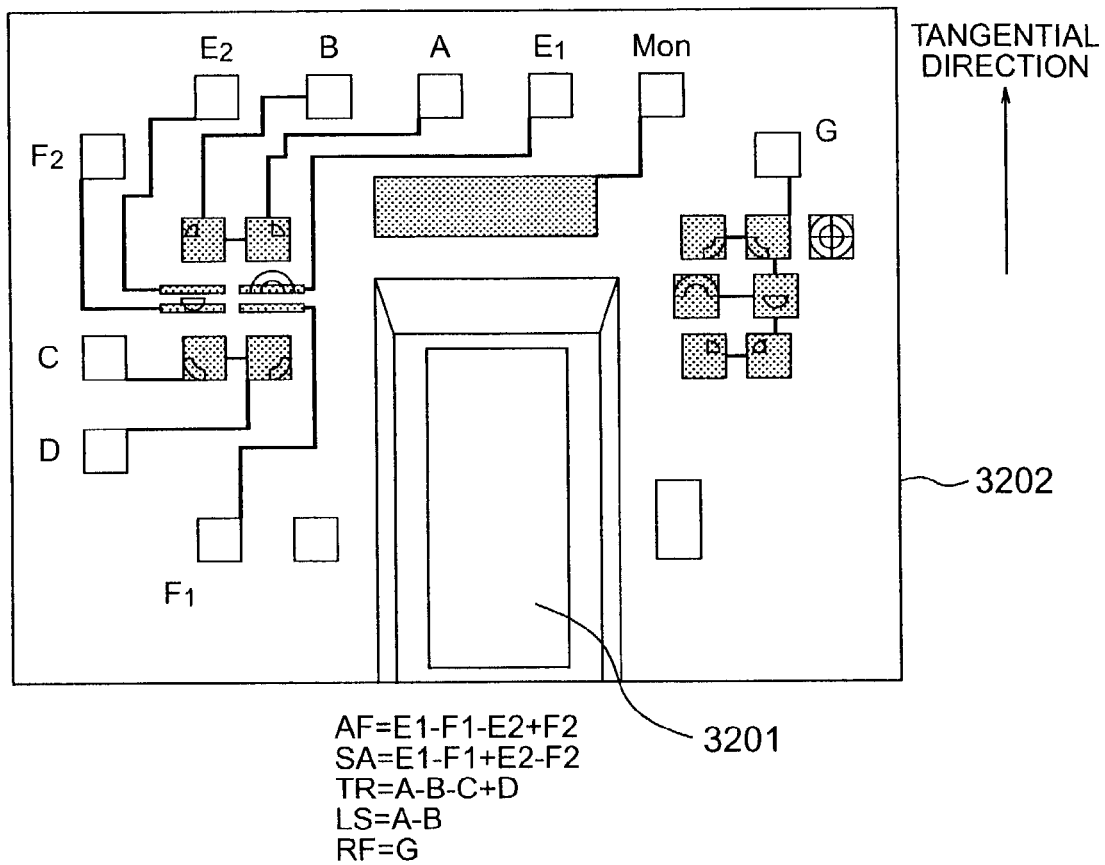
FIG. 35 is a diagram for representing a laser module detector pattern and a signal calculating method.
Figure 36:
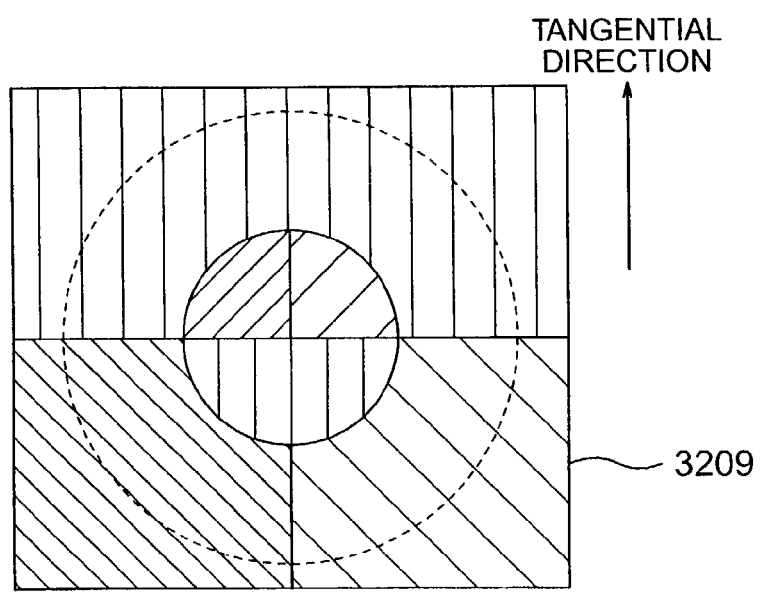
FIG. 36 is a diagram for showing a polarizing diffraction grating pattern used for a compact optical head.

FIG. 35 is a diagram for showing a detector pattern and a signal calculating method in the laser module of FIG. 34. FIG. 36 shows a pattern of the polarizing diffraction grating 3209. FIG. 35 also shows a pattern of detection light during defocus condition, which is overlapped with an optical detecting region shown by a hatching manner. All of +first-order diffraction light are connected to each other to form a single light output so as to output an RF signal by considering such a case that the light reception sensitivity of the photodetector is lowered and thus, the S/N ratio of the detector signal is deteriorated when a blue-color semiconductor laser is employed as a light source. As a consequence, an increase of amplifier noise may be suppressed. On the other hand, in order that a spherical aberration signal (SA signal) and a lens shift signal (LS signal) are acquired only from −first-order diffraction light by using a small number of splitting lines as being permitted as possible, both a focal error signal (AF signal) and an SA signal are produced by employing an upper half portion of an outer-sided luminous flux and a lower half portion of an inner-sided luminous flux. A tracking error signal (TR signal) and the lens shift signal (LS signal) are detected by splitting a lower half portion of the outer-sided luminous flux and an upper half portion of the inner-sided luminous flux along a radial direction, respectively.

(Embodiment 8)

FIG. 37 shows a compact optical disk apparatus, according to an embodiment mode of the present invention, which is arranged by the compact optical head 3701 of FIG. 32. FIG. 37(*a*) is a plan view of the compact optical disk apparatus, and FIG. 37(*b*) is a side view thereof. The compact optical head 3701 is mounted on an actuator arm 3215, and the actuator arm 3215 may be moved in a fine mode by the two-dimensional actuator 3707 along an optical axis direction of an objective lens of the optical head, and also, along the radial direction of he optical disk 3702. Furthermore, while both the actuator arm 3215 and the two-dimensional actuator 3707 are fixed on a swing arm 3703 in commination with a counter balance 3705, the swing arm 3703 drives the compact optical head 3701 by a swing motor 3704 along the radial direction of the optical disk 3213. The optical disk 3213 is rotated by a spindle motor 3702. Signal inputs/outputs to the optical head are connected to a control circuit 3706 by a flexible plastic cable (not shown).

(Embodiment 9)

Figure 38:
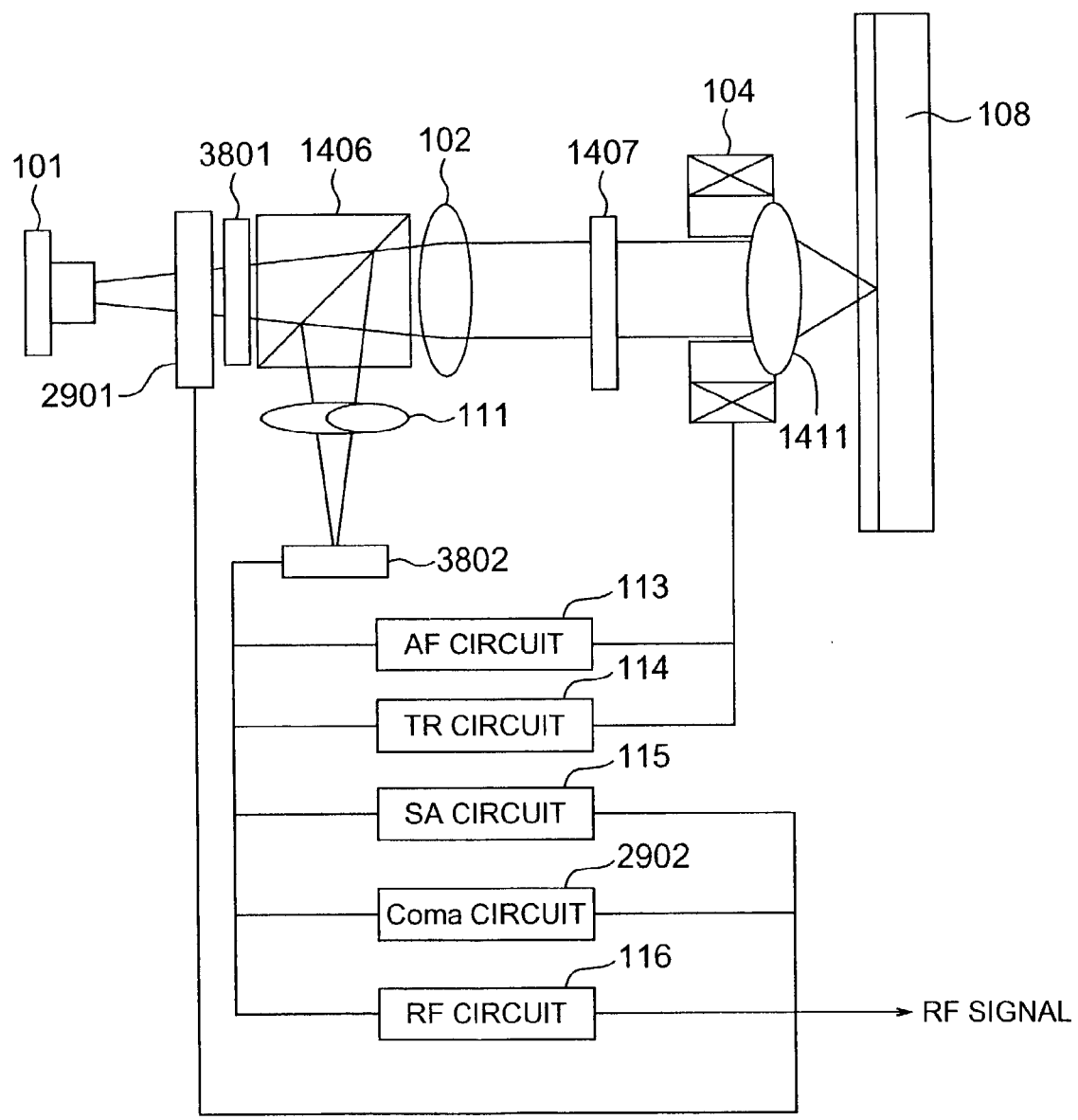
FIG. 38 is a diagram for indicating an optical disk apparatus with employment of an optical disk having a narrow track pitch, according to an embodiment mode of the present invention.

FIG. 38 represents an optical disk apparatus, according to an embodiment mode of the present invention, in such a case that an optical disk is either a groove recording system or a land recording system, and the track pitch of the optical disk is narrower than that of a land groove type optical disk. Generally speaking, in a recordable optical disk, periodic guide grooves are employed along a radial direction of this recordable optical disk for a tracking operation. When a tracking detection by a guide groove is carried out, a push-pull method is employed. This push-pull method owns such a problem that an optical spot on a photodetector is moved in connection with a tracking operation, and thus, an offset may occur. To mitigate this offset problem, such a method has been employed in a DVD-RAM and the like. That is, a polarizing diffraction grating is mounted on an objective lens, and a line for splitting luminous flux is not moved with respect to the luminous flex. However, this method is not always operated under perfect condition, but cannot remove such an offset that an intensity center is moved within luminous flux in conjunction with a tracking operation. This offset problem does not occur in a land groove type optical disk in which an amplitude of a push-pull signal can be increased. However, since an amplitude of a push-pull signal is decreased in either a groove recording type optical disk or a land recording type optical disk, in which a pitch of guide grooves must be made narrow, an offset which is relatively increased by an intensity distribution shift is not negligible. As another system capable of reducing the offset of the push-pull tracking type optical disk, there is a differential push-pull system. This differential push-pull system is such a system that since a sub-spot is arranged on a disk plane by a shift of ½ track with respect to a main spot, polarities of push-pull signals of both the main spot and the sub-spot obtained on a detector are inverted, and a differential output is obtained from the polarity-inverted push-pull signals, by which offsets mixed into both the main spot and the sub-spot in the same phase can be removed. In accordance with this differential push-pull system, this system can also cancel such an offset which is caused by an intensity distribution shift which is relatively increased in an optical disk having a narrow track pitch. FIG. 38 indicates such an embodiment mode that both spherical aberration and a lens shift are detected in an optical head using such a differential push-pull system.

In FIG. 38, light emitted from the semiconductor laser 101 passes through the liquid crystal phase compensating element 2901, the diffraction grating 3801, and the polarization beam splitter 1406, and then, is collimated into parallel light by the collimating lens 102. In the diffraction grating 3801, since the sub-spot is formed on the disk plane, diffraction light (not shown) is produced. The collimated beam is further converted into circularly polarized light by the ¼-λ plate 1407, and then, this circularly polarized light is condensed onto the optical disk 108 by the objective lens 1411 mounted on the two-dimensional actuator 104. The reflection light is converted by the same ¼-λ plate 1407 into linearly polarized light whose polarization direction is located perpendicular to that of the light when this light is entered into this ¼-λ plate 1407. Then, this linearly polarized light is reflected on the polarization beam splitter 1406, and the reflected light is received by the photodetector 3802 by applying thereto a astigmatism by the cylindrical lens 111. From an output signal of the photodetector 3802, a focal shift signal, a tracking signal, a spherical aberration signal, a lens shift signal, and an RF signal are detected from an AF circuit 113, a TR circuit 114, an SA circuit 115, a Coma circuit 2902, and an RF circuit 116 by way of a calculation, respectively. All of these signals other than the RF signal are fed back to the two-dimensional actuator 104 and the liquid crystal phase compensating element 2901.

Figure 39:
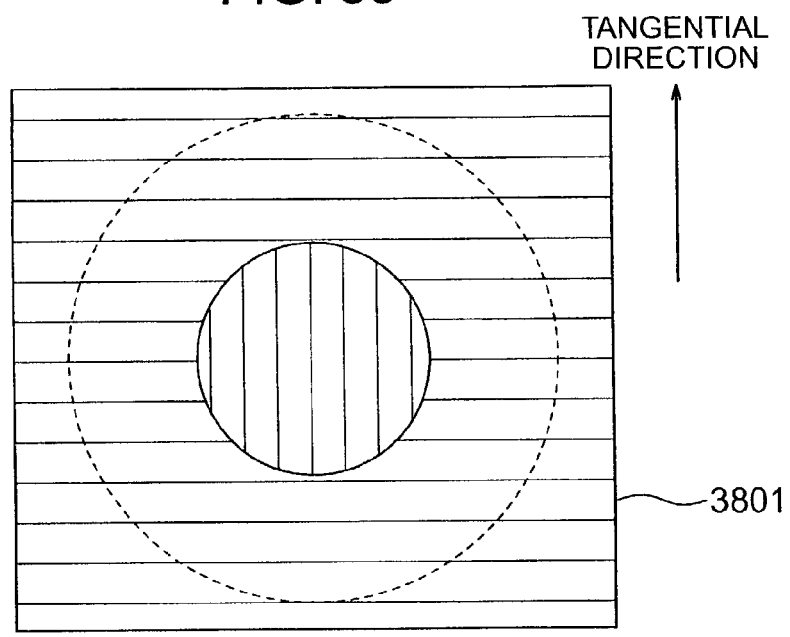
FIG. 39 is a diagram for showing a diffraction grating pattern in the embodiment mode of FIG. 38.

FIG. 39 shows a grating pattern of the diffractive grating 3801 of FIG. 38. Linear gratings are arranged along an intersection direction in such a manner that light of a center portion located in the vicinity of an optical axis is diffracted along the substantially radial direction of the optical axis, and light of a peripheral portion of the optical axis is diffracted along the substantially tangential direction with respect to an incident luminous flex indicated by a broken line.

Figure 40:
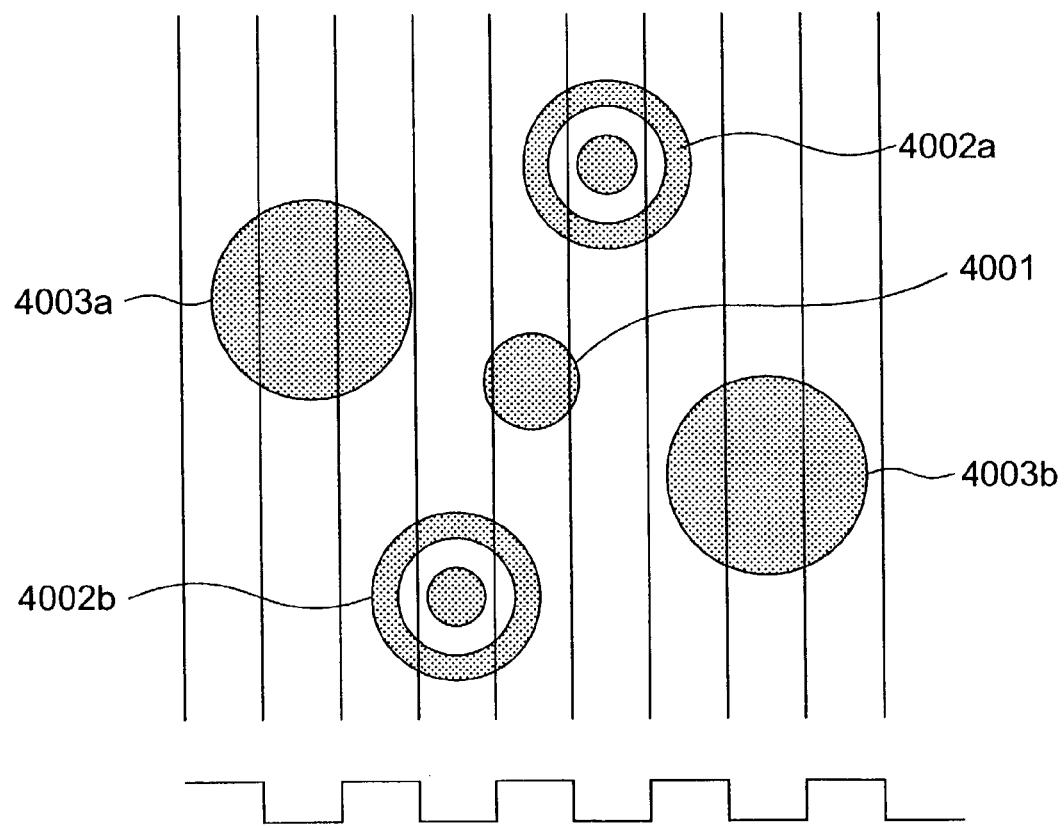
FIG. 40 is a schematic diagram for representing a spot arrangement on the optical disk in the embodiment mode of FIG. 38.

FIG. 40 is a diagram for schematically representing shapes of optical spots and arranging positions of the optical spots which are formed on the optical disk 108 by the diffraction grating 3801 of FIG. 39. The peripheral light which is diffracted along the substantially tangential direction constitutes spots 4002*a* and 4002*b* which are constituted by a relatively small main lobe, and a peripheral side lobe. At this time, the diffraction grating 3801 is adjusted in such a manner that the respective sub-spots are arranged on both sides of the main spot 4001 and are shifted by a half of the track pitch. Each of the luminous flux which is located in the vicinity of the optical axis, and is diffracted along the substantially radial direction, is separated from each other along the radial direction and forms a large-sized spot by which a structure of a guide groove cannot be resolved.

Figure 41:
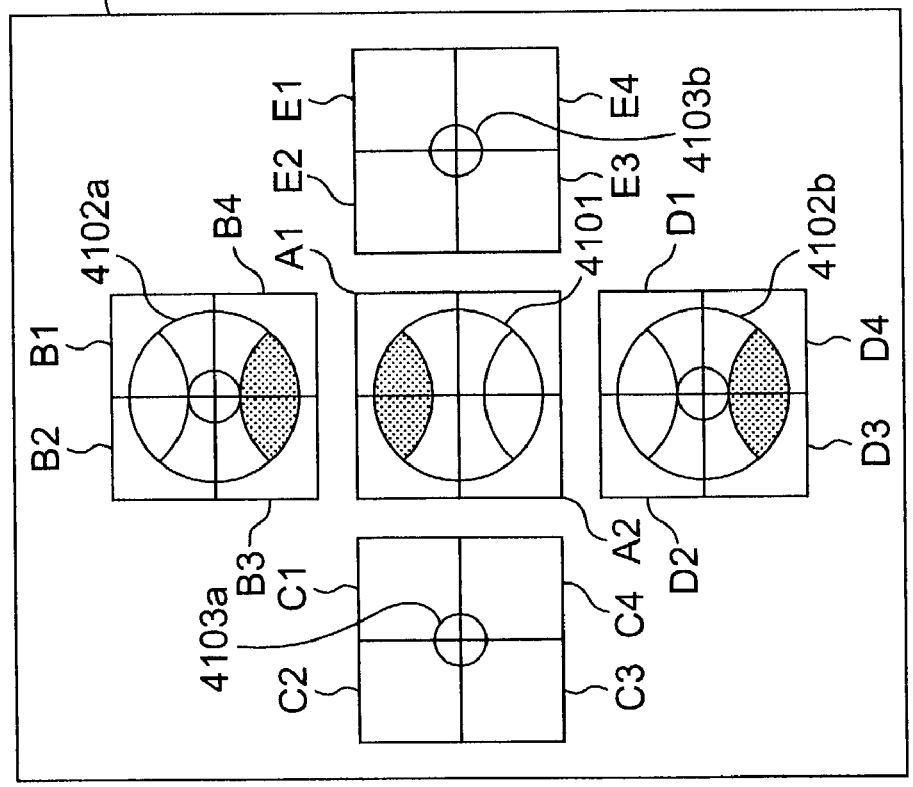
FIG. 41 is a diagram for indicating a photodetector light receiving pattern and a signal calculation method in the embodiment mode of FIG. 38.

FIG. 41 is a schematic diagram for indicating a light receiving plane pattern and detected luminous flux of the photodetector 3802 of FIG. 38. The diffraction light caused by the guide groove is overlapped with the luminous flux to be detected to form an interference pattern. In this drawing, in order to easily grasp a polarity of a TR signal calculation, for the sake of convenience, such a case that this interference pattern is unbalanced, while supposing that the main spot formed on the disk plane is slightly off-tracked. Also, a distribution of luminous flux on the detector indicates a position of a least circle of confusion of a condensed spot which is adversely influenced by the astigmatism caused by the cylindrical lens 111. As a consequence, the distribution of the luminous flux constitutes such a distribution that an intensity distribution in collimated luminous flux is rotated by 90 degrees. An AF signal is calculated by way of the astigmatism method by employing outputs of four diffraction light 4102*a*, 4102*b*, 4103*a*, and 4103*b*. A TR signal is calculated by adding a push-pull signal of the main spot 4101 to push-pull signals of the four diffraction light, and by subtracting the added signals from each other in such a manner that a light amount difference is absorbed by a gain coefficient G1. An SA signal is calculated by that a summation between focal shift signals of the outer-sided luminous flux 4102*a*, and 4102*b* is subtracted from a summation between focal shift signals of the inner-sided luminous flux 4103*a* and 4103*b*. An RF signal is calculated from a summation of the main spots 4101. An LS signal is calculated from a summation between push-pull signals of the inner-sided luminous flux 4103*a* and 4103*b*. As shown in this drawing, since a boundary between the inner-sided luminous flux and the outer-sided luminous flux is selected in such a manner that the diffraction light caused by the disk guide groove is not overlapped with the inner-sided luminous flux, only an unbalance in intensity distributions caused by a lens shift can be detected without any outer disturbance caused by the guide groove. Also, since the diffraction light caused by the disk guide groove is not overlapped with the inner-sided luminous flux but also the outer disturbance does not occur, the spot produced by the inner-sided luminous flux need not be arranged on the same track as that of the outer-sided luminous flux. Also, the spot produced by the inner-sided luminous flux can be readily separated from that of the outer-sided luminous flux and can be easily detected, and further, can be arranged in the radial direction along which a field angle from the objective lens is small. While these signals are calculated, all of the output signals derived from the respective light receiving regions need not be solely detected, but since the outputs which are continuously added/subtracted in the same polarity are previously wired on the photodetector substrate, a total number of output signal lines may be suppressed to 10 lines. Also, in this embodiment mode, the focal shift signals are obtained from the sub-spots. This is because a total number of signal lines used to execute the external calculation when the RF signal is obtained is reduced as many as possible. In such a case that the outputs derived from the light receiving plane are processed at the stage of the light currents (photocurrents), the noise of the adding amplifier is not mixed into these outputs. However, when the separately outputted signals are added/subtracted with each other by employing the adding amplifier, the respective output signals should be previously processed by the current-to-voltage converting operations, so that the noise of the amplifier is mixed into these output signals. In order to obtain the focal shift signal from the main spot 4101, the light receiving region of the main spot may be subdivided not by 2, but by 4, so that the amplifier noise becomes twice. In such a case that such a signal S/N can be secured by which the amplifier noise is located within the allowable range, it is preferable to acquire the AF signal from the zero-order light in view of the precision and stability of the focus control operations.

The above-described offset problem of the tracking signal in connection with the tracking control operation may occur, because the position of the objective lens is relatively moved with respect to the semiconductor laser and the photodetector. As a consequence, such an offset problem does not occur in the case of such an optical head in which the semiconductor laser, the photodetector, and the objective lens are driven in the integral form, as described with reference to FIG. 32.

(Embodiment 10)

Figure 42:
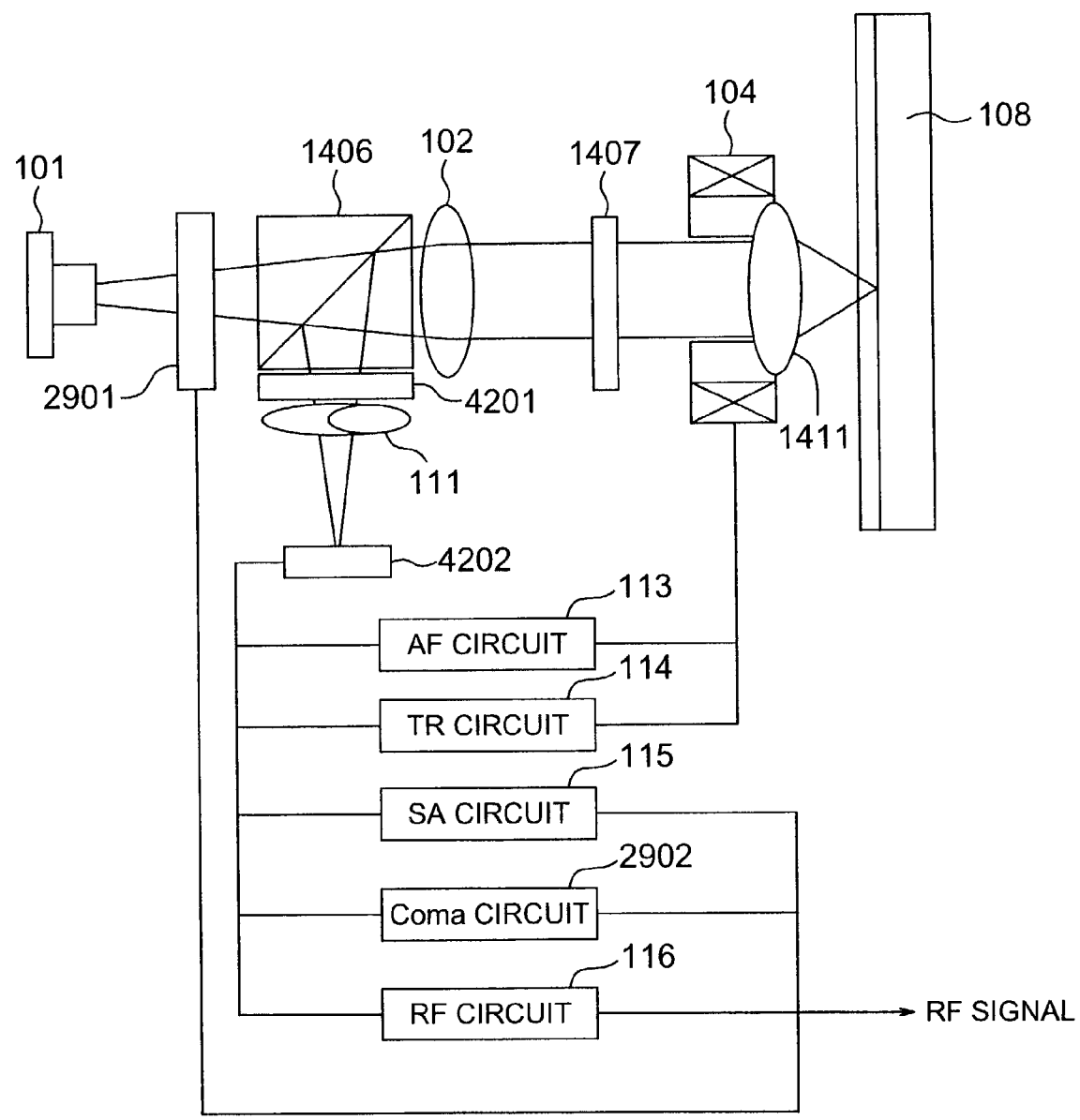
FIG. 42 is a diagram for showing an optical disk apparatus according to an embodiment mode of the present invention, in which the diffraction grating of the embodiment mode of FIG. 38 is arranged in a detecting optical system.

FIG. 42 is a diagram for indicating an optical disk apparatus according to another embodiment mode of the present invention, in which the diffraction grating 3801 employed in the embodiment mode of FIG. 38 is arranged in a detection optical system. Since the diffraction grating 4201 is arranged in the detection optical system, only a main spot is formed on the optical disk 108. Light entered to this detection optical system is diffracted by the diffraction grating 4201 having the same pattern as that of FIG. 39, and then, inner-sided luminous flux and outer-sided luminous flux are separated from each other in the diffraction light.

Figure 43:
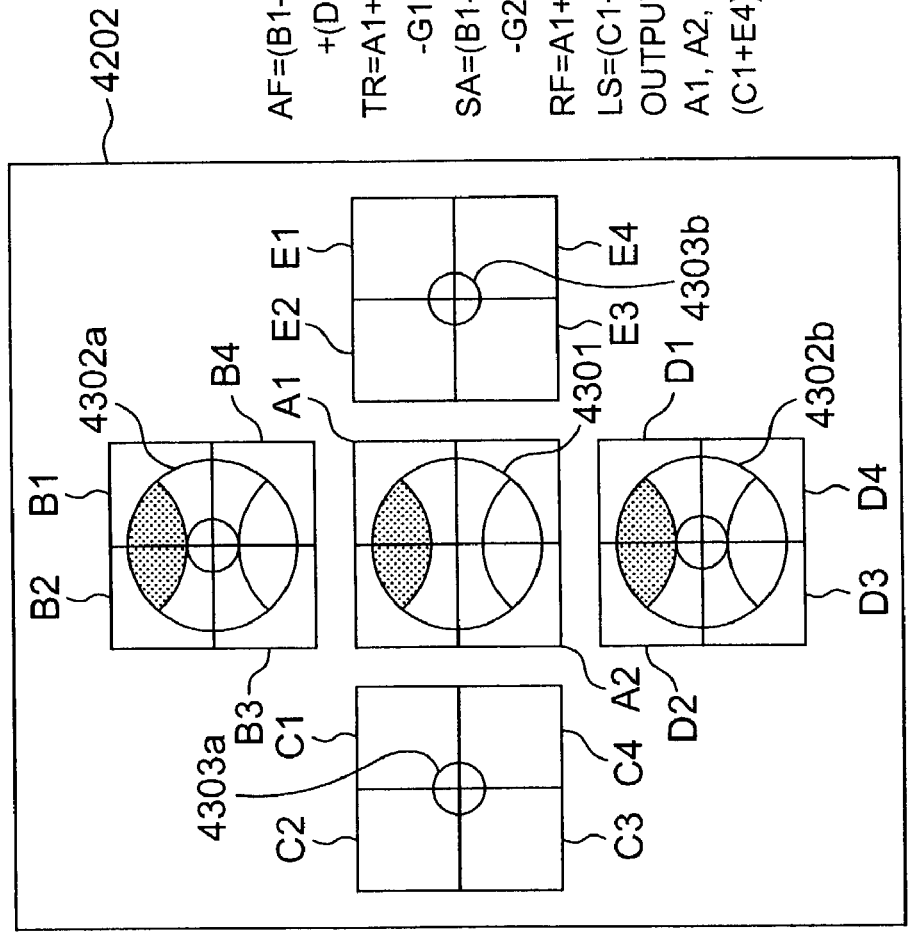
FIG. 43 is a diagram for indicating a photodetector light receiving pattern and a signal calculating method in the embodiment mode of FIG. 42.

FIG. 43 indicates a light receiving pattern of the photodetector 4202. Since the separation of the luminous flux is carried out in the detection optical system, an interference pattern of the main spot is identical to an interference pattern of the sub-spot. As a result, since the differential push-pull method is not used, an offset of a tracking signal is compensated by that the LS signal is multiplied by a constant gain, and then, the multiplied LS signal is subtracted from the push-pull signal of the main spot 4301.

(Embodiment 11)

Figure 44:
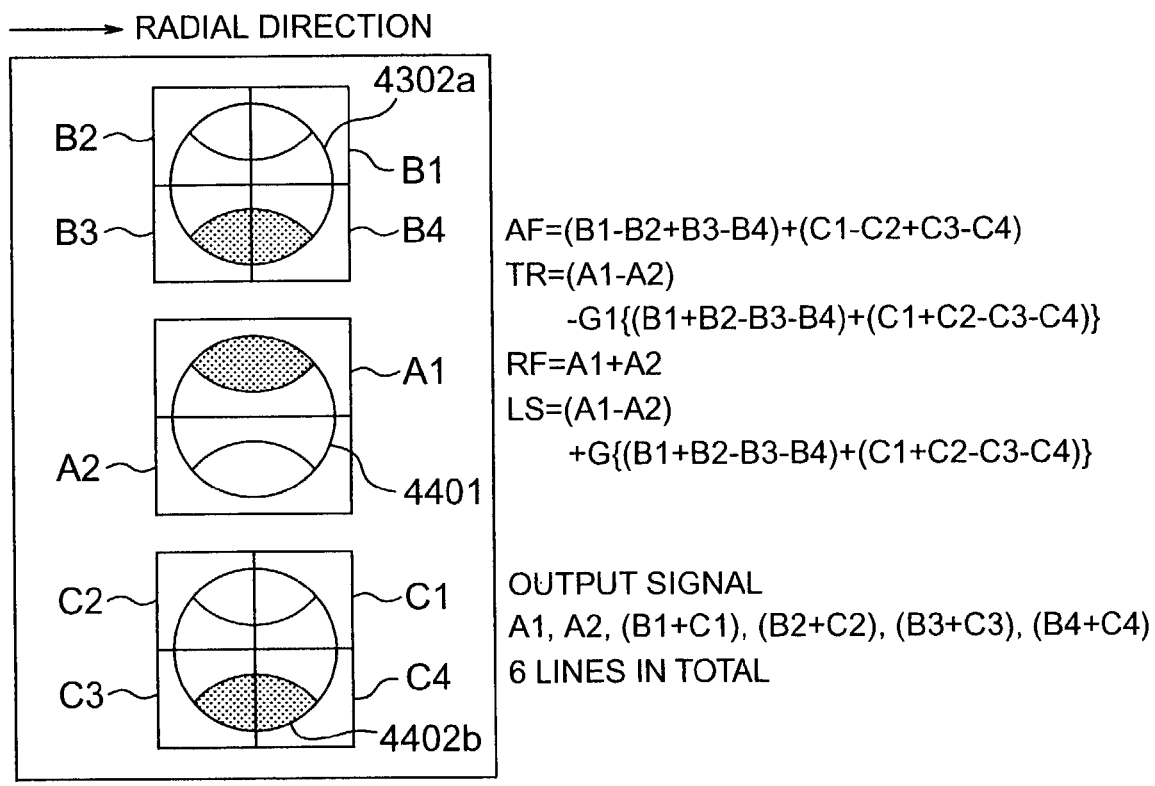
FIG. 44 is a diagram for indicating a photodetector light receiving pattern and a signal calculating method employed in another detecting system in the embodiment mode of FIG. 38.

FIG. 44 represents another photodetector pattern employed in the embodiment mode of FIG. 38 as another embodiment mode. In this case, while the linear grating having no split which has been used in the conventional differential push-pull system is used as the diffraction grating 3801, two sub-spots are arranged on both sides of a main spot on an optical disk by being shifted by a ½ track. As a result, three spots 4401, 4402*a*, 4402*b* are formed on the photodetector, in which interference patterns caused by the guide grooves are inverted. A focal shift signal is obtained by performing the normal focal point detecting calculation by the astigmatism method with employment of the sub-spots 4402*a* and 4402*b*. A tracking signal is obtained by executing the calculation of the normal differential push-pull method. A lens shift is obtained by adding two push-pull signals having inverted polarities. However, since the inner-sided luminous flux and the outer-sided luminous flux are not separated, which have been described in the present invention, it is difficult to detect spherical aberration. Therefore, the spherical aberration is detected from a defocus characteristic of a push-pull signal.

Figure 45:
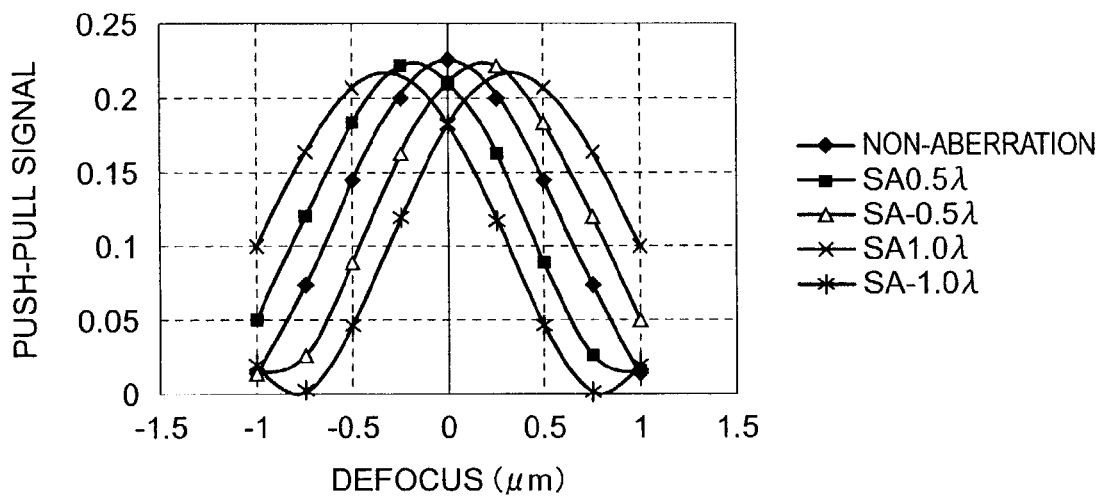
FIG. 45 is a diagram for showing a defocus characteristic of a push-pull signal in the case that spherical aberration is present.

FIG. 45 indicates a calculation result of such a defocus characteristic of a push-pull signal under such a condition that an NA is 0.85; a wavelength is 0.405 μm; and a track pitch is 0.32 μm. It can be seen that when a magnitude of spherical aberration is changed, a position of a peak is shifted. As a result, a signal directly proportional to the spherical aberration may be acquired by utilizing this positional shift of the peak as follows: That is, amplitudes of push-pull signals are obtained in such a case that a focal point is moved from a just focusing position along forward/backward directions, and then, a difference is calculated between these amplitudes.

FIG. 46 shows the spherical aberration signal acquired in the above-described manner. It can been seen that such a signal which is directly proportional to the spherical aberration may be obtained in such a manner that while a focal shift amount is changed as ±0.25 μm, ±0.5 μm, and ±0.75 μm, a difference between amplitudes of push-pull signals is calculated. However, since the spherical aberration signal cannot be stationarily acquired in this method, this method may be employed in such a case. That is, when a jump among layers in a multi-layer disk is carried out, spherical aberration is learned before recording/reproducing operations are performed, the spherical aberration is stationarily compensated by using a constant value in the same layer. Also, in this method, signals are similarly obtained even in not only the spherical aberration, but also the astigmatism. As a consequence, this method is effective to detect only a change component in the spherical aberration caused by the interlayer jump where the astigmatism is not changed.

(Embodiment 12)

Figure 50:
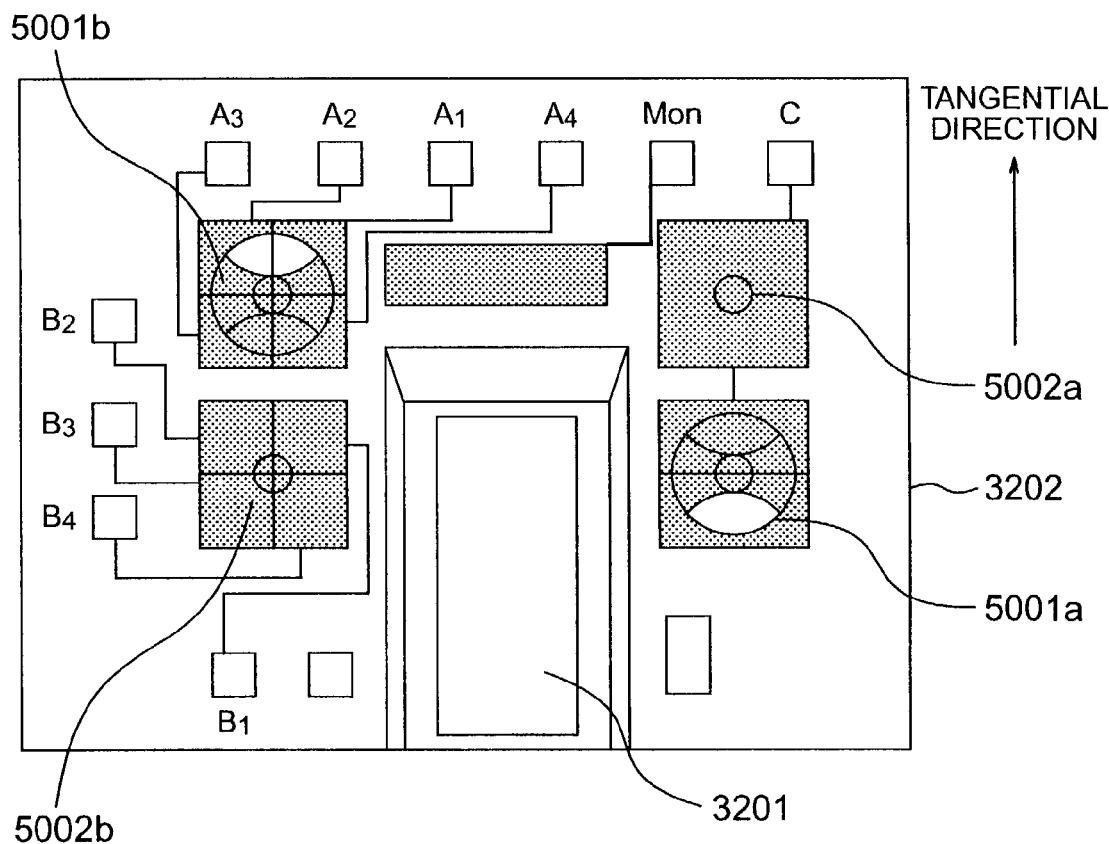
FIG. 50 is a diagram for indicating a laser module according to another embodiment mode of the present invention, employed in the embodiment mode of FIG. 32.
Figure 51:
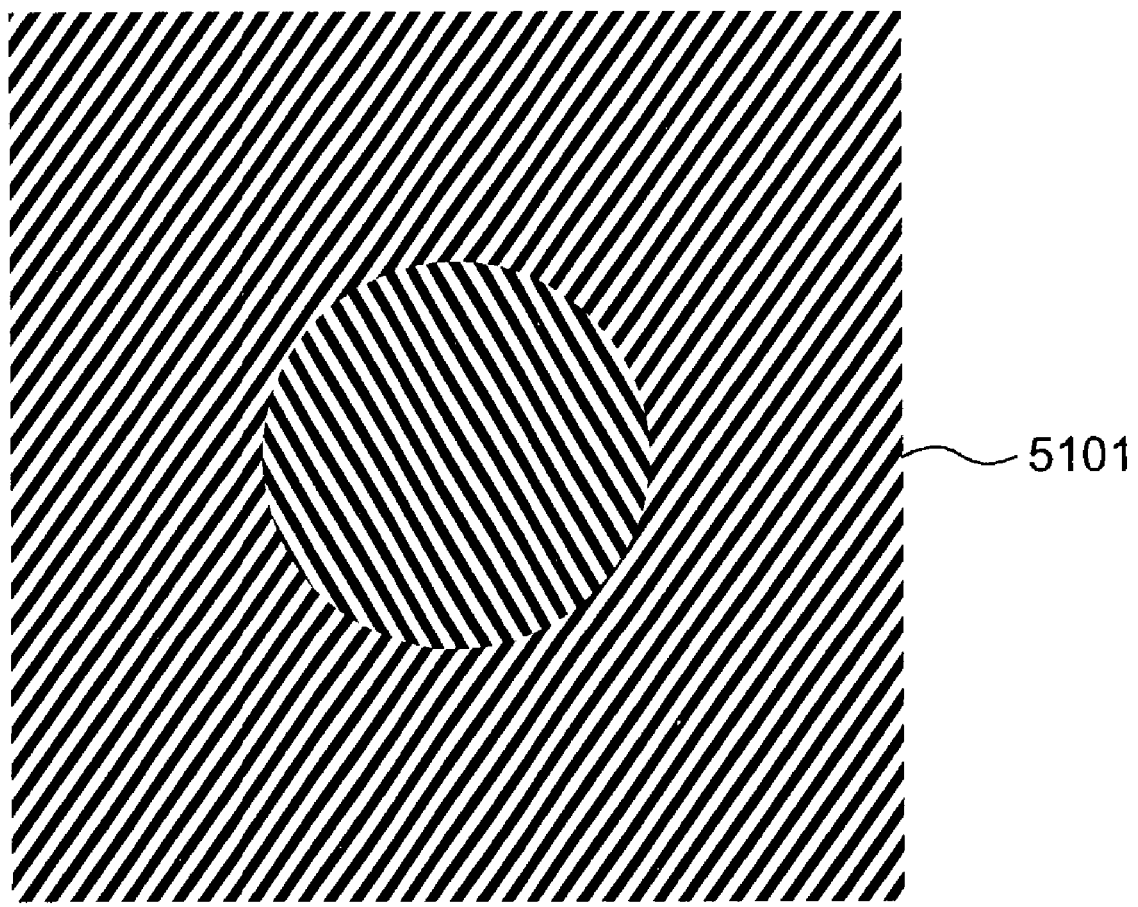
FIG. 51 is a diagram for showing a diffraction grating used in the embodiment mode of FIG. 50.

FIG. 50 shows a laser module of another embodiment mode, employed in the compact optical head of the embodiment mode shown in FIG. 32. As the polarizing diffraction grating 3209, such a polarizing diffraction grating 5101 indicated in FIG. 51 is employed, and the same astigmatism is applied to both an inner-sided luminous flux and an outer-sided luminous flux of luminous flux along a 45-degree direction with respect to, radial direction of an optical disk, and further, both the inner-sided luminous flux and the outer-sided luminous flux are entered into different light receiving regions on the photodetector. As to optical spots 5001*a*, 5001*b*, 5002*a*, 5002*b* on the photodetector, when astigmatism having different symbols is applied to +first-order diffraction light (5001*a*, 5002*a*), and −first-order diffraction light (5001*b*, 5002*b*), and at the same time, when the optical spots on the optical disk are focused, a least circle of confusion caused by the astigmatism is formed. As a result, interference patterns caused by the guide grooves of the optical disk are rotated by 90 degrees along opposite directions as to the +first-order light and the −first-order light. In the light detecting regions, both the inner-side and the outer-side of the +first-order diffraction light are received by a single uniform light receiving region, and these inner-sided and outer-sided light outputs are connected on the photodetector so as to be outputted as an RF signal. Each of inner-sided light and outer-sided light as to the −first-order diffraction light is received by a 4-split light detecting region, and then, a summation between focal-shift signals obtained by the astigmatism method is employed as an AF signal, whereas a subtraction between the focal-shift signals obtained by the astigmatism method is employed as an SA signal. Also, a TR signal may be obtained by that an LS signal acquired by a push-pull signal of the inner-sided luminous flux is multiplied by a constant gain, and the resultant LS signal is subtracted from a push-pull signal of an outer-sided luminous flux. As a consequence, an offset of a lens shift caused in the case that the objective lens is not formed with the laser module in an integral body can be compensated. It should also be noted that in the embodiment mode of FIG. 32, these objective lens and laser module are formed in the integral form. As a result, the LS signal essentially and continuously becomes zero. Therefore, there is no difference even when such a calculation is carried out, or not carried out. When such a calculation is performed, a total number of output signal lines including a monitor output lint becomes 10.

Figure 52:
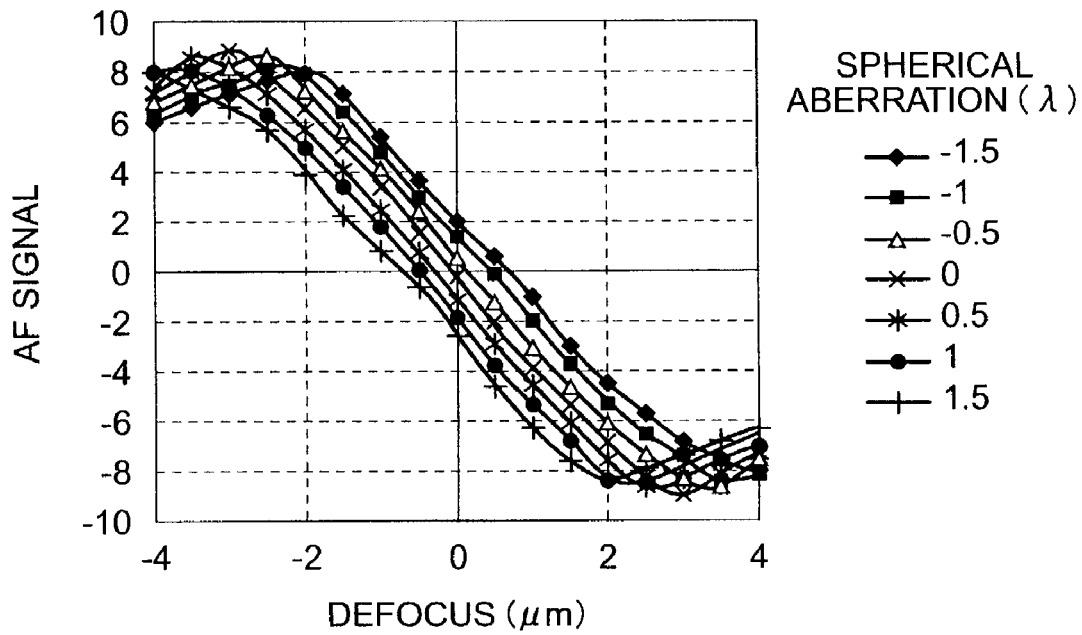
FIG. 52 is a diagram for indicating a calculation result of a focal shift signal by spherical aberration occurred on a detector, which is caused by a thickness shift of a base plate.
Figure 53:
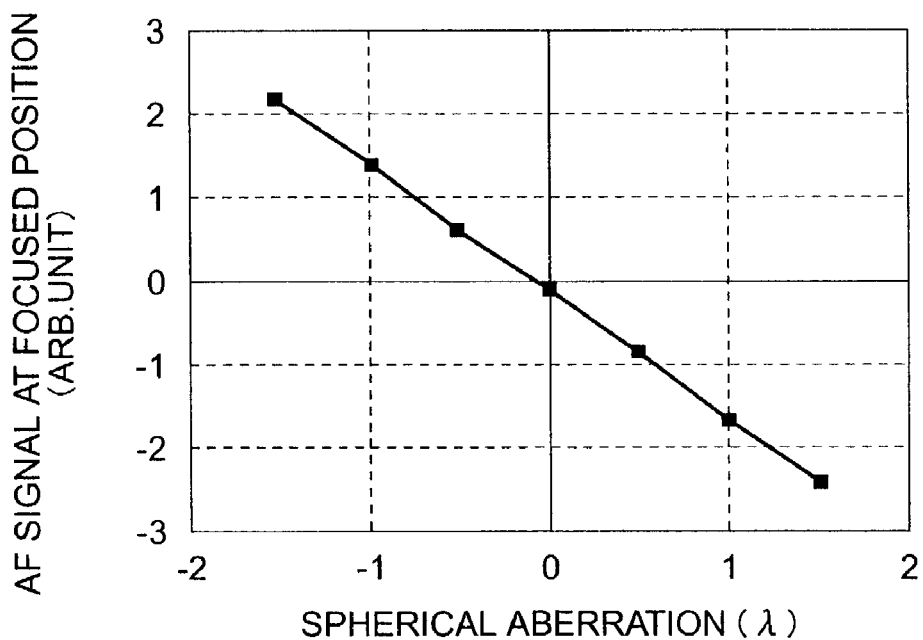
FIG. 53 is a diagram for representing a focal shift signal offset amount with respect to the spherical aberration in FIG. 52.

When spherical aberration occurs in the optical spot on the disk plane due to the thickness error of the base plate, if the spherical aberration is compensated only in the luminous flux which is directed to the optical disk by employing the previously-explained liquid crystal phase compensating element, then the spherical aberration remains in such a luminous flux which is returned to the photodetector. FIG. 52 indicates a calculation result obtained by calculating this influence in the focal shift signal. This case supposes such a condition that the focal point detecting system is the astigmatism method; the NA of the objective lens is 0.85; the wavelength of the light source is 405 nm; the effective luminous flux diameter of the objective lens is 4 mm; the focal distance of the condenser lens in the detection system is 20 mm; and the focal point capture range is ±3 μm. When the spherical aberration caused by the thickness change of the base plate is applied only in the detection system within a range of ±1.5 λ (equivalent to approximately ±11 μm in thickness shift of base plate), it could be recognized that the focal position is shifted by approximately ±0.7 μm. This positional shift corresponds to such a shift amount which is not negligible. In this case, a relationship of a focal shift signal of a focused position (defocus is 0) with respect to the spherical aberration amount is represented in FIG. 53. As apparent from this relationship, it can be seen that a proportional relationship may be established between the focal shift signal and the spherical aberration amount.

Figure 54:
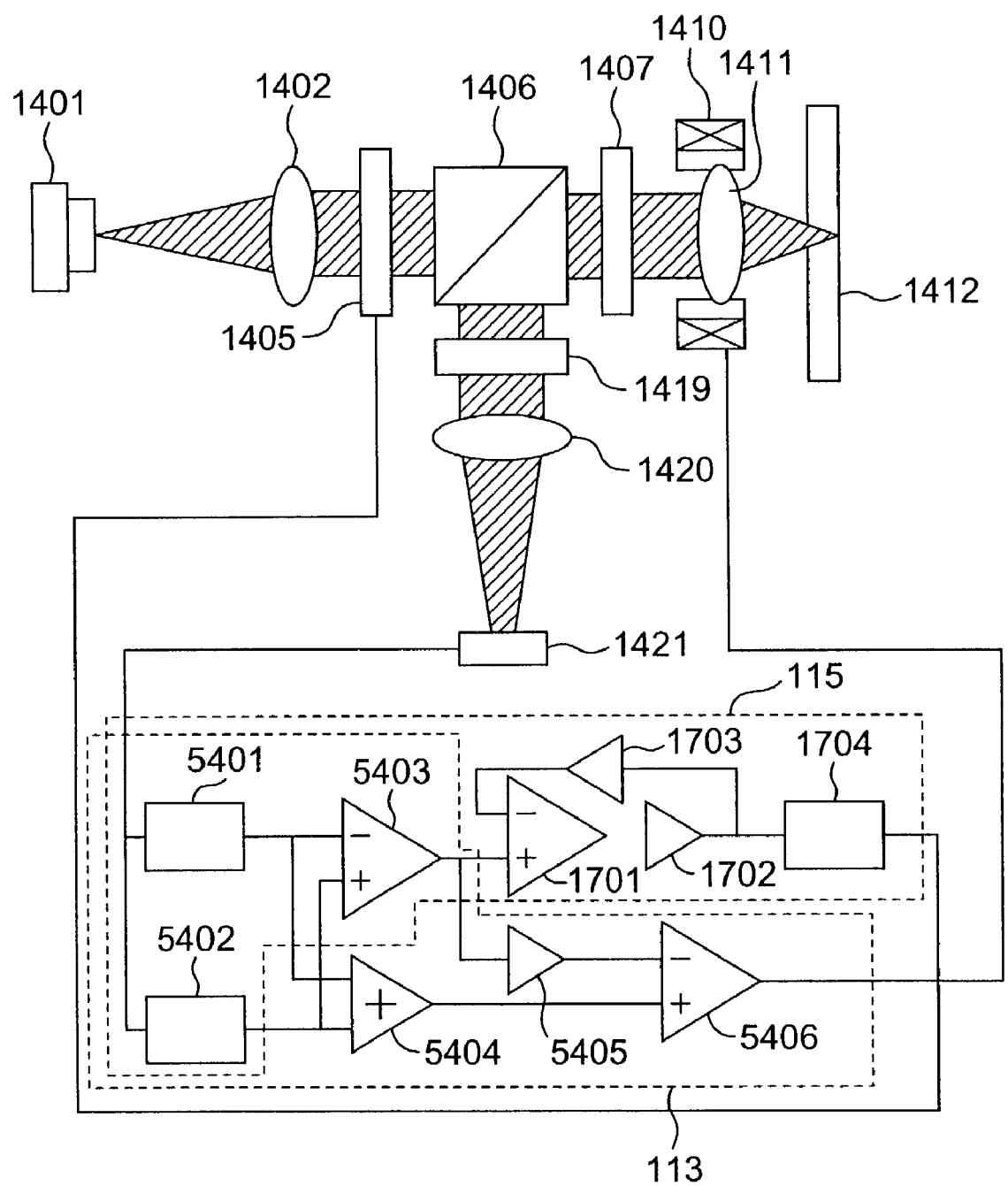
FIG. 54 is a diagram for indicating an optical disk apparatus, according to an embodiment mode of the present invention, capable of compensating a focal shift signal offset in the case that only spherical aberration of an one way is corrected.

As a result, such an optical disk apparatus as shown in FIG. 54 is arranged, and an offset which is directly proportional to a spherical aberration signal is applied to a focal shift signal. Although an arrangement of an optical system of this optical disk apparatus is made based upon the optical disk apparatus of FIG. 17 as one example, the spherical aberration caused by the thickness shift of the base plate is compensated only in the luminous flux of the going optical path, and all effects can be achieved with respect to the arrangement left in the detection luminous flux. In this arrangement, first of all, both a focal shift signal of an inner-sided luminous flux and a focal shift signal of an outer-sided luminous flux are acquired from an output of the photodetector 1421 by employing a calculation circuit 5401 and another calculation circuit 5402. When a difference signal between these focal shift signals is obtained by a differential amplifier 5403, this difference signal may constitutes such a spherical aberration signal which reflects the spherical aberration occurred on the detector. A structure for compensating the spherical aberration of the one-way optical path from this output is similar to that of FIG. 17. On the other hand, a summation signal between the focal shift signal of the inner-sided luminous flux and the focal shift signal of the outer-sided luminous flux is calculated by an adder 5404. From this summation signal, a focal shift signal may be obtained in such a manner that the spherical aberration signal on the detector is multiplied by an amplifier 5405, and then, this multiplied spherical aberration signal is subtracted from this summation signal. Then, the lens actuator 1410 is driven by this calculated focal shift signal. In the above-described circuit arrangement, the AF circuit 113 and the SA circuit 115 are effectively arranged.

The above-described calculations are effectively equivalent to such a case that in the focal shift signal, a gain distribution of adding the focal shift signal of the inner-sided luminous flux to the focal shift signal of the outer-sided luminous flux is changed. The spherical aberration signal is given as follows:

$$SA = AF_{in} - AF_{out} \quad \text{(Expression 17)}$$

As a result, in the case that the amplification gain of the spherical aberration signal is set to "k" when the spherical aberration signal is subtracted from the summation signal, a focal shift signal in this case is given as follows:

$$\begin{aligned} AF &= AF_{in} + AF_{out} - k \cdot SA \\ &= AF_{in} + AF_{out} - k \cdot (AF_{in} - AF_{out}) \\ &= (1-k)AF_{in} + (1+k)AF_{out} \end{aligned} \quad \text{(Expression 18)}$$

Figure 55:
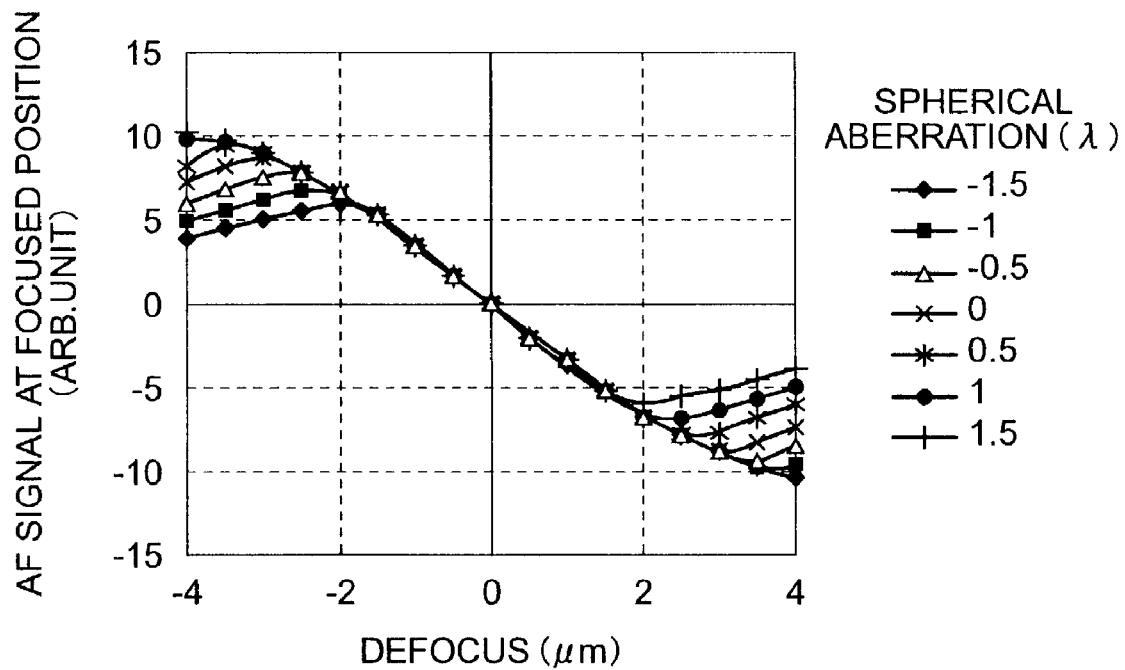
FIG. 55 is a diagram for showing a calculation result of a focal shift signal after a focal shift signal offset in the case that spherical aberration remains has been compensated.

In other words, the above-described calculation is equivalent to such an operation that the gain of the summation between the focal shift signal of the inner-sided luminous flux and the focal shift signal of the outer-sided luminous flux is changed. FIG. 55 indicates such a calculation result that an amount obtained by multiplying a spherical aberration amount by 1.5 is subtracted from a focal shift signal from FIG. 53. An offset of the focal shift signal is suppressed to a sufficiently small value.

As previously explained, in accordance with the present invention, the spherical aberration occurred in the optical disk apparatus can be detected in higher precision and in the easy manner and in low cost. This detected spherical aberration is fed back to the spherical aberration compensating mechanism, so that the quality of the condensed spot can be maintained in the higher value, and the high density recording/reproducing operations of the optical disk can be carried out under stable condition.

INDUSTRIAL APPLICABILITY

The present invention may be applied to optical recording/reproducing operations of information.

What is claimed is:

1. An optical disk apparatus comprising:
an optical head which is constituted by: a semiconductor laser; an objective lens for condensing laser light of said semiconductor laser onto an optical disk; a variable focal point mechanism for varying a focus position of the light condensed in an optical system; a spherical aberration applying mechanism for adding variable spherical aberration to the light condensed in said optical system; a first optical branching element for branching reflection light reflected from said optical disk from said optical system; a lens for condensing the branched reflection light; and a light receiving element for receiving the light condensed by said lens so as to convert the received light into an electric signal; and in which a second branching element is additionally provided in luminous flux of said light, while said second branching element branches reflection light to be branched in such a manner that said second branching element further separates the light to be branched into first luminous flux located in the vicinity of an optical axis and second luminous flux located at a peripheral portion of said optical axis, and both said first luminous flux and said second luminous flux are condensed to said light receiving element; and
a calculation circuit for acquiring both a reproduction signal and a focal shift signal from the electric signal derived from said light receiving element; wherein:
a first focal shift signal and a second focal shift signal are detected as to each of said first luminous flux and said second luminous flux; said spherical aberration applying mechanism is controlled based upon a subtraction signal obtained by essentially performing a subtraction between said first focal shift signal and said second focal shift signal; and said variable focal point mechanism is controlled based upon a summation signal obtained between said first focal shift signal and said second focal shift signal:
said spherical aberration applying mechanism does not apply aberration to outgoing light, but applies aberration to incoming light; and
a feedback system is constituted so as to compensate spherical aberration on said optical disk plane in such a manner that said first focal shift signal and said second focal shift signal are detected, and a spherical aberration error which is obtained from a substraction signal by essentially substracting said first and second focal-shift signals is fed back to said spherical aberration applying mechanism.

2. An optical disk apparatus as claimed in claim 1 wherein:
said optical disk apparatus is provided with a loop in which a drive signal which electrically drives said spherical aberration applying mechanism is fed back to a system for amplifying the spherical aberration error.

3. An optical disk apparatus as claimed in claim 1 wherein:
said spherical aberration error is multiplied by a proper coefficient, and said multiplied spherical aberration error is added to the drive signal of said variable focal point mechanism so as to drive said variable focal point mechanism.

4. An optical disk apparatus as claimed in claim 1 wherein:
said optical disk apparatus is comprised of:
an optical head additionally provided with a tracking control mechanism for driving said objective lens along a radial direction of the optical disk;
a calculation circuit for acquiring a reproduction signal, a focal shift signal, and a tracking error signal from the electric signal derived from said light receiving element; and
a comatic aberration applying mechanism; and further,
means for detecting first and second focal shift signals as to each of said first luminous flux and said second luminous flux, for controlling said spherical aberration applying mechanism based upon a subtraction signal obtained by essentially subtracting both said first and second focal shift signals, for controlling said variable focal point mechanism based upon a summation signal obtained by summing both said first and second focal shift signals, for controlling a tracking control mechanism based upon said tracking error signal, for detecting a move amount of the objective lens during the tracking control operation, and for driving the comatic aberration applying mechanism in response to said move amount.

5. An optical disk apparatus as claimed in claim 4 wherein:
said optical head includes means for splitting said first luminous flux by a diameter of the optical disk along a tangential direction and for independently detecting the split first luminous flux; and
said means for detecting the move amount of said objective lens detects the move amount by calculating a difference between two detected light amounts of said first luminous flux which is split to be detected.

6. An optical disk apparatus as claimed in claim 1 wherein:
said optical disk apparatus is comprised of:
an optical head additionally provided with a tracking control mechanism for driving said objective lens along a radial direction of the optical disk;
a calculation circuit for acquiring a reproduction signal, a focal shift signal, and a tracking error signal from the electric signal derived from said light receiving element; and
a comatic aberration applying mechanism; and further,
means for detecting first and second focal shift signals as to each of said first luminous flux and said second luminous flux, for controlling said spherical aberration applying mechanism based upon a subtraction signal obtained by essentially subtracting both said first and second focal shift signals, for controlling said variable focal point mechanism based upon a summation signal obtained by summing both said first and second focal shift signals, for controlling a tracking control mechanism based upon said tracking error signal, for detecting comatic aberration of a spot condensed on the optical disk, and for driving said comatic aberration applying mechanism in response to said detection signal.

7. An optical disk apparatus comprising:
an optical head which is constituted by: a semiconductor laser, an objective lens for condensing laser light of said semiconductor laser onto an optical disk; a variable focal point mechanism for varying a focus point of the light condensed in an optical system; a spherical aberration applying mechanism for adding variable spherical aberration to the light condensed in said optical system; a first optical branching element for branching reflection light reflected from said optical disk from said optical system; a lens for condensing the branched reflection light; and a light receiving element for receiving the light condensed by said lens so as to convert the received light into an electric signal; and in which a second branching element is additionally provided in luminous flux of said light, while said second branching element branches reflection light to be branched in such a manner that said second branching element further seperates the light to be branched into first luminous flux located in the vicinity of an optical axis and second luminous flux located at a peripheral portion of said optical axis, and both said first luminous flux and said second luminous flux are condensed to said light receiving element; and
a calculation circuit for acquiring both a reproduction signal and a focal shift signal from the electric signal derived from said light receiving element; wherein:
a first focal shift signal and a second focal shift signal are detected as to each of said first luminous flux and said second luminous flux; said spherical aberration applying mechanism is controlled based upon a subtraction signal obtained by essentially performing a substraction between said first focal shift signal and said second focal shift signal; and said variable focal point mechanism is controlled based upon a summation signal obtained between said first focal shift signal and said second focal shift signal;
said second optical branching element is a diffraction element; is arranged between said semiconductor laser and said objective lens; and is effected in luminous flux directed said objective lens in such a manner that both +first-order diffraction light and −first-order diffraction light of the luminous flux at the peripheral portion are diffracted along a substantially tangential direction, and are arranged on both sides of zero-order light and essentially shifted by a ½ period of guide grooves, or pitch columns along a radial direction on an optical disk, whereas both +first-order diffraction light and −first-order diffraction light of the luminous flux in the vicinity of the optical axis are diffracted along the substantially radial direction;
said optical head includes a tracking control mechanism for driving said objective lens along a radial direction of said optical disk;
said optical disk apparatus includes a calculation circuit for acquiring a reproduction signal, a focal shift signal, and a tracking error signal from the electric signal derived from said light receiving element;
said optical disk apparatus detects a first focal shift signal as to said first luminous flux located in the vicinity of the optical axis and as to said second luminous flux located at the peripheral portion of the optical axis, which are diffracted by said diffraction grating, so as to control said spherical aberration applying mechanism based upon a subtraction signal obtained by essentially subtracting both said first and second focal shift signals with each other, and also controls said variable focal point mechanism based upon a summation signal obtained by summing both said first and second focal shift signals; and also
said optical disk apparatus detects first, second, and third tracking error signals as to said first luminous flux, said second luminous flux, and luminous flux which is not diffracted by the diffraction grating so as to control said tracking control mechanism based upon such a subtraction signal between the third tracking error signal and a summation signal obtained by essentially summing said first and second tracking error signals.

* * * * *